United States Patent [19]
Sun et al.

[11] Patent Number: 5,777,813
[45] Date of Patent: Jul. 7, 1998

[54] METHOD AND APPARATUS FOR REDUCING SIDEBAND INTERFERENCE WHEN STORING OR RETRIEVING DATA IN A DISK DRIVE SYSTEM ADAPTED FOR DOWNWARD COMPATIBILTY

[75] Inventors: Kai C.K. Sun, Saratoga, Calif.; James A. Herbst, Longmont, Colo.; Chih-Hsiung Chang, San Jose, Calif.; Mansur B. Kiadeh, Cupertino, Calif.

[73] Assignee: Syquest Technology, Inc., Fremont, Calif.

[21] Appl. No.: 412,651

[22] Filed: Mar. 10, 1995

Related U.S. Application Data

[63] Continuation-in-part of Ser. No. 209,829, Mar. 11, 1994, abandoned.

[51] Int. Cl.$^6$ .................................................. G11B 5/03
[52] U.S. Cl. ........................... 360/66; 360/75; 360/77.17; 369/44.13
[58] Field of Search ..................... 360/75, 66, 77.07, 360/77.17; 369/44.13

[56] References Cited

U.S. PATENT DOCUMENTS

| | | | |
|---|---|---|---|
| 4,853,799 | 8/1989 | Aikawa | 360/77.07 |
| 4,862,294 | 8/1989 | Mihara | 360/66 |
| 4,901,169 | 2/1990 | Hamaoka | 360/66 |
| 5,050,016 | 9/1991 | Squires | 360/77.08 |
| 5,142,626 | 8/1992 | Arnold et al. | 395/275 |
| 5,155,638 | 10/1992 | Aikawa et al. | 360/69 |
| 5,173,816 | 12/1992 | Ogihara | 360/69 |
| 5,329,510 | 7/1994 | Tsuyuguchi | 369/58 |
| 5,400,201 | 3/1995 | Pederson | 360/77.08 |
| 5,523,902 | 6/1996 | Pederson | 360/48 |

FOREIGN PATENT DOCUMENTS

| | | | |
|---|---|---|---|
| 134766 | 5/1990 | Japan | 360/25 |

*Primary Examiner*—Aristotelis M. Psitos
*Assistant Examiner*—Alan Faber
*Attorney, Agent, or Firm*—Lyon & Lyon LLP

[57] ABSTRACT

A disk drive system having downward compatibility includes a read/write head and a feedback servo controller for reading and writing information to and from a removable disk cartridge. When writing information to the data tracks of magnetic medium of a lower-capacity disk cartridge, in which the data tracks are substantially wider than the width of the read/write head, the read/write head is operated in an erase mode for several resolutions prior to writing the data. The read/write head is first shifted off track center by a small DC offset, then operated in an erase mode while being guided in a repeating oscillating pattern under closed loop servo control. The read/write head is then shifted off track center in the other direction, then again operated in an erase mode while being guided in a repeating oscillating pattern under closed loop servo control. A higher capacity disk drive system can thereby read and write data to the removable disk cartridge such that data which it stores on a lower-capacity removable disk cartridge may be read by lower-capacity disk drive systems without sideband interference.

37 Claims, 33 Drawing Sheets

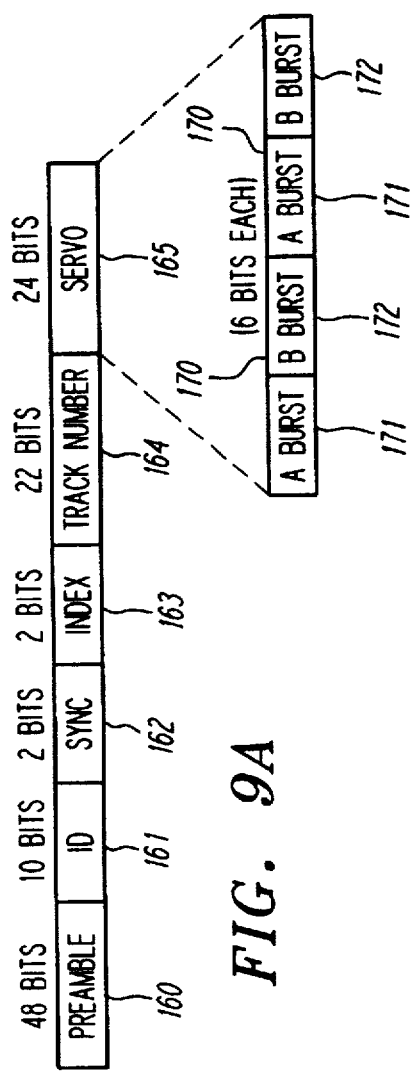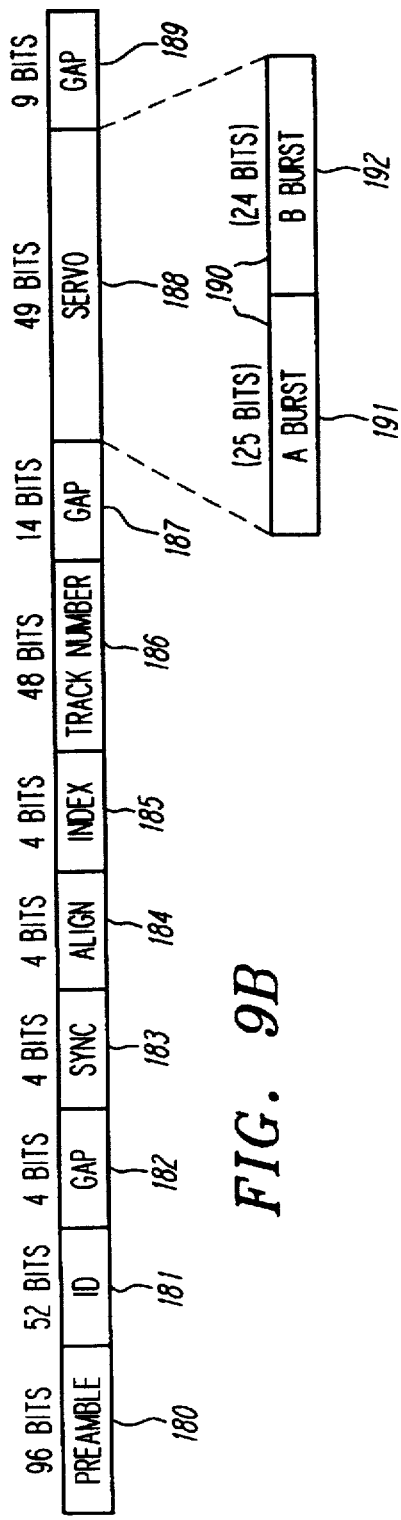
FIG. 9A
FIG. 9B

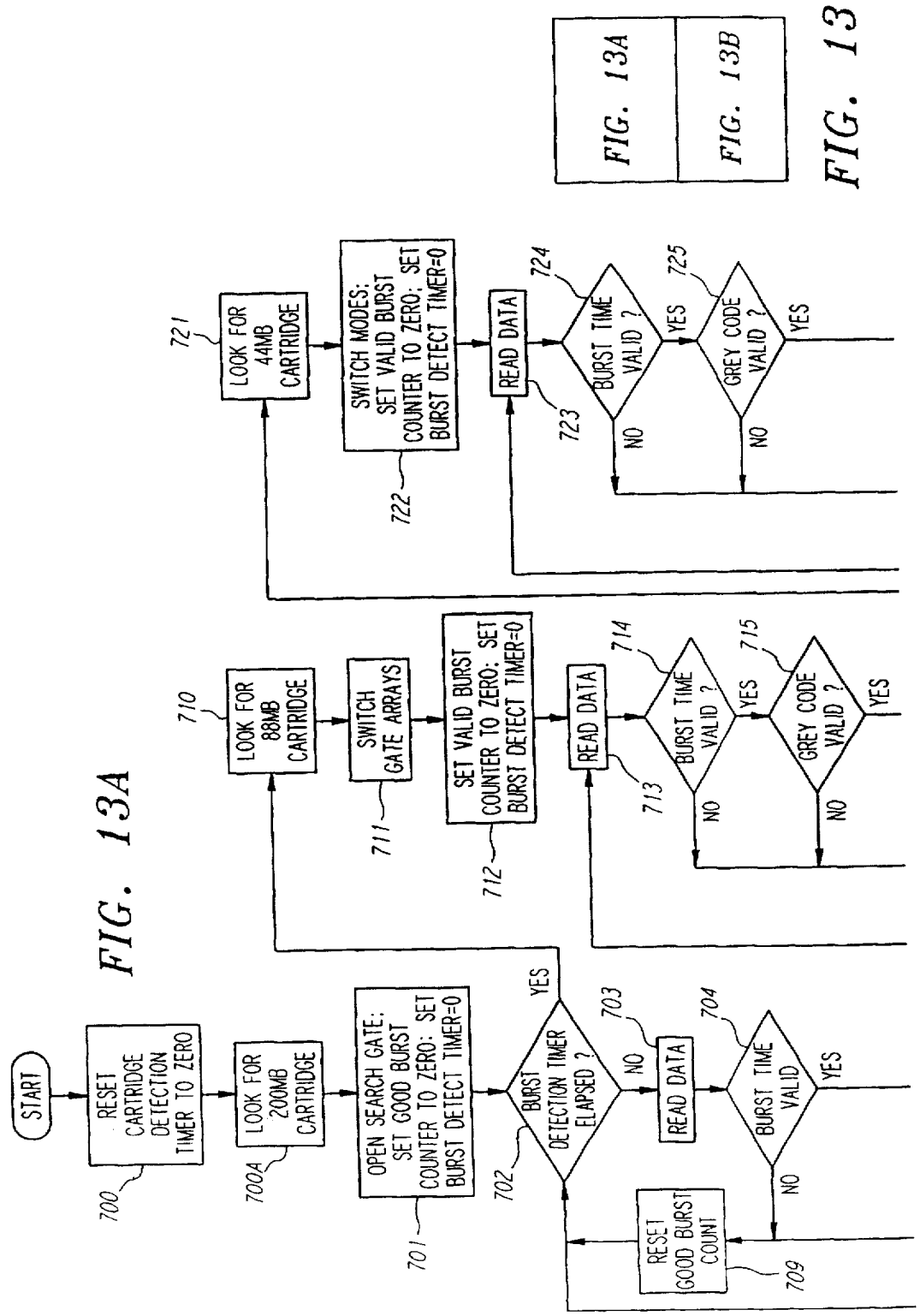

5,777,813

METHOD AND APPARATUS FOR REDUCING SIDEBAND INTERFERENCE WHEN STORING OR RETRIEVING DATA IN A DISK DRIVE SYSTEM ADAPTED FOR DOWNWARD COMPATIBILTY

RELATED APPLICATION DATA

This application is a continuation-in-part of U.S. patent application Ser. No. 08/209,829, filed in the name of inventors Kai C. K. Sun and John L. Grimsley on Mar. 11, 1994, now abandoned incorporated by reference as if fully set forth herein.

FIELD OF THE INVENTION

The field of the present invention relates to removable cartridge disk drives in general and, more particularly, to a removable cartridge disk drive and system which provides downward compatibility for removable cartridges of different disk storage capacities and characteristics.

BACKGROUND ART

Removable disk cartridges have been available on the market for some time. Unlike fixed disk drive systems, removable disk cartridge systems enable a user to easily replace a relatively high capacity disk, allowing for convenient exchange of large amounts of information between remote sites and for greatly increased system storage capacity.

Removable disk cartridge technology continues to advance, providing the user with cartridges and disk drives of increasing performance and data storage capacity. These advancements are universally beneficial, leading to less cost per unit of data stored and enhanced accuracy of data storage and retrieval operations. Nevertheless, problems associated with technological advancement do occur. One of the most critical problems in the area of removable cartridge technology concerns downward compatibility.

Because removable disk cartridges are by definition removable, they can be used interchangeably between one disk drive product and another. Thus, a removable cartridge originally designed for an older, lower-capacity disk drive can often be inserted in a newer, higher-capacity disk drive and data can be written on or read from the disk in the lower-capacity cartridge by the read/write head in the higher-capacity drive. However, after the higher-capacity drive writes on a lower-capacity cartridge, difficulties may occur when the re-written lower-capacity cartridge is reinserted back into the older, lower-capacity disk drive. One reason for this difficulty is that the read/write head width and associated track pitch of the higher-capacity disk drive are usually smaller than the head width and associated track pitch of the lower-capacity disk drive. As a result, portions of the old data signals recorded in a given track by the lower-capacity disk drive remain in "sidebands" on either side of the data newly recorded in the higher-capacity disk drive, giving rise to a potential for interference when the lower-capacity disk drive performs read operations.

The sideband phenomenon is illustrated in FIG. 1A, which depicts an A/B servo pattern recorded on a lower-capacity removable disk cartridge over a localized track region. As can be seen from FIG. 1A, the recording of data in a data track 2 of a removable cartridge originally designed for a lower-capacity disk drive, using a read/write head 4 of a higher-capacity disk drive, leaves inner and outer sidebands 6, 8 containing portions of the old data signals recorded in the data track by the (wider) read/write head (not shown) of the lower-capacity disk drive. If the removable cartridge with the new data recorded on it is subsequently removed from the higher-capacity disk drive and reinserted into the lower-capacity disk drive, these inner and outer sidebands will create interference during the read operation in the lower-capacity drive. Stray or random flux reversals in the sidebands will impact on the lower-density read/write head as it passes over the data recorded by the high-density head, leading to spurious or corrupted data readings.

Techniques have been developed to eliminate sideband interference in lower-capacity removable cartridges containing data re-recorded with a higher-density read/write head. For example, the SyQuest Model SQ5110C disk drive manufactured by the assignee of the present invention can accept 88 Megabyte removable cartridges designed for the SQ5110C drive and 44 Megabyte cartridges designed for older SyQuest disk drive products. When new data is to be stored on the disk of a lower-capacity 44 MB cartridge using the higher-density SQ5110C read/write head, the SQ5110C drive first performs a DC erase of the old data originally recorded on the 44 MB disk by the old, lower-density read/write head. As shown in FIGS. 2A-2B, erasing is accomplished by injecting a "static" or DC offset signal into the track following feedback loop of the SQ5110C drive so as to reposition the smaller, higher-density SQ5110C head over the inner and outer sidebands of each data track during erase operations.

The "static" offset injection of the SQ5110C disk drive works well as long as the ratio between the higher-density head width and the lower-density track pitch is relatively small. However, if the higher-density head width becomes too small relative to the lower-density track pitch, errors can arise from the servo operation performed by the track following feedback loop in the disk drive, depending upon the servo technique utilized for track following. To understand how this happens, further reference is had to FIG. 1A.

Many removable cartridge disk drive products employ the well-known embedded A/B servo burst scheme for track following. FIG. 1A shows an A/B type servo pattern followed by a data field recorded on the surface of the disk in the lower-capacity cartridge. Due to the radial displacement of the "A" burst relative to the "B" burst in a given servo sector, the "A" and "B" bursts are displaced on either side of the track centerline. When the head is positioned exactly over track centerline, approximately one-half of the "A" burst will be read followed by one-half of the "B" burst in a time displaced fashion. As the head moves off the centerline of a track, the amplitude of one burst decreases while the amplitude of the other burst increases depending on the direction of misalignment. In this manner, a position error signal can be derived from the relative amplitudes of the bursts by rectifying and peak detecting the readout from the head as it passes over the "A" and "B" bursts, and determining the difference in amplitude between the bursts.

Where the width of the higher-density read/write head 4 is significantly less than the pitch of lower-density track 2, an A/B burst amplitude reading of the type depicted in FIG. 1B will be produced. FIG. 1C illustrates a typical A/B servo feedback waveform derived from the A/B burst amplitude pattern of FIG. 1B. As can be observed in both FIGS. 1B and 1C, the relatively small head width of higher-density read/write head 4 produces saturation regions 10 in the A/B burst amplitude signal and A/B servo feedback waveform generated by the track following circuitry. These saturation regions contain no useful servo information, inasmuch as any shifting of the read/write head relative to track centerline which occurs while the head is in the saturation region produces no change in the A/B servo feedback waveform and therefore cannot be detected.

The difficulties encountered in using the prior art static offset technique to eliminate sideband interference when a higher-density head writes data over a lower-density data track become more apparent upon consideration of FIG. 2C. As can be seen in FIG. 2C, application of the static offset to eliminate the sideband on either side of track centerline produces a constant state offset condition wherein the higher-density head is located along a region of the A/B servo feedback waveform unacceptably near the saturation region of the waveform. Small deviations from the optimum head offset position during the sideband erasing operation can move the head into the saturation region, resulting in no useful feedback and, in effect, loss of servo capability.

A solution to the described interference problem is accordingly necessary if true downward compatibility for older cartridges recorded in lower-capacity disk drives is to be achieved in higher-capacity disk drives.

Another problem in the art is the difficulty of the disk drive to determine initially which capacity of disk has been inserted into the drive. This problem is compounded by the fact that track density, bit density and control format may vary from cartridge to cartridge depending on storage capacity. The disk drive may not be able to read or write information until it successfully identifies the type of cartridge that has been loaded. One technique developed to enable disk drives to distinguish between disks is the placement of a mechanical feature (such as a slot) on the disk and the use of a dedicated sensor to read and interpret the mechanical feature. However, the use of a dedicated sensor requires extra components and prevents the use of a uniform physical cartridge for all storage capacities. It would therefore be advantageous to have a disk drive system capable of distinguishing between cartridges of different storage capacities without requiring the use of a dedicated sensor in the disk drive or a mechanical feature on the cartridge, and which can distinguish cartridges rapidly so as not to cause annoying delay to the user.

SUMMARY OF THE INVENTION

It is therefore an object of the present invention to provide a higher-capacity disk drive with downward compatibility relative to removable cartridges originally adapted for lower-capacity disk drives. This object is achieved through the use of disk drive circuitry which contains multiple read/write channels. Upon insertion of a removable disk cartridge into the disk drive mechanism, the disk drive circuitry detects the cartridge storage capacity and selects a read/write channel appropriate for that capacity. Differentiation among the various types of removable cartridges is achieved by detection and identification of different servo patterns and other control information permanently inscribed on the cartridge disk.

In order to eliminate sideband interference problems, an erase operation is performed on the disk in the lower-capacity cartridge prior to recording data with the higher-density read/write head. The erase operation involves injecting a dynamic offset into the track following feedback loop associated with the lower-capacity read/write channel in the higher-capacity disk drive circuitry. This dynamic offset causes the higher-density read/write head to "dither" across the sidebands such that repeated passes of the higher-density head in erase mode across the inner and outer sidebands eliminates all traces of the old data recorded in the data track by the lower-density read/write head.

Write operations utilizing the higher-density disk drive head are thereafter performed in normal fashion. When the lower-capacity cartridge is removed from the higher-capacity disk drive following write or data recording operations, the lower-capacity cartridge can be reinserted in a lower-capacity drive and the newly recorded data read by the lower-density read/write head without sideband interference.

BRIEF DESCRIPTION OF THE DRAWINGS

The various objects, features and advantages of the present invention may be better understood by examining the Detailed Description of the Preferred Embodiments found below, together with the appended figures, wherein:

FIGS. 9A–9C are diagrams of control information formats for particular disk cartridges of three different capacities.

DETAILED DESCRIPTION OF THE PREFERRED EMBODIMENTS

Figure 7A:
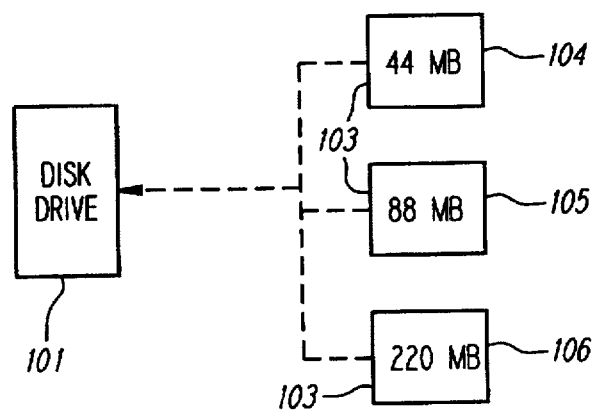
FIG. 7A is a block diagram of a disk drive system adapted for use with three particular disk cartridge sizes.

In a preferred embodiment of a disk drive system shown in FIG. 7A, a disk drive 101 is provided having the ability to read from and write to removable disk cartridges 103 of different storage capacities. For example, the disk drive 101 may be capable of reading from and writing to a lowest-capacity removable disk cartridge 104, an intermediate-capacity removable disk cartridge 105, and a higher-capacity removable disk cartridge 106. In a preferred embodiment, the lowest capacity removable disk cartridge may have a capacity of 44 megabyte ("MByte" or "MB"), the intermediate-capacity removable disk cartridge may have a capacity of 88 Mbyte, and the higher-capacity removable disk cartridge may have a capacity of 200 MByte.

Figures 1, 7B:
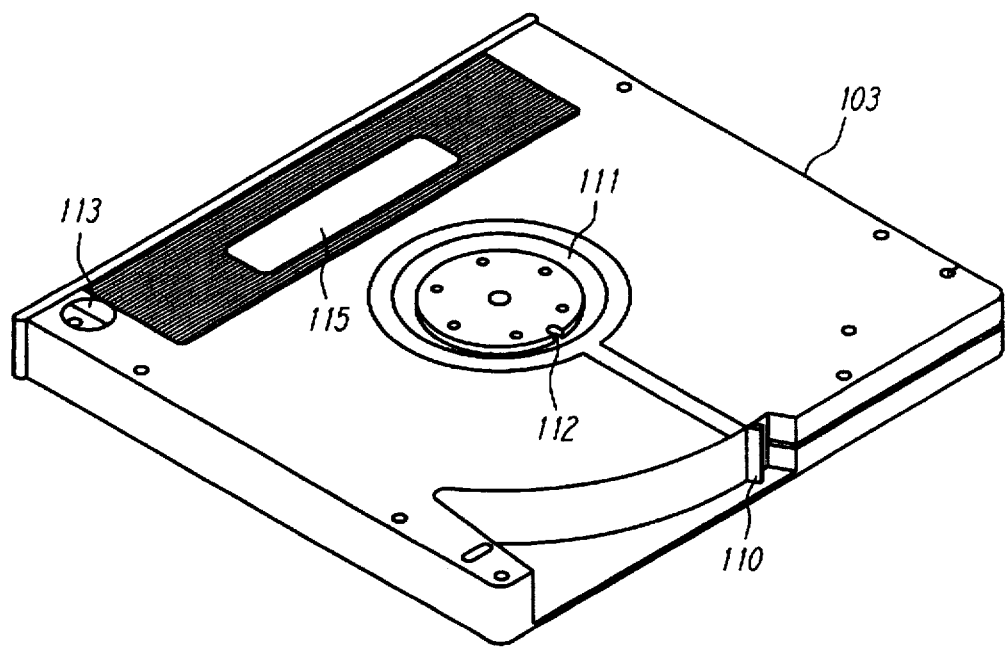
FIGS. 7B–7C are diagrams of an exemplary removable disk cartridge.
Figures 2, 7B:
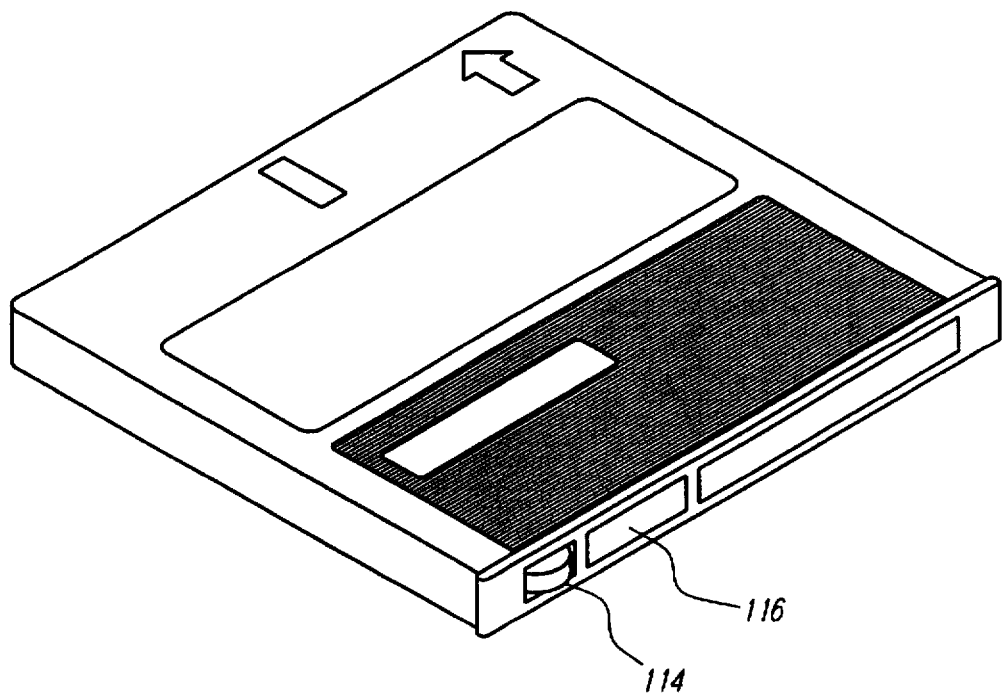
Figures 1, 7C:
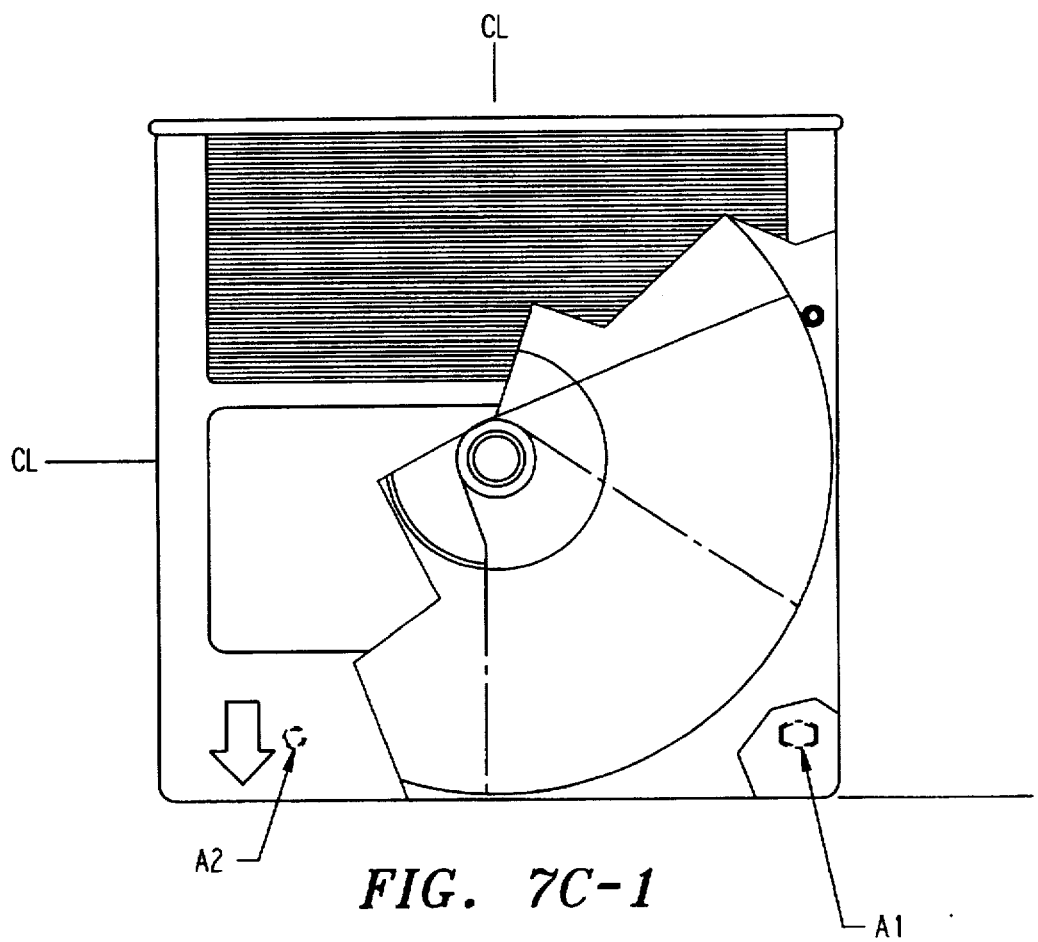
Figures 2, 7C:
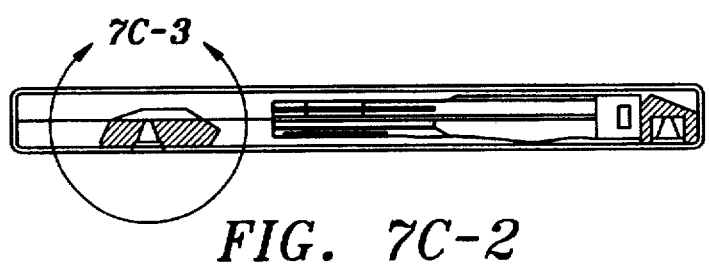

An exemplary removable disk cartridge 103 is shown in the diagrams of FIGS. 7B and 7C. The removable disk cartridge 103 comprises a retractable head access door 110 for allowing a read or write head (not shown) of the disk drive 101 access to the storage medium. The removable disk cartridge 103 further comprises an armature plate 111 and an index slot 112. A write protect selector 113 may be activated manually to prevent overwriting existing information on the storage medium. Whether or not the write protect selector 113 is set may be indicated by a write protect indicator 114 located at a convenient area of the removable disk cartridge 103. The cartridge may bear a cartridge bar code label 115 for identifying the disk or the contents of the disk, and may further bear a cartridge capacity label 116 indicating the maximum storage capacity of the removable disk cartridge 103.

Further details of the removable disk cartridge 103 are shown in a cross sectional view thereof in FIG. 7C.

Because removable disk cartridges 103 of various sizes may be read by the same disk drive 101, the different cartridges 103 must be physically compatible with one another even though their storage capacities may vary. As a consequence of physical size uniformity among the different cartridges, the area of magnetic medium available for storage is generally the same for all of the cartridge sizes which are to be compatible with one another. In order to increase data storage capacity on a removable disk cartridge 103 without increasing physical size, it is therefore usually necessary to decrease the storage space required for individual bits of information.

Two parameters principally define the storage capacity of a removable disk cartridge 103. These two parameters are the track density or number of tracks per inch ("TPI") and the bit density or number of bits per inch ("BPI"). The product of TPI and BPI defines the area density of a disk, and the product of the area density and the area of a disk defines the ultimate storage capacity of a disk:

Storage capacity=Disk area×(*BPI*×*TPI*)

Thus, an increase in either the number of tracks per inch or the bit density generally enlarges the ultimate storage capacity of a disk.

In a preferred embodiment, a lowest-capacity removable disk cartridge 104 comprises a low-density disk 130, an intermediate-capacity removable disk cartridge 105 comprises a mid-density disk 130, and a higher-capacity removable disk cartridge 106 comprises a high-density disk 130.

Figure 8:
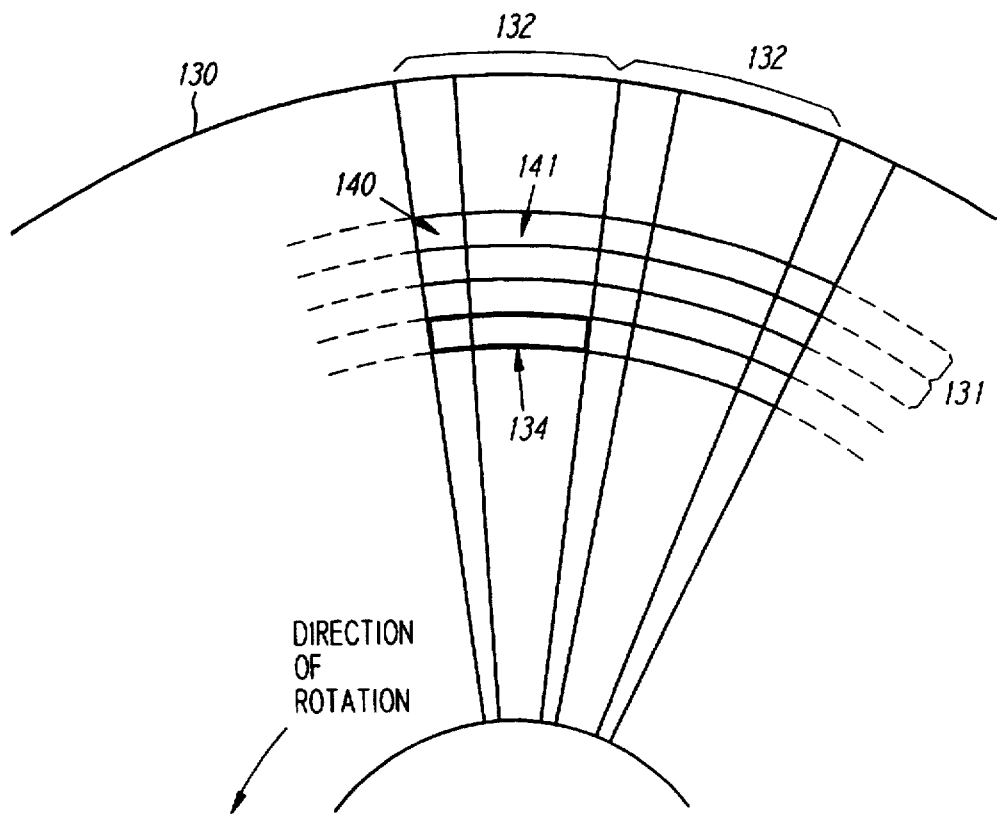
FIG. 8 is an abstract diagram of a disk showing a breakdown into tracks and sectors.

FIG. 8 is a top view of a cartridge disk 130 comprising a plurality of concentric tracks 131 for storing data. The tracks 131 radiate outward from the center of the disk 130. Each track 131 preferably has the same width, although the outer tracks 131 are longer than the inner tracks 131. The greater the track density, the smaller the width of each track 131.

The disk 130 is also divided into a plurality of sectors 132. A sector 132 comprises a roughly pie-shaped area of the disk 130, and thereby includes a plurality of segments 134 of the tracks 131 which it covers. Although the sectors 132 shown in FIG. 8 are adjacent to one another, the sectors 132 need not be contiguous but may be separated by a space. Further, the sectors 132 need not extend from the outer periphery of the disk 130 to the center of the disk 130, thereby covering segments 134 from all of the tracks 131, but instead may cover segments from a defined subset of the tracks 131.

Each track segment 134 preferably comprises a control region 140 and a data region 141.

The control region 140 comprises control information according to a specified format which allows the disk drive to locate data and follow a selected track 131. The control region 140 is pre-written on the disk 130 when manufactured, and is not overwritten by the user. The data region 141 comprises space on the magnetic medium available to the user to store information, and may be accessed through read and write operations by the user as desired.

Exemplary parameters for a preferred disk drive system appear in Table 8-1.

TABLE 8-1

| Capacity | TPI | Track Width (μ-inches) | Number of Sectors |
| --- | --- | --- | --- |
| 44 MB | 1090 | 920 | 70 |
| 88 MB | 1480 | 680 | 74/53 |
| 200 MB | 1880 | 540 | 72 |

As shown in Table 8-1, track width (also known as track pitch) for the various size disk cartridges 103 is not uniform but decreases proportionately as disk capacity increases. The number of sectors 132 is also not necessarily constant but may vary depending on storage capacity.

The number of sectors 132 may also vary depending on the distance from the center of the disk 130. Thus, in a particular embodiment, a disk 130 (such as in an 88 MB removable disk cartridge 105) is divided into two zones. In one zone, closest to the center of the disk 130, there are 53 sectors, and in another zone farther away from the center of the disk 130, there are 74 sectors.

Figure 9C:
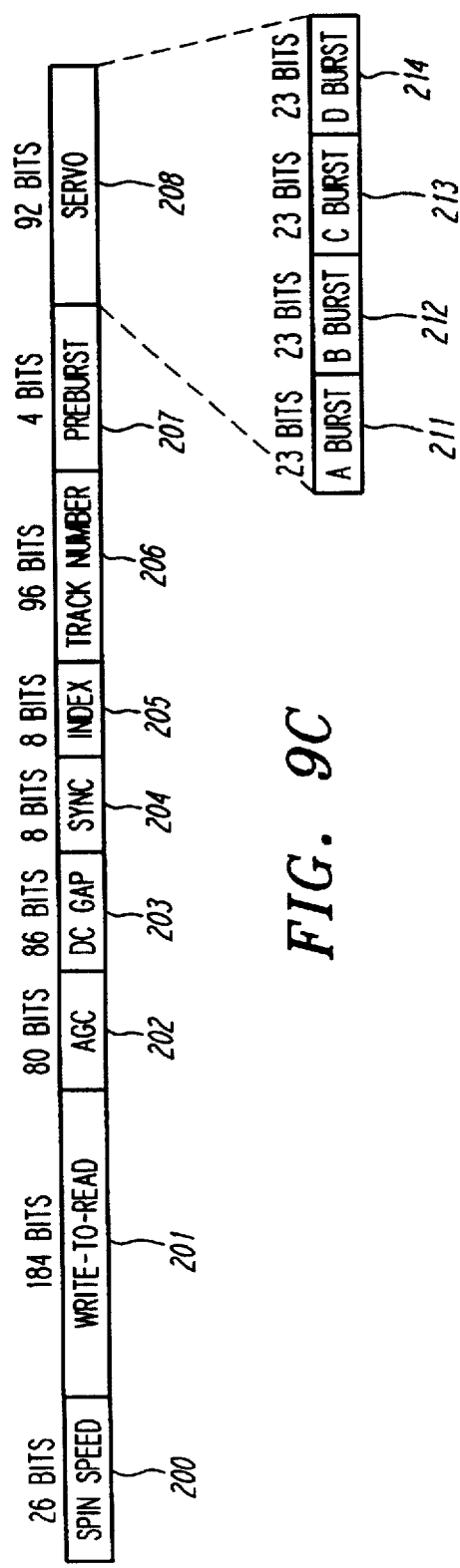

In addition to different physical parameters for different capacity cartridges 103, the format of control information in the control region 140 may differ for each capacity of cartridge 103 as well. Control information formats for each of a preferred 44 MB, 88 MB and 200 MB disk cartridge 103 are depicted in FIGS. 9A–9C, respectively.

FIG. 9A shows a format for control information in a control region 140 for a 44 MB removable disk cartridge 104. The format of FIG. 9A comprises a preamble 160, an ID field 161, a sync field 162, an index field 163, a track identification field 164, and a servo field 165. The preamble 160 may be 48 bits long; the ID field 161 may be 10 bits long; the sync field 162 and index field 163 may each be two bits long; the track identification field 164 may be 22 bits long; and the servo field 165 may be 24 bits long.

Tracks 131 are numbered sequentially from 0 to 1378. The track identification field 164 is used to identify the track 131 with regard to its sequential position, and comprises numerical data represented in Gray code. The track identification field 164 may also comprise sector identification information.

The servo field 165 comprises four sub-fields 170, which are denoted in FIG. 9A as two A-bursts 171 alternating with two B-bursts 172. Each A-burst 171 and each B-burst 172 is six bits long. Starting at track 0 and radiating outward, the A-bursts 171 form a repeating pattern from track to track, alternating between a first sequence for even numbered tracks 131 and a second sequence for odd numbered tracks. In a similar manner, the B-bursts 172 alternate from track to track between the same sequences, but in opposite order.

FIG. 9B is a diagram showing a format for control information in a control region 140 for an 88 MB removable disk cartridge 105. The format of FIG. 9B comprises a preamble 180, an ID field 181, a first gap 182, a sync field 183, an alignment field 184, an index field 185, a track identification field 186, a second gap 187, a servo field 188, and a third gap 189. The preamble 180 may be 96 bits long; the ID field 181 may be 52 bits long; the first gap 182, sync field 183, alignment field 184, and index field 185 may each be four bits long; the track identification field 186 may be 48 bits long; the second gap 187 may be 14 bits long; the servo field 188 may be 49 bits long; and the third gap 189 may be nine bits long.

The servo field 188 is comprised of two sub-fields 190, which are denoted in FIG. 9B as an A-burst 191 and a B-burst 192. The A-burst 191 comprises a sequence of 25 bits, while the B-burst 192 comprises a sequence of 24 bits. The A-burst 191 alternates from track to track between a first sequence for even numbered tracks 131, and a second sequence for odd numbered tracks 131. Likewise, the B-burst 192 also alternates from track to track between a first sequence for even numbered tracks 131, and a second sequence for odd numbered tracks 131.

Each bit or flux transition in the A-burst 191 or B-burst 192 may represent, for example, 100 nanoseconds for a disk spinning at a rate of 3220 RPM. The control region 140 for the format shown in FIG. 9B may therefore comprise 28.4 microseconds of information (i.e., for 284 bits of control information).

FIG. 9C is a diagram showing a format for control information in the control region 140 for a 200 MB removable disk cartridge 106. The format of FIG. 9C comprises a spin speed field 200, a write-to-read field 201, an automatic gain control (AGC) field 202, a DC gap 203, a sync field 204, an index field 205, a track number field 206, a preburst field 207, and a servo field 208. The spin speed field 200 may be 26 bits long; the write-to-read field 201 may be 184 bits long; the AGC field 202 may be 80 bits long; the DC gap 203 may be 85 bits long; the sync field 204 and the index field 205 may each be 8 bits long; the track number field 206 may be 96 bits long; the preburst field 207 may be 4 bits long; and the servo field 208 may be 92 bits long.

The servo field 208 comprises four sub-fields 210, which are denoted in FIG. 9C as an A-burst 211, a B-burst 212, a C-burst 213, and a D-burst 214. Unlike the control formats for the 44 MB removable disk cartridge 104 or the 88 MB removable disk cartridge 105, the control format for the 200 MB removable disk cartridge 106 of FIG. 9C has C and D servo bursts in addition to A and B servo bursts. Each of the sub-fields 210 is 23 bits long and forms a repeating pattern alternating from track to track.

Each bit or flux transition in the control information of FIG. 9C may represent, for example, 62.5 nanoseconds for a disk spinning at a rate of 3220 RPM. The control region 140 for the format shown in FIG. 9C may therefore comprise 36.4375 microseconds of information (i.e., for 583 bits of control information).

Control information in the control region 140 is used by the disk drive 101 for a variety of purposes, including operations of track seeking and track following. Track seeking is the process of selecting and finding one track from among a plurality of tracks 131 for reading and/or writing, while track following is the process of staying aligned with the track once it is selected.

To expedite track seeking, the tracks 131 are identified in consecutive numerical order from the outermost track to the innermost track. The identifying number of each track is represented in Gray code, a well known numerical encoding system in digital applications. Each Gray code address comprises a sequence of 1's and 0's and differs from the immediately preceding Gray code address by the change of only a single digit.

Figure 10:
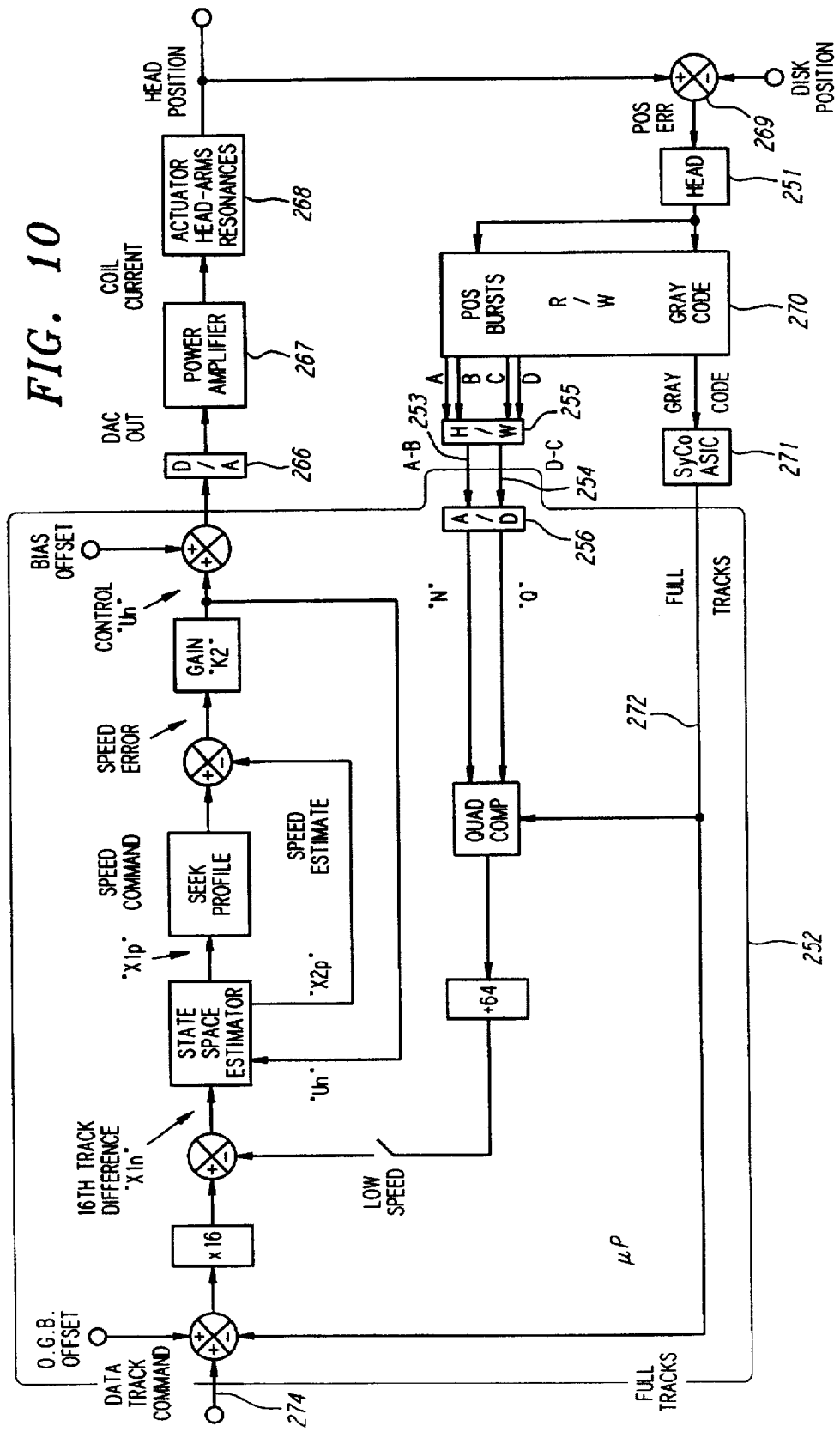
FIG. 10 is a circuit block diagram of a track seeking servomechanism.

FIG. 10 is a circuit block diagram of a track seeking servo-mechanism, using conventional engineering symbology. The track seeking digital servo-mechanism comprises a head 251 for reading to and writing from the disk 130. In operation, as the disk 130 rotates, the head 251 is extended over the disk 130 for reading the information stored thereon. The head 251 periodically reads control information, including Gray code track addresses and servo bursts located in the control regions 140 prewritten on the disk 130. The Gray code addresses provide an indication of the present location of the head 251. As the head 251 approaches the desired track 131, the velocity of the head 251 is reduced until the head 251 comes to rest over the desired track 131, and track following algorithms are employed to maintain the position of the head 251 over the selected track 131.

Figure 15:
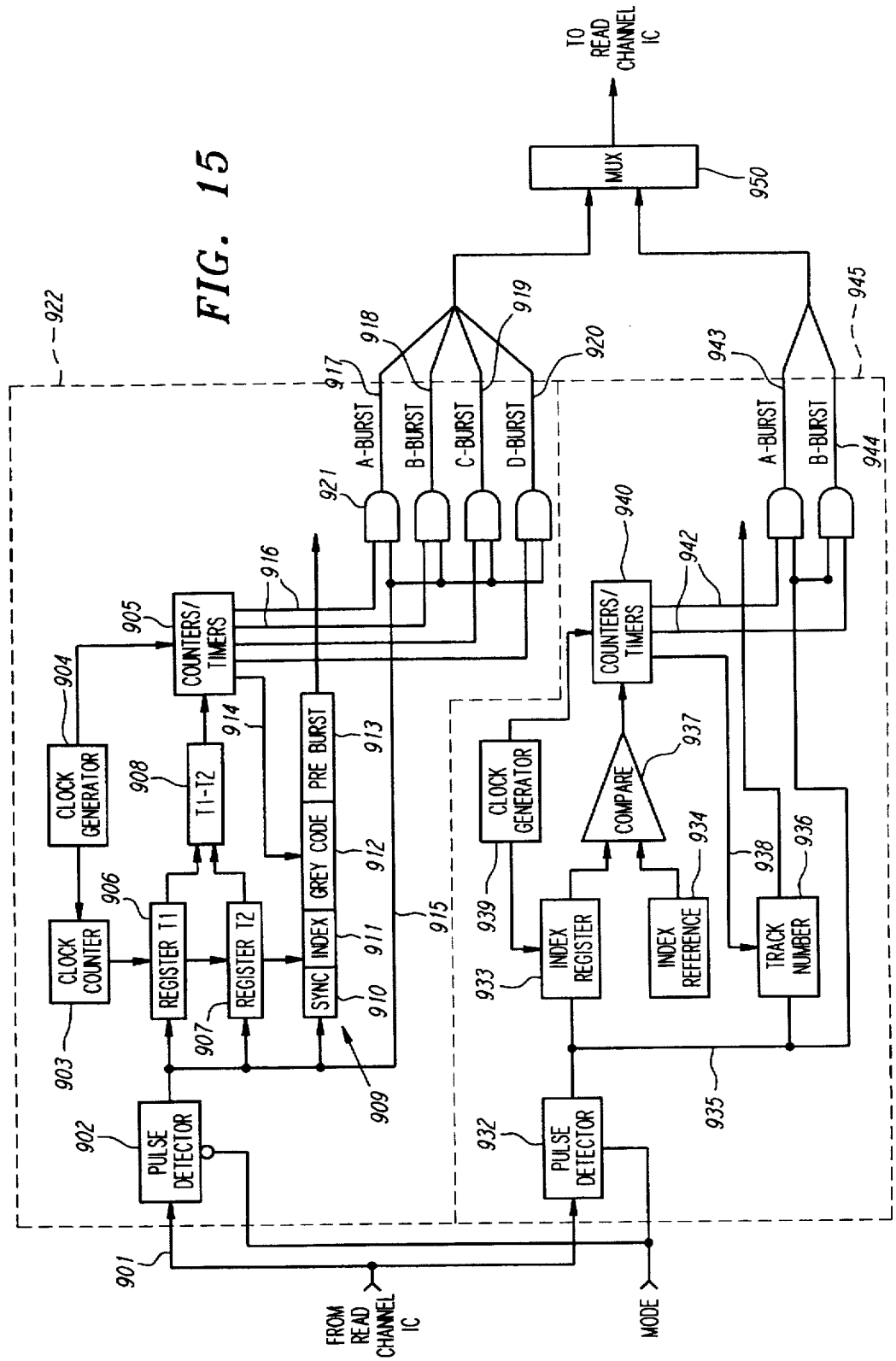
FIG. 15 is a block diagram of a circuit for processing control information read from a disk cartridge.

Information read by head 251 is provided to a control information parsing block 270, which may be embodied using some or all of the features shown in FIG. 15 and explained elsewhere herein. The control information parsing block 270 separates the control information into its various constituent parts, including the Gray code indicating the present track location. The control information parsing block 270 reads the servo control bursts, such as the A-burst, the B-burst, the C-burst, and the D-burst, and provides the servo information to a servo error feedback signal generator block 255. The servo error feedback signal generator block 255 provides servo error signals 253 and 254 to a microprocessor 252. The first servo error signal 253 is derived from the A-burst and the B-burst, while the second servo error signal 254 is derived from the C-burst and the D-burst. For systems using only two servo bursts instead of four servo bursts, only one servo error signal may be generated.

The microprocessor 252 comprises an analog-to-digital (A/D) converter 256 which receives the servo error signals 253, 254 and converts them into digital form. The Gray code output by the control logic block 270 is provided to an ASIC 271, which may perform operations such as stripping off sector information if necessary and translating the Gray code address into a binary or base-two numerical track value 272. The track value 272 is also provided to the microprocessor 252. The microprocessor uses the information input through the A/D converter 256 and provided by the ASIC 271 to perform feedback control of the head in a manner well known in the art, based on an input track command 274.

The microprocessor 252 outputs a head position command to a digital-to-analog (D/A) converter 266. The D/A converter 266 provides the converted head position command to a power amplifier 267, which generates a control signal to control an actuator or other component associated with the head 251, and thereby adjust the head position over the desired track.

Track following is accomplished using control information, primarily a repeating pattern of A/B servo information or A/B/C/D servo information (depending on the capacity of the cartridge 103), written on each disk 130 in the control region 140. Track following circuitry 36 (see FIG. 3A), for example, associated with the lower-capacity read/write channel in the disk drive of the present invention functions in a manner understood by those skilled in the art to ensure accurate positioning of the read/write heads over the specified data tracks on the surfaces of the disk in the cartridge during read and write operations.

Figure 1A:
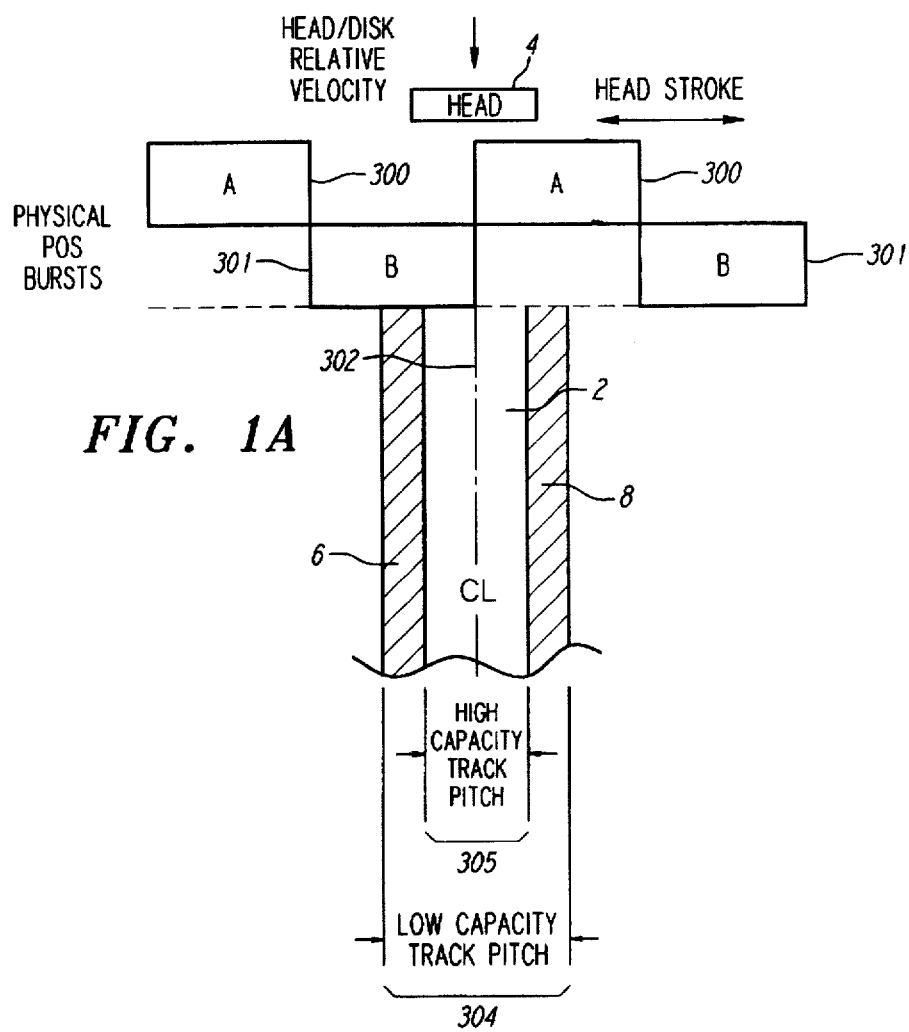
FIG. 1A is a representative view of a data track recorded on the surface of a disk in a lower-capacity removable disk cartridge, showing the dimensional relationship between a higher-density read/write head and the lower-density track pitch, and also showing a typical A/B servo pattern recorded on the disk surface by a lower-density read/write head.

Referring once again to FIG. 1A, depicting a portion of the magnetic medium, there is shown an A region 300 and a B region 301. The border between the A region 300 and the B region 301 defines the center of a track 302. A data region 302 follows the A and B regions 300, 301, and may also follow a gap (not shown). In the example of FIG. 1A, the A region 300 precedes the B region 301 and occurs once for a given track 131 in the control region 140 of each sector 132.

Generally, in even numbered tracks, the amplitude of the "A" burst increases as one moves toward the outer diameter of the disk while the amplitude of a "B" burst increases as one moves toward the inner diameter. The reverse is true for odd numbered tracks; that is, the amplitude of the "B" burst increases as one moves toward the outer diameter of the disk while the amplitude of a "A" burst increases as one moves toward the inner diameter. The track number usually increases as one moves from the outer diameter to the inner diameter. Of course, known exceptions to these generalities exist, and the present invention in its various embodiments, with appropriate changes, applies to these exceptions as well.

In operation, a read/write head 4 traverses the magnetic medium in an attempt to read or write information along a particular track 131. The disk 130 is rotated in a direction such that the head 4 first traverses the A region 300, reading magnetic information, and then the B region 301, reading further magnetic information. By comparing information from the A region 300 and the B region 301, the disk drive 101 determines if the head 4 is on track.

To prevent the head 4 from reading extraneous data located on adjacent tracks 131, the width of the head 4 is preferably some fraction, such as 80%, of the width of the track 131. A head width of less than full track width also prevents the head 4 from overwriting the edges of adjacent tracks 131 during a write operation.

The A region 300 and B region 301 each comprise static magnetic data that is prewritten at the time of manufacturing on each disk 130. The magnetic data in each of A and B regions 300, 301 preferably comprises a predefined pattern of 1's and 0's (e.g., flux transitions or no flux transitions) otherwise referred to as a "burst", such as described previously with respect to FIGS. 9A–9C. The terms "A burst" and "B burst" are sometimes used to denote a reading of data in the A region 300 and a reading of data in the B region 301, respectively. The disk drive 101 may measure the energy of the A and B bursts (i.e., the area underneath the signal waveform) or, in a preferred embodiment, may measure and store the highest signal peak of each of the A and B bursts using a peak detector or similar conventional device.

As noted, the head 4 reads burst data first from the A region 300 and then from the B region 301. The head 4 typically does not remain precisely centered in the track 304, but may stray from the track center 302 from time to time during a reading or writing process. The A and B embedded servo data may be used to re-align the head 4 in the track center 302.

Figure 1B:
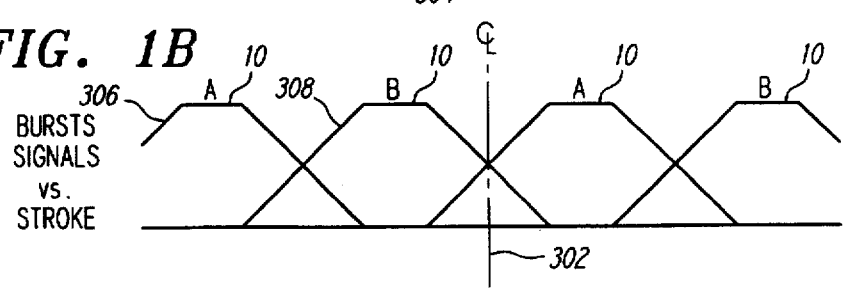
FIG. 1B depicts the A/B burst amplitude signal associated with the A/B servo pattern of FIG. 1A.

FIG. 1B is a graph showing how the amplitude of the A and B burst signals varies from the track center 302. In FIG. 1B, the amplitude 306 of the A burst, for example, increases until it reaches a maximum indicating a saturation region 10 when the head 4 is positioned at the edge of the track 304 (i.e., entirely within the A region 300). The A burst amplitude 306 then steadily decreases as the head 4 leaves the A region 300 and enters the adjacent B region 301. It may be observed that the A burst amplitude 306 overlaps with adjacent B burst amplitudes 308, due to the fact that the head 4 straddles at least part of an A region 300 and a B region 301 where the overlaps occur.

Figure 1C:
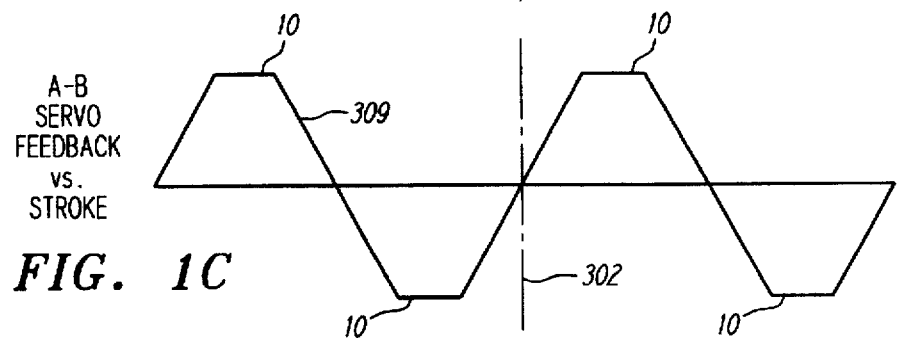
FIG. 1C depicts A/B servo feedback waveform associated with the A/B servo pattern of FIG. 1A.

The servo loop within the disk drive 101 preferably operates to prevent the head 4 from straying completely in either the A region 300 or B region 301 and thereby prevent saturation. More specifically, the servo loop measures the difference between the A and B amplitudes and generates a servo error signal indicative of the distance from the track center 302. FIG. 1C is a graph of an A/B servo feedback waveform 309 associated with the servo pattern of FIG. 1A. The servo loop within the disk drive preferably operates to provide track following correction prior to the head 4 reaching a saturation region 10, at which point useful feedback information is no longer provided to the disk drive 101.

Figure 11A:
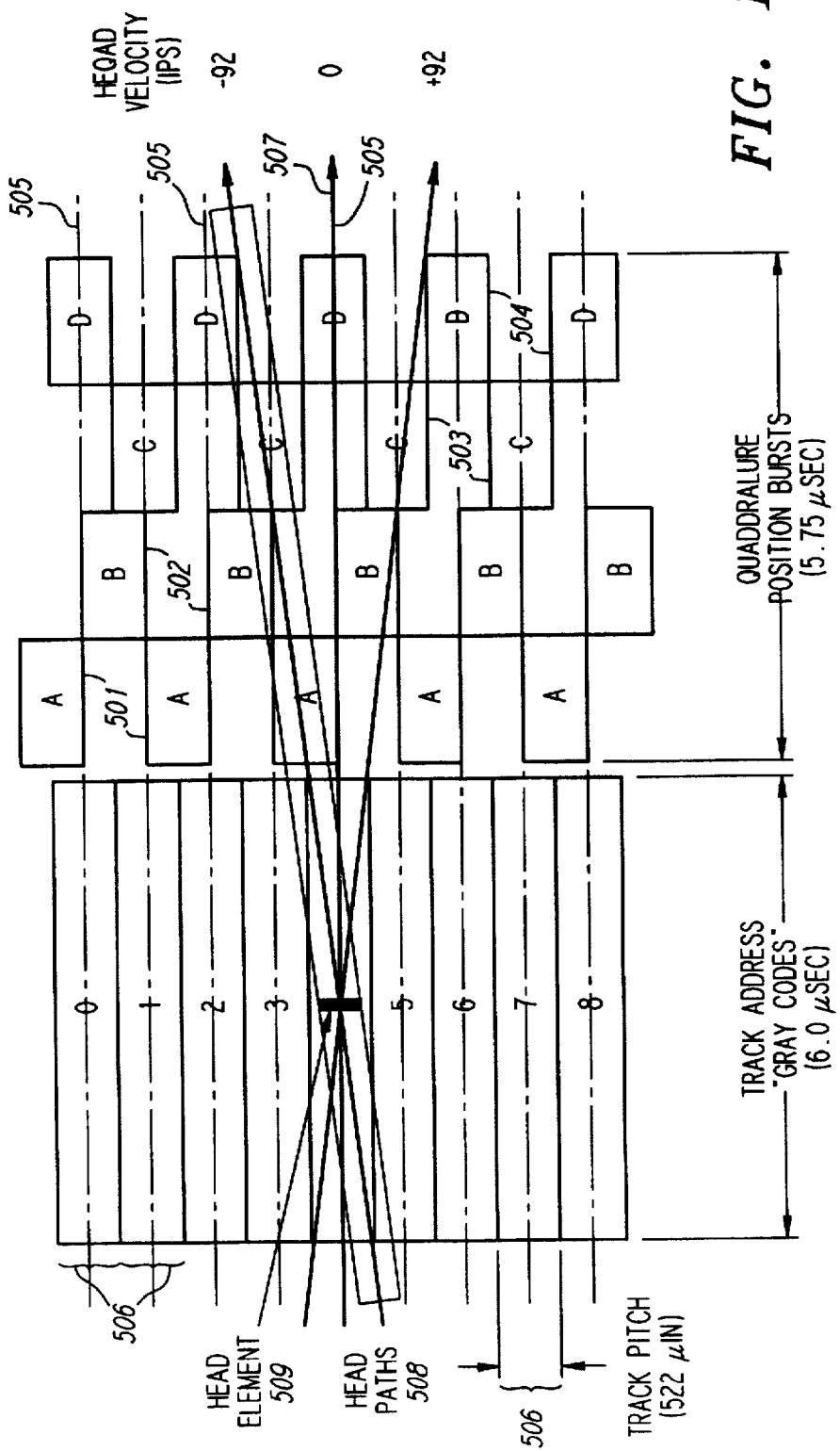
FIGS. 11A–11C are diagrams showing an embedded quadrature servo pattern and various waveforms and features associated therewith.

Some of the difficulties associated with track following may be overcome by using a different servo pattern which provides additional information to the control circuitry, such as the exemplary quadrature or A/B/C/D burst pattern depicted in FIG. 11A.

In a particular embodiment, the higher-capacity removable disk cartridge 106 has a sector format comprising a quadrature servo pattern such as that shown in FIG. 11A. The quadrature servo pattern comprises a plurality of temporally spaced magnetic regions, including A regions 501, B regions 502, C regions 503, and D regions 504. As with the A/B servo pattern, the border 505 between an A region 501 and a B region 502 defines the center of a track 506. The C region 503 generally appears immediately after the B region 502 and is offset therefrom by half of a track width, while the D region 504 generally appears immediately after the C region 503 and is offset therefrom by a full track width as shown in FIG. 11A.

Figure 11B:
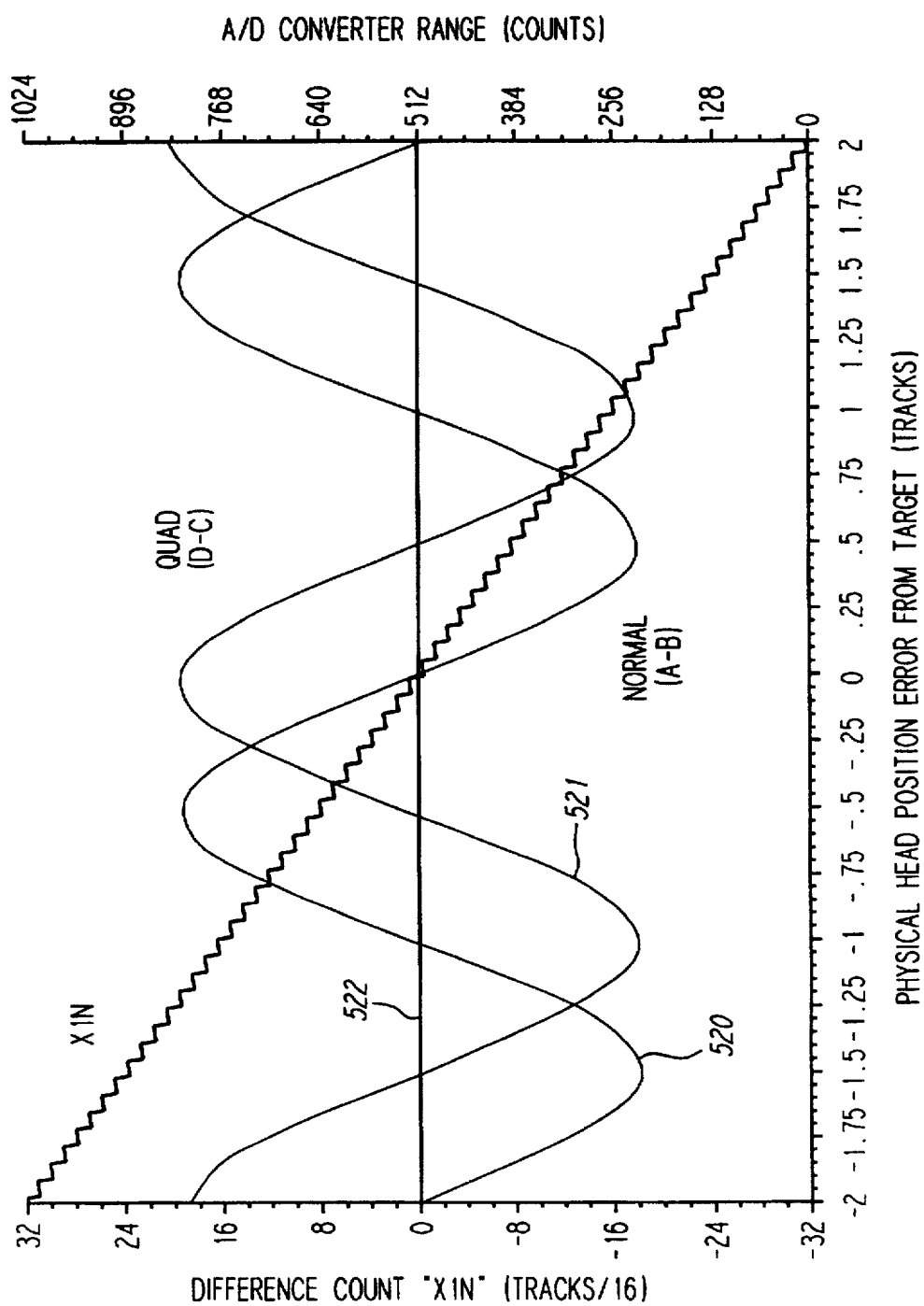

Several illustrative head paths 508 as may be associated with a read or write operation of a head element 509 are also depicted in FIG. 11A. Illustrative feedback signals and other waveforms associated with one of the head paths 507 are depicted in FIGS. 11B and 11C.

Figure 11C:
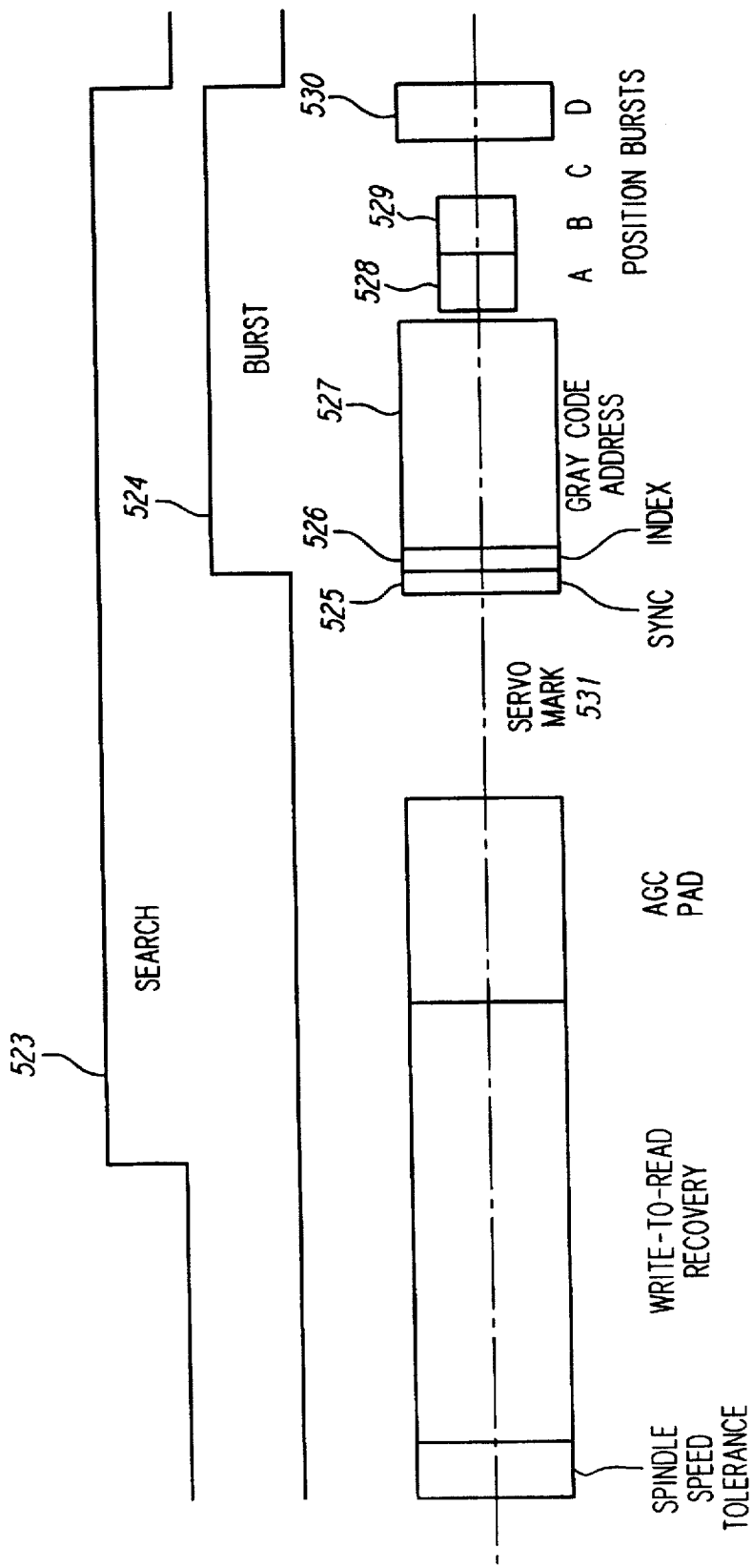

FIG. 11C is a timing diagram depicting the relative timing of certain waveforms in accordance with an exemplary head path 507 shown in FIG. 11A. A timing or search window, wherein servo information or other particular data may be searched for, is opened up by activation of a search signal 523 as may be provided by a microprocessor or other timing and/or control logic. Data from the disk is read until a servo mark 531 (e.g., such as the DC gap 203 shown in FIG. 9C) is recognized. Following the servo mark 531, a burst of control information is read. Following a sync burst 525 and an index burst 526 appears a Gray code address 527, corresponding to the track address 510 depicted in FIG. 11A preceding the quadrature burst pattern. Following the Gray code address 527 is a servo burst pattern as may be generated when the head traverses some or all of the quadrature servo regions 511 shown in FIG. 11A. The size of the rectangles 528, 529 and 530 are meant to illustrate the relative amplitudes or energy of the quadrature servo bursts.

For the particular head pattern 507 shown in FIG. 11A, the head 509 is centered in the middle of the track 506 so that the A burst 528 and the B burst 529 are roughly the same size. No servo burst (i.e., no rectangle) is shown for a C region 503 because, in the exemplary head pattern 507, the head 509 does not traverse a C region 503. Following the A burst 528 and B burst 529, and a gap 532, is a D burst 530. The amplitude or energy of the D burst 530 is roughly twice the amplitude or energy of the A burst 528 or B burst 529 because the head 509 traverses directly over the D region 504, rather than over merely some fraction thereof.

It can be seen that the quadrature burst technique generally provides additional useful information over the dual burst technique. In particular, use of C and D servo bursts provides the disk drive with information during times when the head may otherwise be near or in saturation using only A/B feedback. A graph of quadrature servo data is shown in FIG. 11B. An A/B differential or A/B servo error signal pattern 520 (e.g., representing A–B) is shown plotted as a function of distance from track center 505 and head position as the head 509 moves across tracks 506. Also depicted in FIG. 11B is a C/D differential or C/D servo error signal 521 (e.g., representing D–C) plotted as a function of head position as the head 509 similarly moves across tracks 506.

As shown in FIG. 11B, the A/B and C/D servo error signals 520, 521 are offset from one another, and one of the two signals 520 or 521 approaches zero when the other is at a maximum (e.g., potentially near saturation). Thus, when the A/B servo error signal 520 is close to saturation, the C/D servo error signal 521 is not saturated and may be used to provide useful feedback information pertaining to the head position and to guide the head 509 along the track center 505 or to a desired position. The quadrature burst technique is particularly useful for rapid track seeking, as it supplies additional feedback information to the disk drive as the head 509 searches for a specific desired track 506.

Figure 11D:
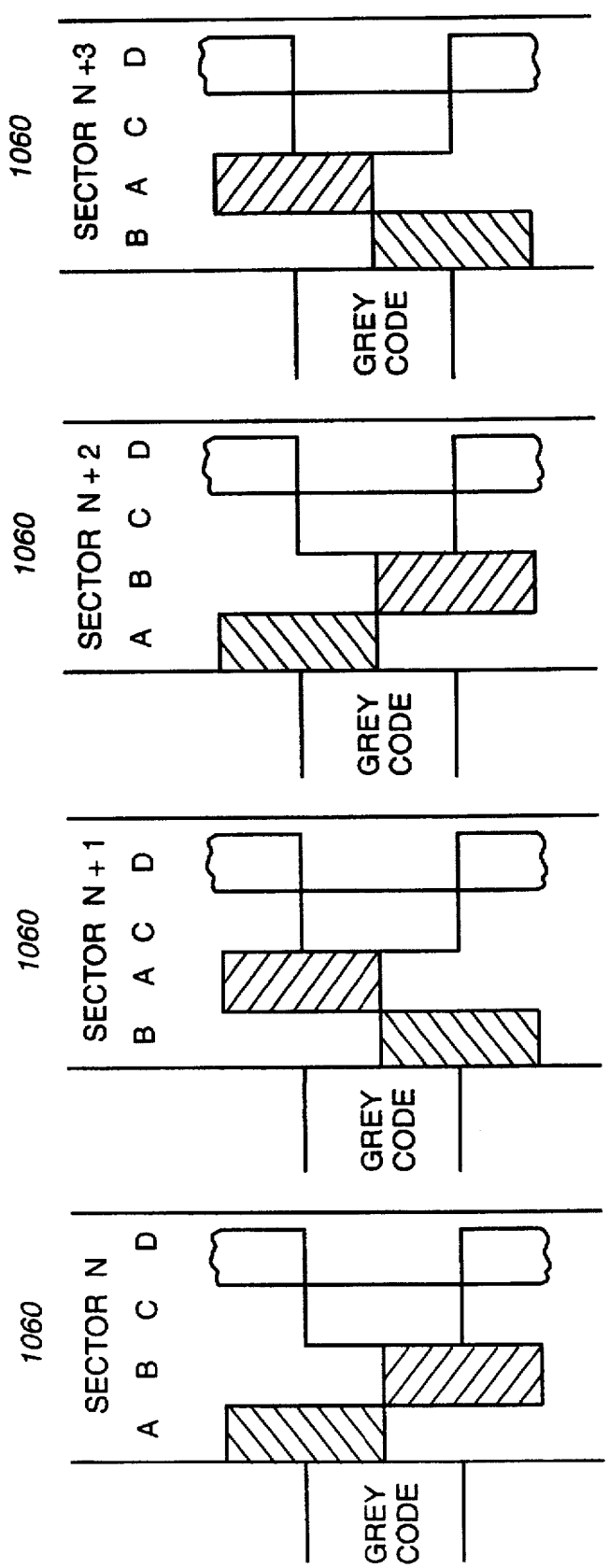
FIGS. 11D–11E are diagrams showing a preferred quadrature servo pattern and partial track layout.
Figure 11E:
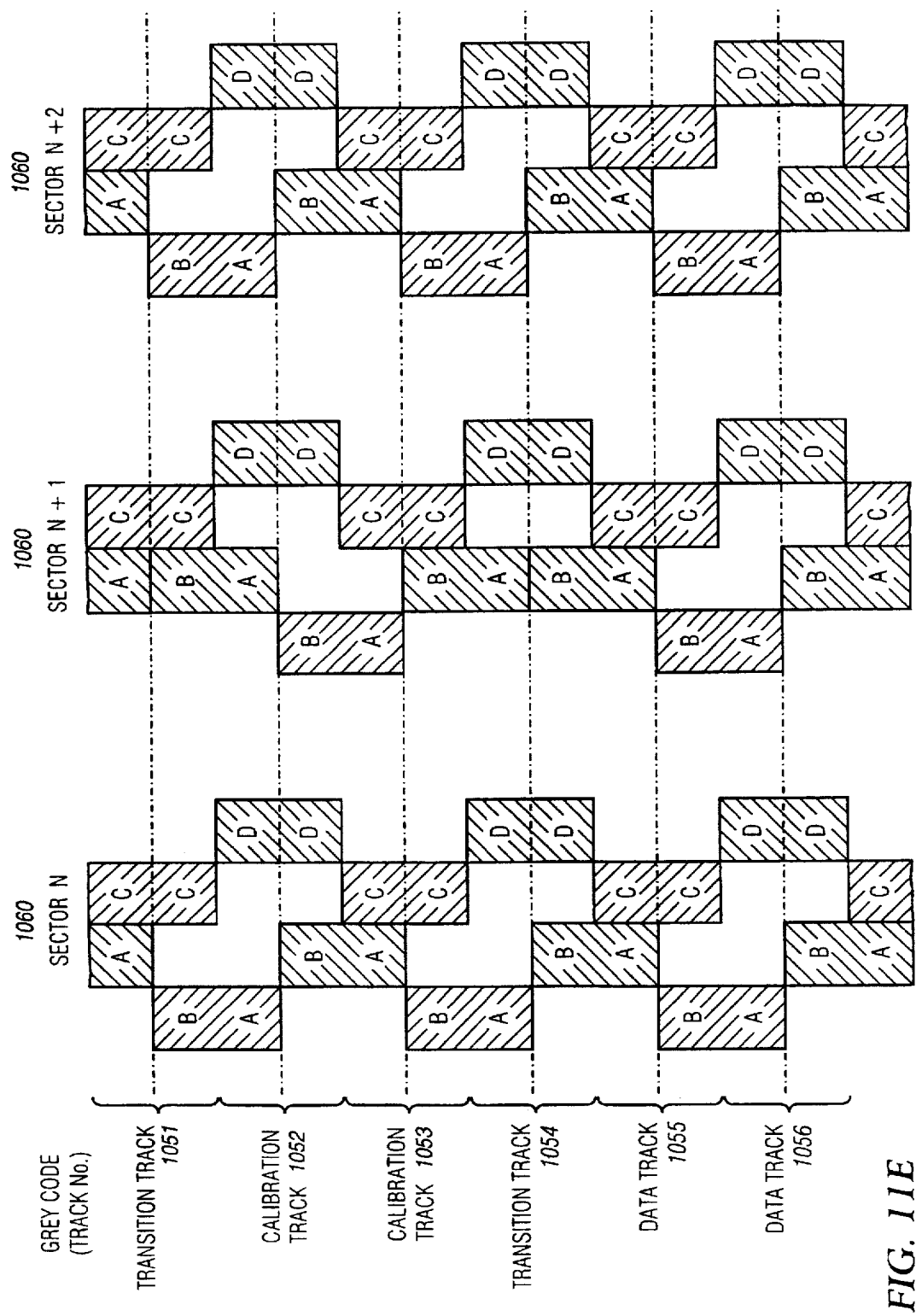
Figure 12A:
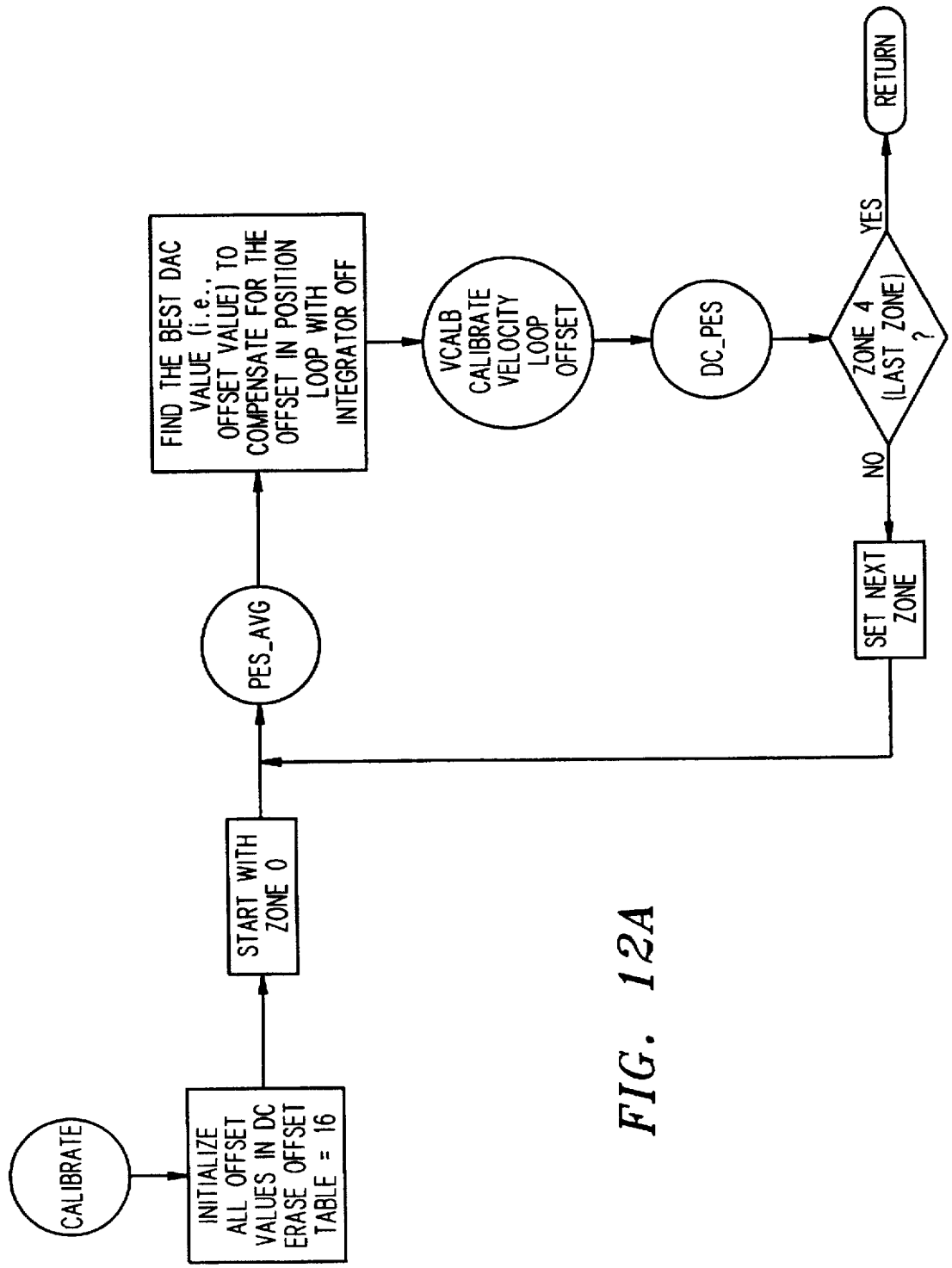
FIGS. 12A–12F are flow diagrams in accordance with a preferred calibration algorithm.
Figure 12B:
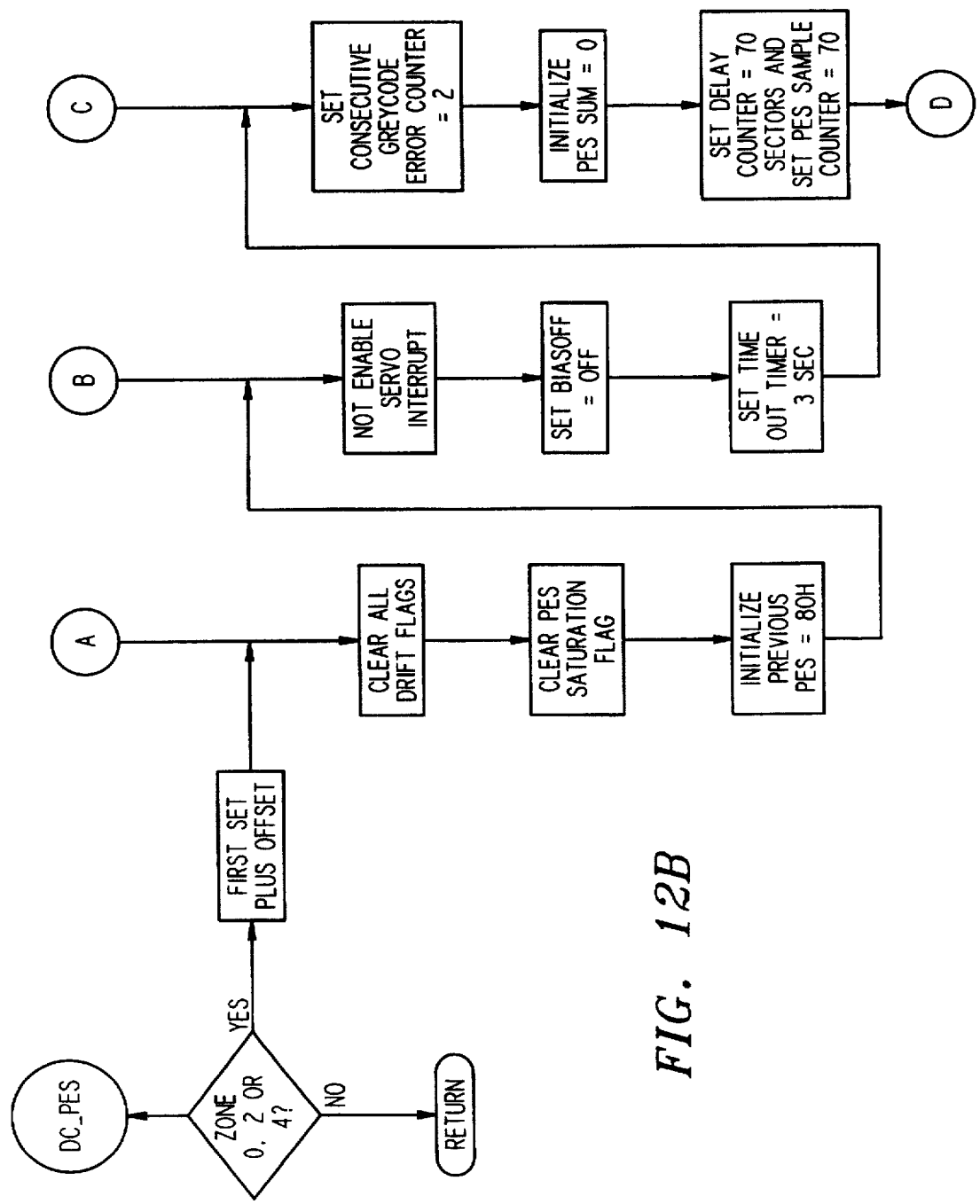
Figure 12C:
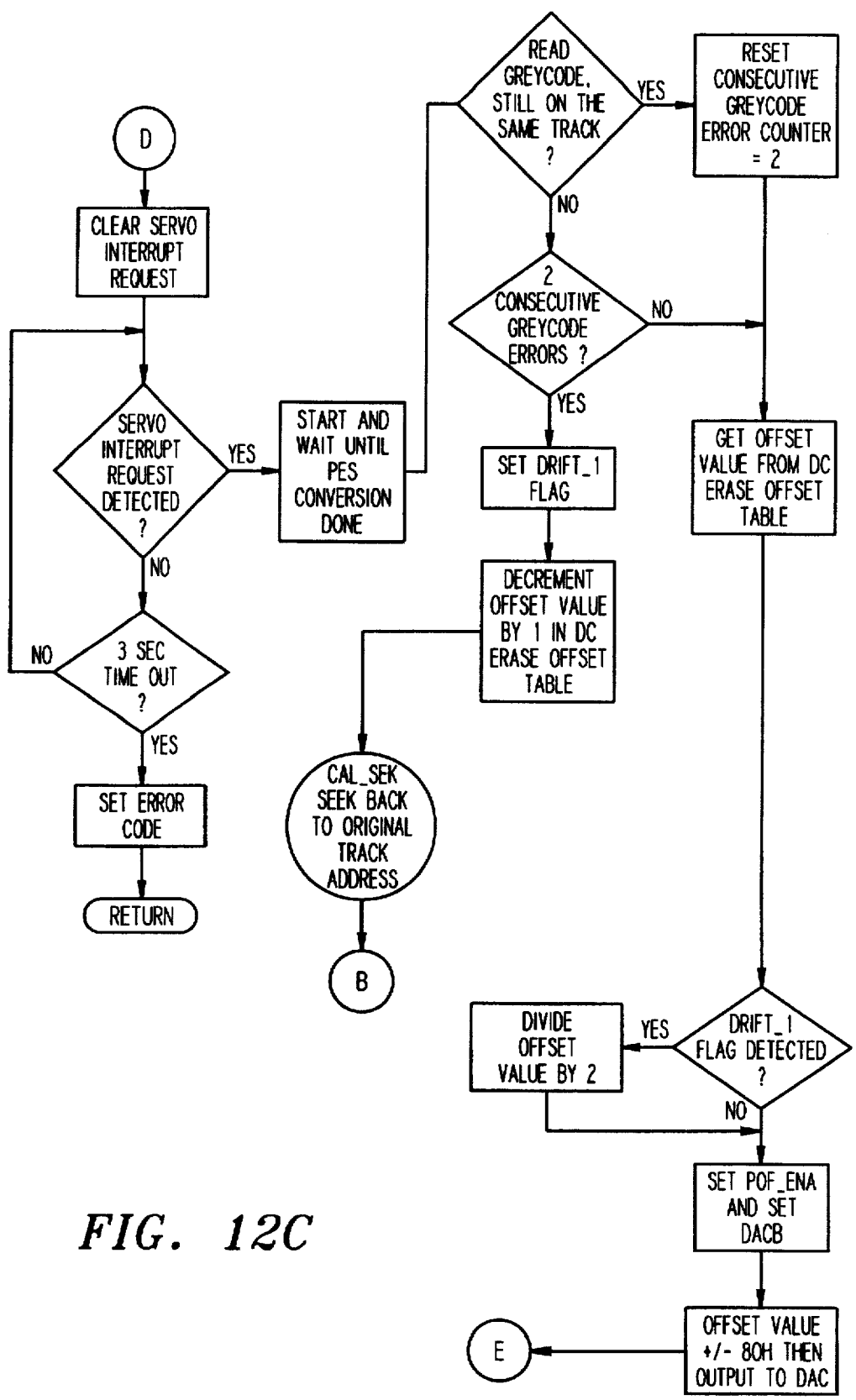
Figure 12D:
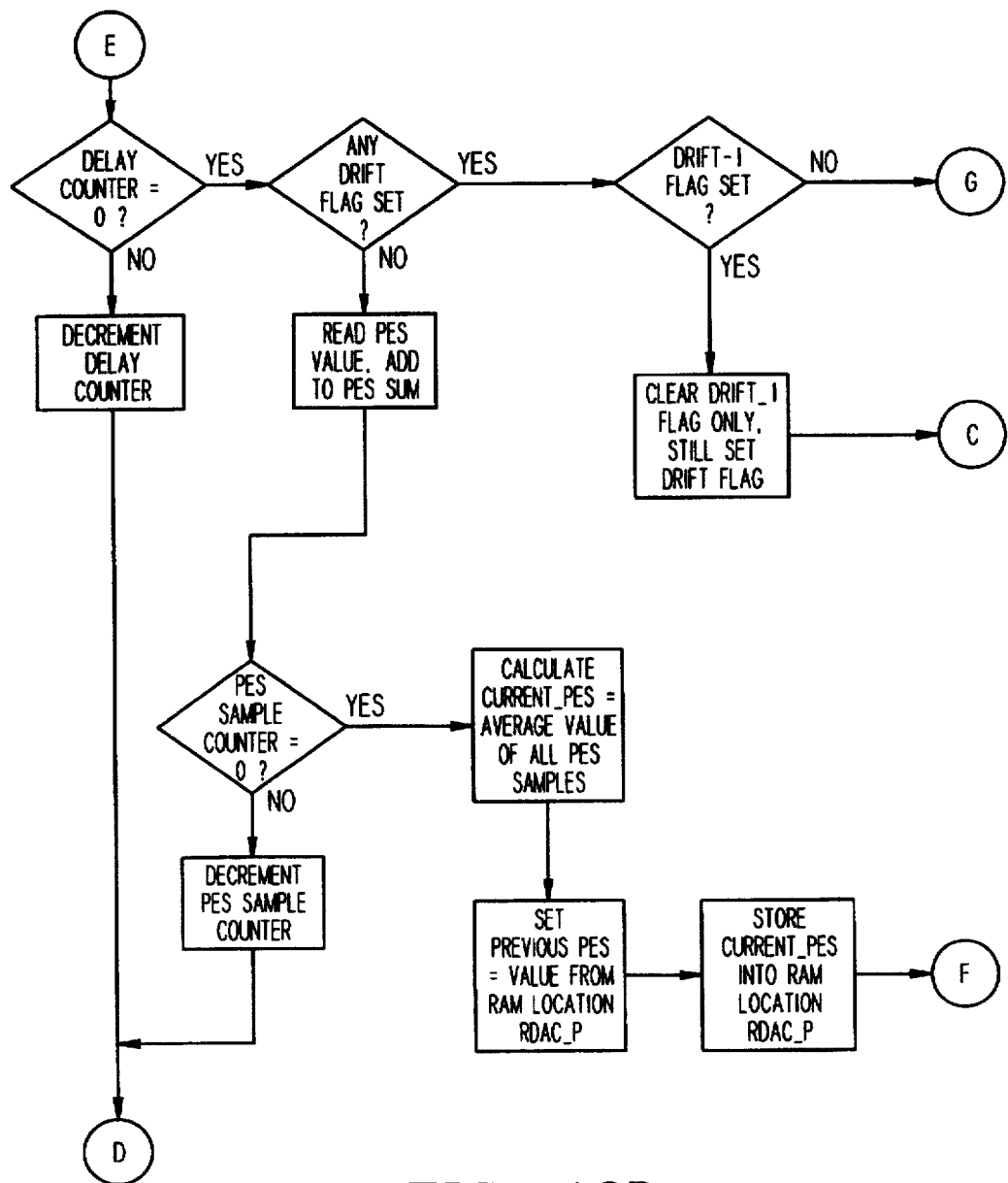
Figure 12E:
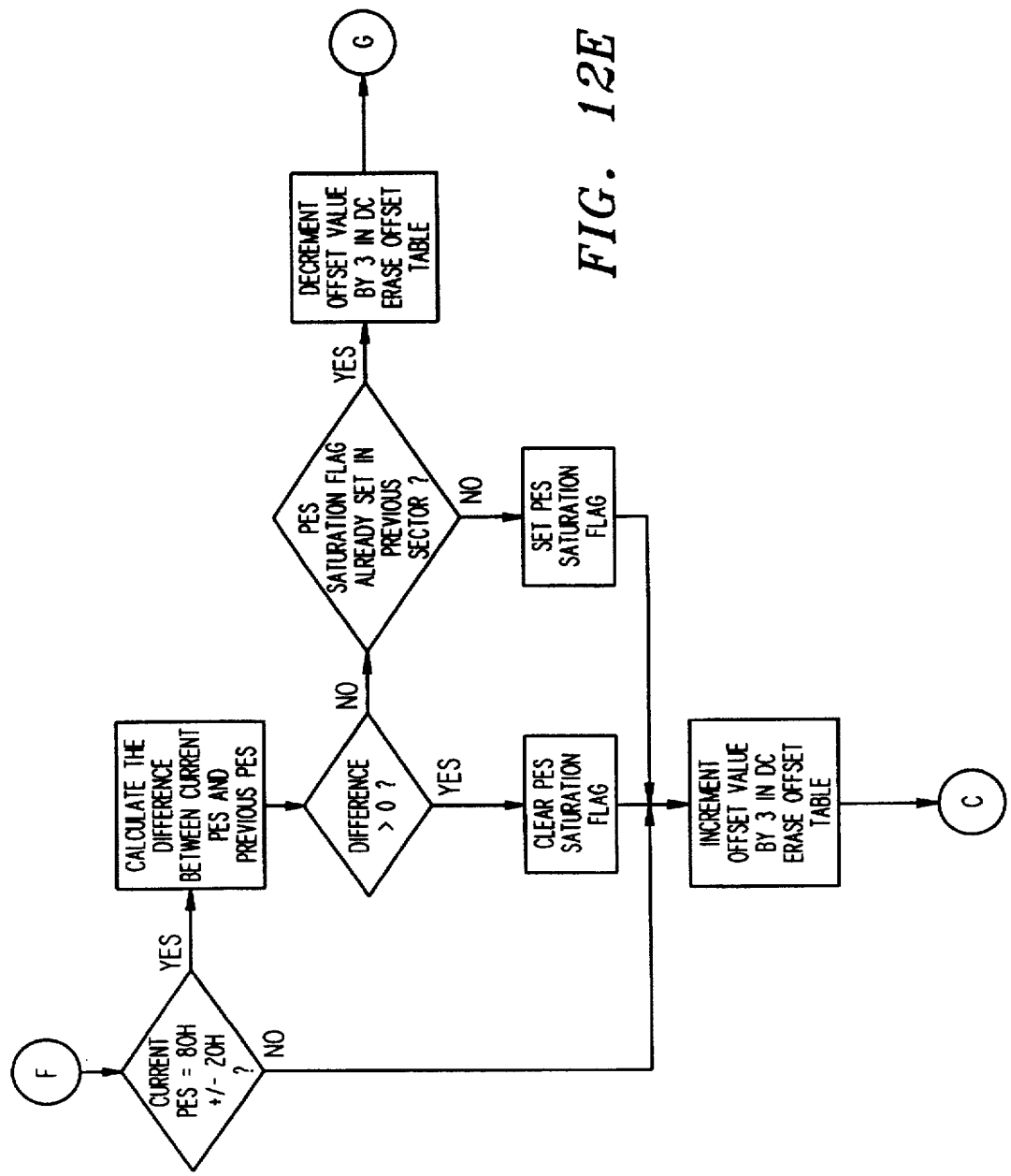
Figure 12F:
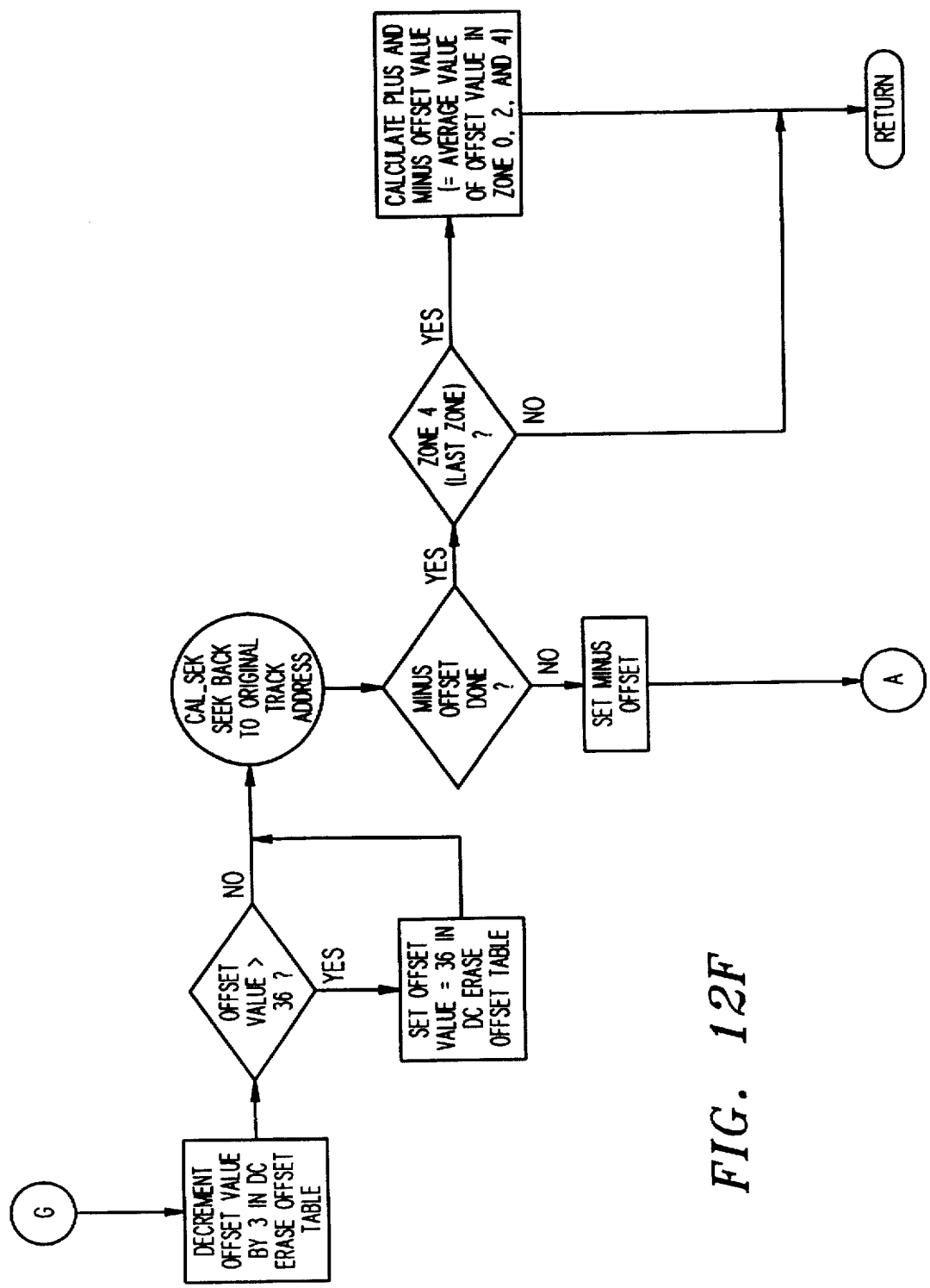

A preferred quadrature burst pattern and partial track layout are depicted in FIGS. 11D–11E. The particular burst pattern and track layout shown in FIGS. 11D–11E provide improved track following by reducing or eliminating offset errors in the servo position feedback signal caused by mismatches in the A and B magnetic burst patterns.

The problem of servo position offset error may be described in more detail as follows. The accuracy of the servo position error signal—that is, the degree to which the derived position error signal truly represents the misalignment between the head and the track centerline—is a function of magnetic matching between the A burst and B burst. The influence of surrounding magnetic patterns can cause distortions in the signal obtained from the read/write head as it reads the A and B bursts during servo operation.

Specifically, the A burst may be influenced by the magnetic transitions of a preceding Gray code or other neighboring fields, and by magnetic transitions which form the B burst on the opposite side following the A burst. Similarly, the B burst may be magnetically influenced by its surrounding neighbors including, for example, a preceding A burst on one side and a C burst following on the other side.

Because the A region is generally surrounded by a different magnetic environment than the B region, the A burst signal read by the read/write head is distorted in a slightly different fashion than the B burst signal. This difference in distortion skews the error signal generated when comparing the A burst with the B burst, and in turn impairs the ability of the servo system to precisely measure the extent of misalignment between the head and the track centerline. The effect is to cause the head to become offset by some amount from the nominal track centerline.

In order to cancel out the offset from nominal track centerline caused by differential magnetic distortion of the A burst relative to the B burst, an alternating sequence of A/B bursts is utilized in special calibration tracks 1052, 1053 such as shown in FIG. 11E.

In one calibration track 1052 of FIG. 11E, in a servo sector N, an A region is neighbored on the left by a Gray code and on the right by a B region. The B region in servo sector N is neighbored on the left by an A region and on the right by a C region. The C and D regions are in quadrature relation such that, depending on the track, the C region or the D region may or may not be present in a particular track. Generally, the A region is located above the track centerline while the B region is located below it. In this context, the terms "above" and "below" apply to relative positioning of the A region and the B region, and are not intended to necessarily have other physical meaning.

In a next servo sector N+1 circumferentially located on the calibration track 1052, the position of the A region relative to the B region is switched so that the B region is neighbored on the left by a Gray code and on the right by the A region, while the A region is neighbored on the left by the B region and on the right by a C region. As with servo sector N, the A region is generally located above track centerline and the B region below track centerline.

The alternating pattern created by switching the position of the A region relative to the B region in consecutive servo sectors 1060 is repeated for the remaining servo sectors 1060 for each of the calibration tracks 1052, 1053. In a particular embodiment each calibration track 1052, 1053 has 60 servo sectors 1060.

FIG. 11E also depicts data tracks 1055 and 1056. The pattern of A, B, C and D bursts in data tracks 1055, 1056 do not alternate from sector 1060 to sector 1060. A calibration track 1053 is preferably separated from a data track 1055 by a transition track 1054, such as shown for example in FIG. 11E. A calibration track 1052 is also preferably separated from a guard band track 1050 by a transition track 1051.

Further details regarding the quadrature burst pattern and related aspects are disclosed in U.S. Pat. No. 5,523,902, issued Jun. 4, 1996, in the name of inventor Richard J. Pederson.

A calibration routine making use of the calibration tracks 1052, 1053 may be performed during an initialization mode so as to provide later compensation for the measured offset of the system from the nominal or ideal track centerline. One or more calibration tracks 1052, 1053 encoded with the alternating servo pattern shown in FIG. 11E may be involved in this calibration routine.

In this calibration method, the system makes use of the alternating "A/B"—"B/A" servo burst pattern described with respect to calibration tracks 1052, 1053. Upon readback, the average of the position error signals for the odd numbered servo sectors 1060 is subtracted from the average of the position error signals for even numbered servo sectors 1060 and then divided by two to obtain an offset error. The error signals may be summed and averaged over one, or preferably several, disk revolutions. The summed signal is then subtracted from the servo position error signal, as further described herein, so as to reduce or eliminate the effect of magnetic and electrical offset.

The calibration process involves operations over one, or preferably more than one, disk revolutions. Over several revolutions of the disk, the position error values for even numbered sectors 1060 are summed (accumulated), and the position error values for the odd sectors 1060 are likewise summed. At the end of the disk revolutions, the summed position error signals are averaged separately for even sectors 1060 and for odd sectors 1060. The average of the odd sector error is then subtracted from the averaged even sector error. The result is divided in half (where two calibration tracks are used) to obtain calibration offset value corresponding to magnetic distortion for a single track on the disk.

Mathematically, the operation may be represented by the equation:

$$\text{Offset} = \frac{1}{2} \left[ \frac{\sum_{m=1}^{R} \sum_{n=0}^{\frac{S}{2}-1} X_{2n,m}}{\frac{S}{2} \cdot R} - \frac{\sum_{m=1}^{R} \sum_{n=0}^{\frac{S}{2}-1} X_{2n+1,m}}{\frac{S}{2} \cdot R} \right]$$

WHERE $X_{2n,m}$ is the position error signal for an even numbered servo sector 2n during revolution m;

$X_{2n+1}$ is the position error signal for an odd numbered servo sector 2n+1 during revolution m;

S=the total number of servo sectors (which is equal to 60 in a preferred embodiment); and R=the number of revolutions of the disk that the operation is performed over. In a preferred embodiment, R>1.

Figure 16A:
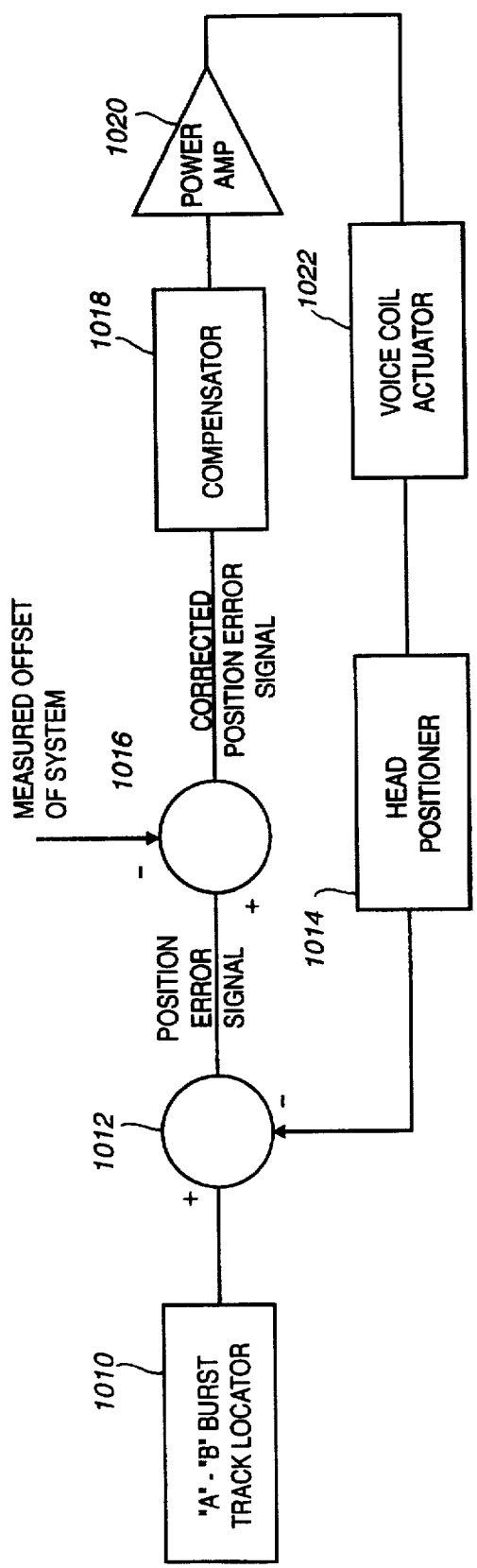
FIG. 16A is a schematic block diagrams of a closed loop servo position error correction system.
Figure 16B:
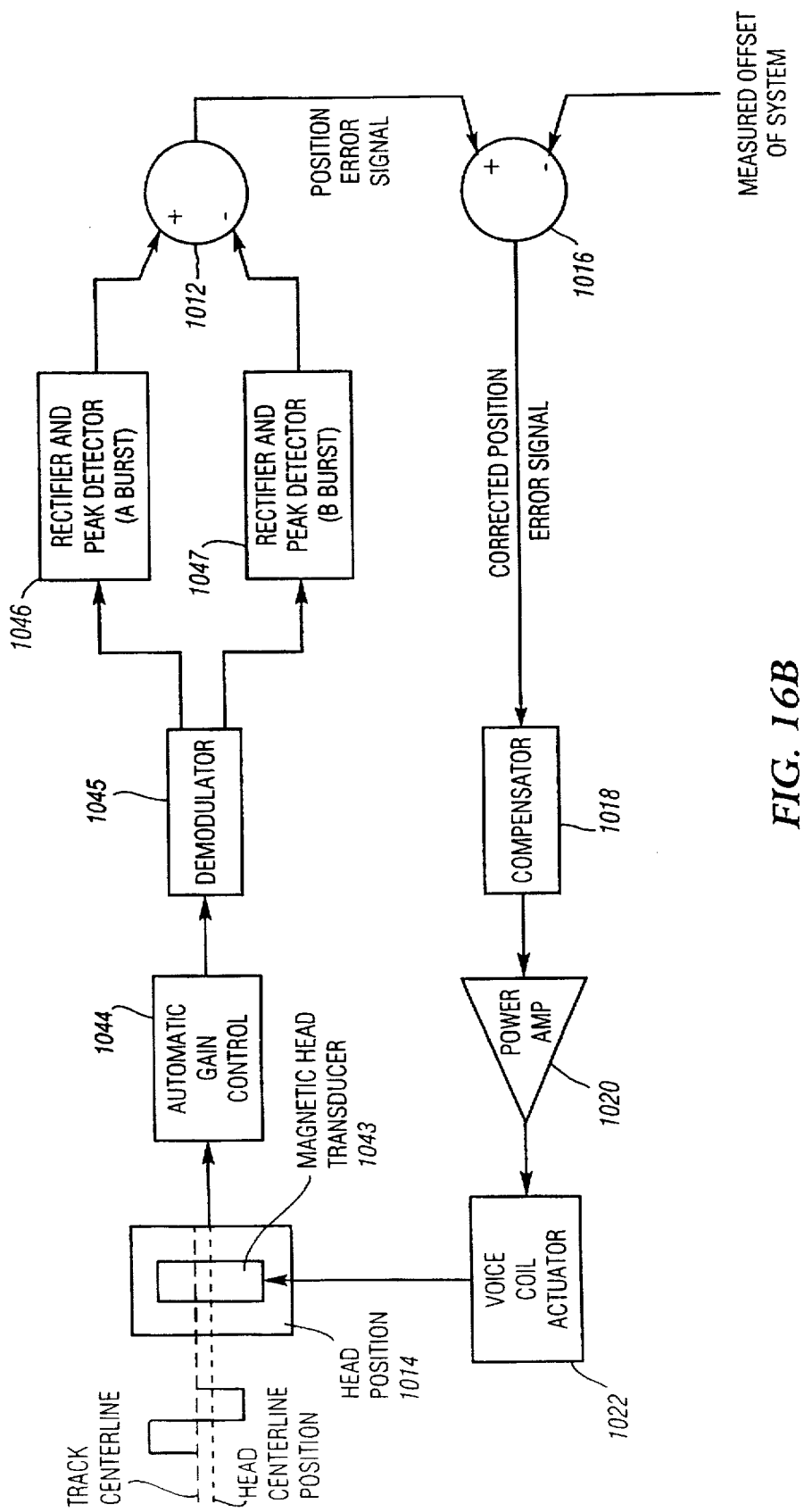
FIG. 16B is a more detailed schematic block diagram of the FIG. 16A system.

The calibration offset obtained as a result of the above calculations is then subtracted out of the position error signal as shown in FIGS. 16A and 16B at summing junction 1016. A corrected position error signal is thereby obtained so that the read/write head remains positioned over the centerline of the track. The offset correction signal need only be measured once at initialization for a particular disk, and thereafter may be stored and maintained as a constant during disk drive operations to continuously provide compensation as the system offset error signal shown in FIG. 16B. The measured offset value need not be re-calculated until a new disk is inserted in the disk drive 101.

Although FIG. 11E depicts two calibration tracks 1052, 1053, any number of calibration tracks may be present, where all, or any subset, of the calibration tracks may be used in the calibration routine. Additionally, the calibration track or tracks may be located adjacently or at multiple locations on the disk, as desired. For example, if the density of tracks is increased, negligible current effects and other distortions may become significant so that additional non-adjacent calibration tracks may become desirable. Although calibration tracks are preferably located near the outer diameter of the disk, in some dense-track embodiments the calibration tracks may be placed near the inner diameter of the disk and/or at other locations on the disk.

FIGS. 16A and 16B are block diagrams of a closed loop servo system for reducing or eliminating position error offset, and may be used in conjunction with the preferred servo pattern depicted in FIG. 11E. In FIG. 16A, an A/B burst track locator 1010 and summing junction 1012, whose constituent components are well known in the art and are shown in greater detail in FIG. 16B, generate a position error signal that represents the actual physical position error of magnetic head transducer 1043.

In FIG. 16B, voice coil actuator 1022, which is preferably a rotary actuator, generates a position signal to control movement of the magnetic head transducer 1043. The magnetic head transducer 1043 outputs a signal representative of the information read from the track. The output signal from magnetic head transducer 1043 is coupled to an automatic gain control (AGC) circuit 1044, whereby the voltage of the signal is increased to a normalized level. The AGC circuit 1044 provides the normalized signal to a demodulator 1045.

Demodulator 1045 selectively couples the appropriate portions of the normalized signal from the AGC circuit 1044 to an A burst rectifier and peak detector 1046 and B burst rectifier and peak detector 1047. Thus, demodulator 1045 couples the A burst signal to A burst full wave rectifier and peak detector 1046, and the B burst signal to B burst full wave rectifier and peak detector 1047. Each of rectifier and peak detectors 1046 and 1047 rectifies an incoming signal from demodulator 1045, detects the peaks of the rectified signal, and provides the peak voltage to a summing junction 1012. Summing junction 1012 subtracts the input signal applied to its negative terminal from the input signal applied to its positive terminal, and may comprise a difference amplifier.

Ideally, the magnetic head transducer 1043 stays positioned over the track centerline thereby reading an equal amount of the A burst and the B burst. In this ideal condition, the peak voltages received by summing junction 1012 are equal, and hence, summing junction 1012 outputs a zero-valued physical position error signal. However, when the magnetic head transducer 1043 drifts off the track centerline, i.e., the magnetic head transducer 1043 becomes positioned over more of one of the A burst or B burst than the other, then the output of A burst full wave rectifier and peak detector circuit 1046 differs from the output of B burst full wave rectifier and peak detector circuit 1047. As a result, summing junction 1012 outputs a non-zero signal representing the physical position error of the magnetic head transducer 1043.

The position error signal generated by summing junction 1012 is coupled to the positive terminal of summing junction 1016. The measured calibration offset of the system, the derivation of which is explained previously in more detail, is coupled to the negative terminal of summing junction 1016. Summing junction 1016, which may comprise a difference amplifier, subtracts the measured calibration offset from the position error signal to produce a position error signal corrected for offset, and thereby generates a corrected position error signal which is provided to a compensator 1018.

Compensator 1018 may comprise an analog-to-digital (A/D) converter to convert the corrected position error signal into a digital signal. Compensator 1018 may further include a microprocessor for determining, based on the digitized error correction signal, a position command to apply to the voice coil actuator 1022, and a digital-to-analog (D/A) converter to convert the position command into an analog signal. The analog signal generated by compensator 1018 (e.g., output from the D/A) is amplified by an amplifier 1020 and coupled to the voice coil actuator 1022, which in turn controls the movement of head transducer 1043. In the above manner, a closed loop servo system for repositioning the head to the track centerline is maintained.

Figure 17:
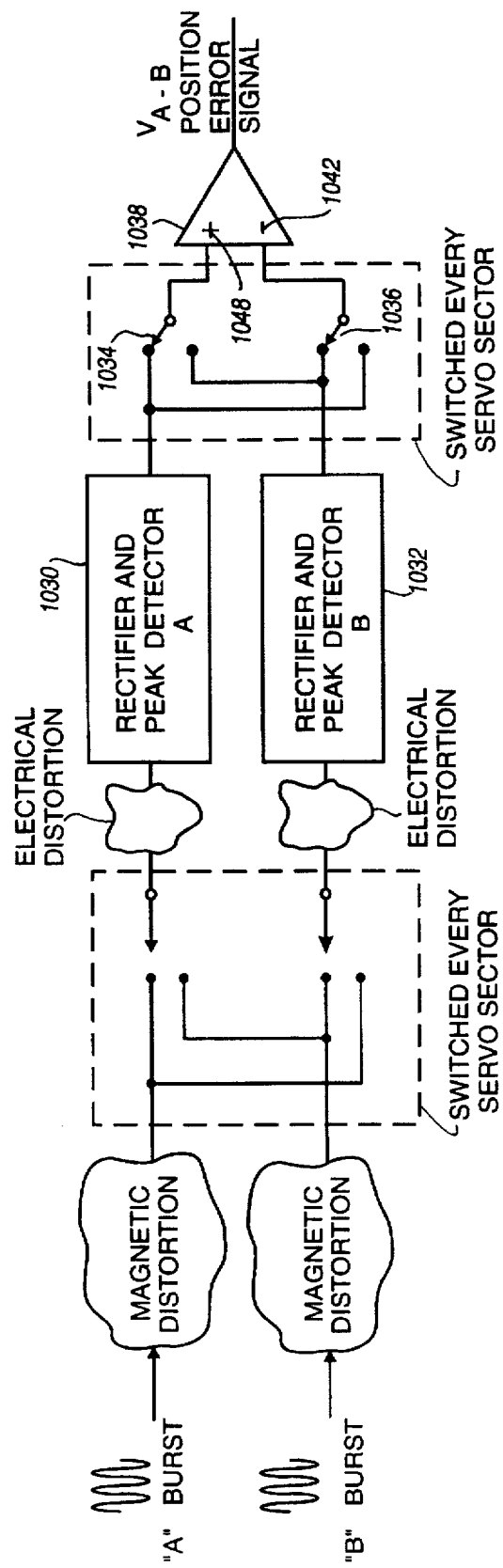
FIG. 17 is a circuit block diagram associated with a technique for correction of offset errors in a servo position feedback signal by periodically switching between terminals of an amplifier (e.g., every servo sector).

In addition to correcting for offset to the position error signal caused by magnetic distortion, a switching circuit may be employed to alternately switch the outputs of demodulators (e.g. peak detectors) between the inverting and non-inverting terminals of an amplifier as shown in FIG. 17. In FIG. 17 electrical distortion is generated by the differences in peak detector paths, which influences the output of rectifier and peak detectors A 1030 and B 1032 in a differential manner creating a corresponding and undesirable electronic offset. At every servo sector, the rectifier and peak detectors 1030 and 1032 are switched or "swapped" by switches 1034 and 1036 so that the output of the rectifier and peak detector A is alternated between non-inverting amplifier terminal 1040 and inverting amplifier terminal 1042. Similarly, the output of rectifier and peak detector B 1032 is switched between the inverting amplifier terminal 1042 and the non-inverting amplifier terminal 1040. When the output of rectifier and peak detector A 1030 is applied to non-inverting terminal 1040, the output of rectifier and peak detector B 1032 is applied to inverting terminal 1042. At the next servo sector the outputs of rectifier and peak detectors A 1030 and B 1032 are switched so that the output of rectifier and peak detector A 1030 is applied to the inverting terminal 1042 and the output of rectifier and peak detector B 1032 is connected to non-inverting terminal 1040. This alternating sequence continues for every servo sector on a given track. Switches 1034 and 1036 are preferably transistors.

Difficulty with track following is particularly acute where higher-capacity drives are required to read lower-capacity removable disk cartridges. Because track widths for higher-capacity drives are smaller than those for lower-capacity drives, the read/write heads of higher-capacity drives are correspondingly smaller as well. The smaller high-density heads may cause problems when reading from, and especially when writing to, lower-capacity cartridges 103. When a higher-density head reads lower-capacity cartridges, the burst signal amplitudes may reach only a fraction of their possible maximum values, such as 30% of the maximum possible values. The burst signal amplitude characteristic may thus significantly change when a smaller head 4 is used to read a wide track 304 such as is characteristic of a lower-capacity cartridge 103. In particular, the A/B feedback signal 309 may more easily enter a saturation region 10 at which point the A or B burst signals no longer provide useful feedback information.

Although it may be possible to read data on a lower-capacity cartridge with a higher-density (i.e., smaller) head 4, a problem may also occur when attempting to write with a higher-density head 4 to a lower-density disk in a lower-capacity removable disk cartridge, especially when the track-pitch to head-width ratio becomes large. For example, the track pitch of a 44 MByte disk in a preferred system may be 921 µ-inches (corresponding to a preferred head width of about 737 µ-inches), while the track pitch of a 200 MByte disk may be 535 µ-inches (corresponding to a preferred head width of about 428 µ-inches). Thus, the head width of the 200 MByte drive is less than half of the track pitch of a low-density disk 130. Consequently, as explained previously with reference to FIG. 1A, writing to a 44 MByte disk with a head 4 tailored to the 200 MByte system will result in substantial sidebands 6, 8 of old data. When the overwritten track 304 is read back in a lower-capacity disk drive with a larger head 4 with a lower density, the sidebands 6, 8 of old data may cause interference and prevent accurate recovery of the newly written data.

Figure 2A:
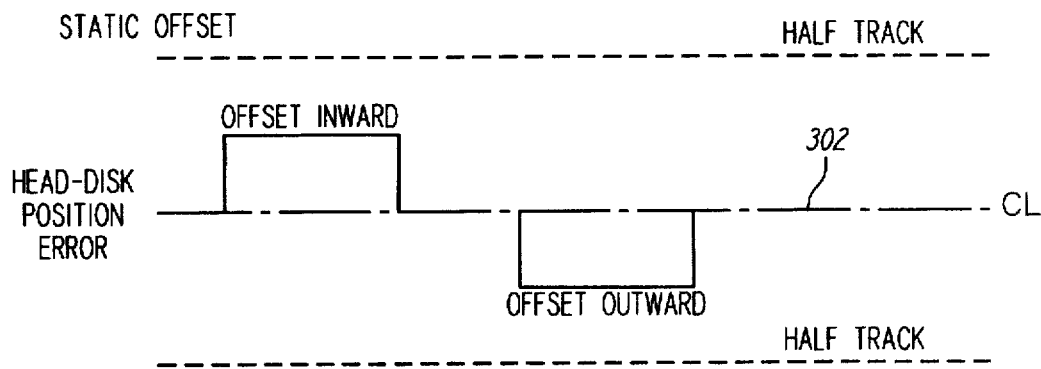
FIGS. 2A–2B illustrate a prior art technique for injecting "static" offset into the track following loop of a removable cartridge disk drive in order to eliminate sideband interference which otherwise results from recording data on a lower-density disk in a lower-capacity removable disk cartridge with a higher-density read/write head.
Figure 2B:
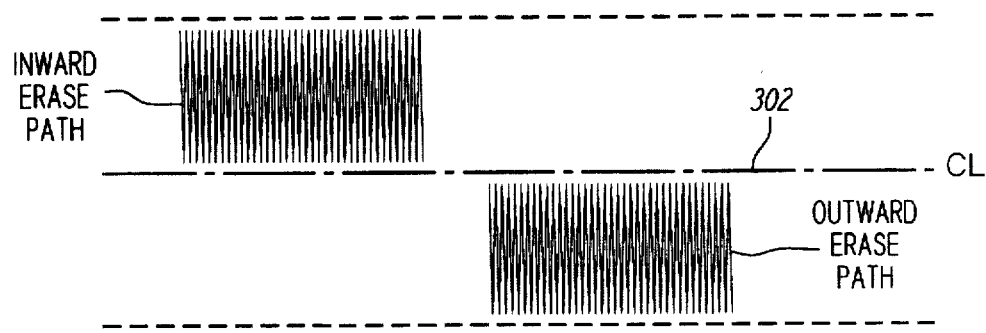
Figure 2C:
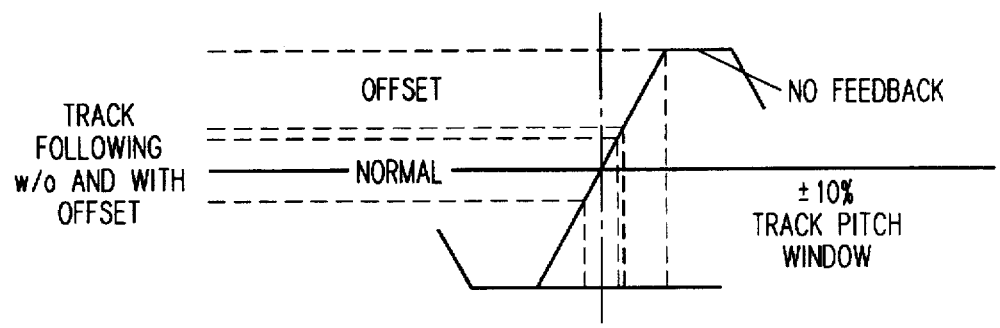
FIG. 2C shows the manner in which injection of "static" offset into the track following loop of a removable cartridge disk drive, as illustrated in FIGS. 2A–2B, positions a higher-density read/write head near the saturation region of the servo feedback waveform.

One conventional method for dealing with the described problem was previously explained with reference to FIG. 2B. As noted, old data may be essentially removed prior to writing new data by a series of two passes, each of which erases roughly half a track or more. The erase procedure comprises writing a DC signal with a fixed or static offset from the track center 302, while using A and B servo feedback information to maintain the offset positioning of the head 4 (thus requiring the head cover the track centerline). Thus, after the head 4 is offset positioned in one direction, a first pass erases one half track, and after the head 4 is offset positioned in the opposite direction, a second pass erases the other half track. A third pass is needed to write the data.

The above procedure, however, requires that the head 4 not be too small relative to the track pitch. If the head 4 is too small (e.g., if it is less than half the track pitch), as may be the situation when writing to a lowest-capacity removable disk cartridge 104 with a higher-density head 4 tailored for reading higher-capacity removable disk cartridges 106, then the head 4 will not be able to erase the outer boundaries of the track 304 because of the proximity of the head 4 to a saturation region 10 in the A/B servo feedback waveform, preventing a useful feedback signal from being generated and therefore effective servo control. In such a case, the head 4 will eventually inadvertently stray off the intended path into an adjacent A or B region (depending on which half track is being erased).

A solution to the above problem is provided in one aspect of the present invention by an erase pattern having a dynamic offset which reduces the risk of loss of servo control. The offset may be a sine wave pattern such as shown, for example, in FIGS. 6C and 6D. However, the offset need not be a sine wave pattern and may alternatively comprise any other suitable waveform such as a triangular waveform or a varying sinusoid.

Figure 5A:
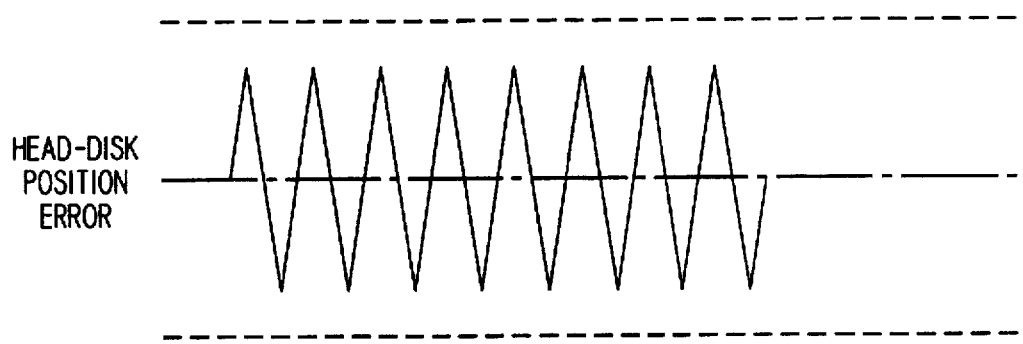
FIGS. 5A–5B illustrate one technique for injecting a dynamic offset signal into the disk drive control circuit track following loop as a means of eliminating sideband interference in accordance with the teachings of the present invention.
Figure 5B:
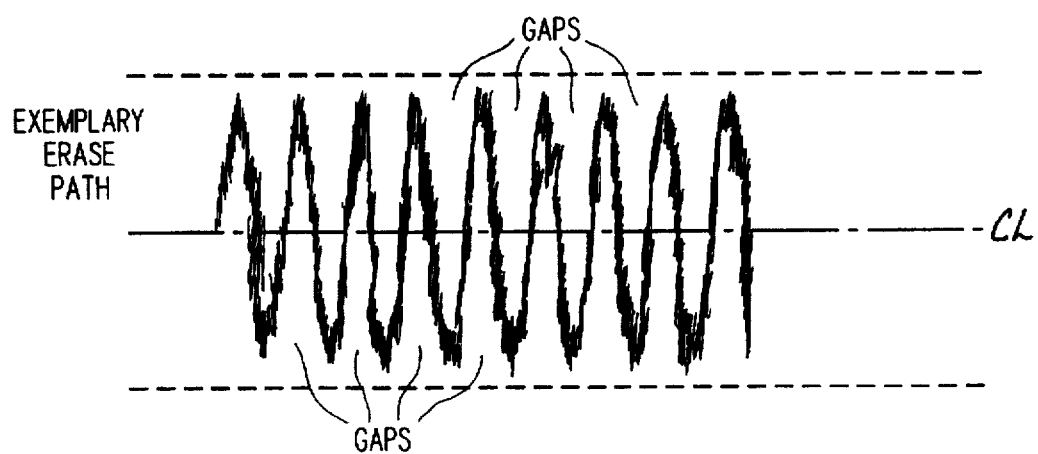

The dynamic offset is generated by injecting a dithering signal around the position corresponding to track center in the A/B servo feedback waveform, as shown for example in FIG. 5A. The A/C dither signal in effect "leads" the high-density read/write head 4 back and forth across the track pitch during each revolution of the disk in the cartridge. The "erase pattern" associated with the dithering signal of FIG. 5A is shown in FIG. 5B.

The frequency of the dithering signal injected into the track following loop is critical to the track following operation. If the dithering frequency is too high, the track following loop cannot respond. On the other hand, a low dithering frequency will result in a condition approaching the static offset case, in which the servo can be lost while the higher-density head is in the vicinity of the saturation region in the A/B servo feedback waveform. Low frequency dithering is additionally susceptible to interference from disk run-out. Hence, the dithering frequency must be chosen at some intermediate level above the run-out frequency, whereby dithering is superimposed on the run-out without prolonging the interval in which the higher-density read/write head approaches the saturation region of the A/B servo feedback waveform.

An intermediate dithering frequency, however, tends to leave unerased gaps in the sideband regions along the erasure path. These gaps, which are illustrated in FIG. 5B, can be eliminated by performing multiple out-of-phase erase passes. The value of the dithering frequency is preferably selected as a non-multiple of the number of servo sectors present on the disk surface in the cartridge, thereby ensuring a phase difference between the erase path at each revolution of the disk. Repeated or multiple out-of-phase erase passes will eventually eliminate all of the gaps in the sidebands.

The higher-density read/write heads can thereafter record data in the center of the lower-density data tracks, and subsequent reading of the data in a lower-capacity disk drive will not suffer from sideband interference.

Figure 6A:
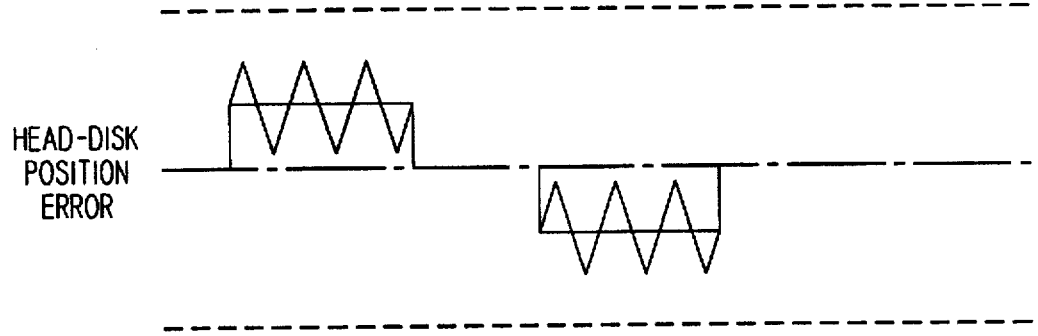
FIGS. 6A–6D illustrate in more detail a technique for injecting dynamic offset into the track following loop of the disk drive control circuit as a means of eliminating sideband interference.
Figure 6B:
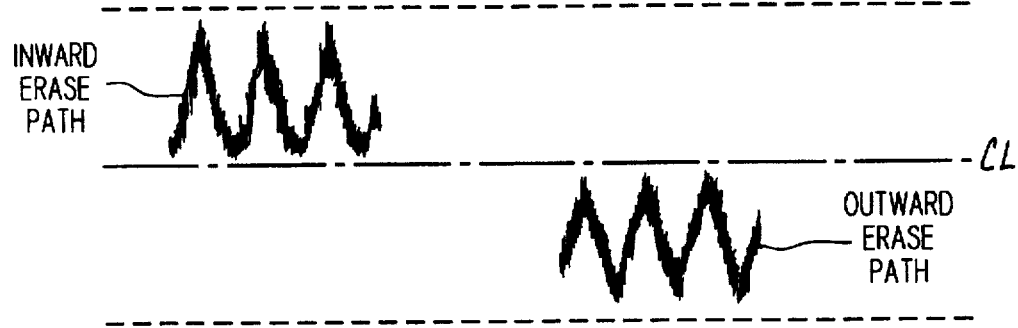

A preferred technique for erasing sideband areas in lower-density tracks according to the teachings of the present invention involves injection of both dynamic and static offsets. A representative offset waveform is illustrated in FIG. 6A. The static portion of the offset is comprised of a DC offset having a smaller magnitude than the static offset shown in FIG. 2A. A dithering signal with a frequency selected as described in connection with FIGS. 5A and 5B, but with a lower amplitude, is superimposed on the DC offset. The combined offset value and amplitude thus selected reduces the risk of servo loss while permitting relatively complete sideband erasure. Again, multiple out-of-phase erase passes are made, a first series of passes for the inward sideband and a second series of passes for the outward sideband as shown in FIG. 6B, in order to eliminate any gaps which would otherwise remain as a result of the dithering action. For example, the 200 MByte head described earlier may take four passes to substantially erase a 44 MByte disk in accordance with the particularly described system.

In a preferred embodiment, the periodicity of the dither signal may be selected such that no phase realignment is necessary between erasure passes. Once it is known how many passes are needed to erase data over a half track, the periodicity of the dither signal so that no realignment of phase is needed may be generally determined from the following relationship:

$$(\# \text{ sectors}) \ MOD \ (\text{half period}) = (\# \text{ passes}) - 1$$

where "MOD" represents a modulus operation, "# sectors" represents the sectors per track, "# passes" represents the number of passes needed to erase data over a half track, and "half period" is half of the period defining the frequency of the dither signal. For example, in the preferred system of 44 MByte, 88 MByte and 200 MByte cartridges described earlier wherein the 44 MByte capacity disk has 70 sectors and the higher-density head takes approximately four passes to erase an entire track of the lower-density pitch, a period of eight sectors may be selected so that all four passes may be completed without intervention by the disk drive 101 to make a phase adjustment to the dither signal.

Figure 6C:
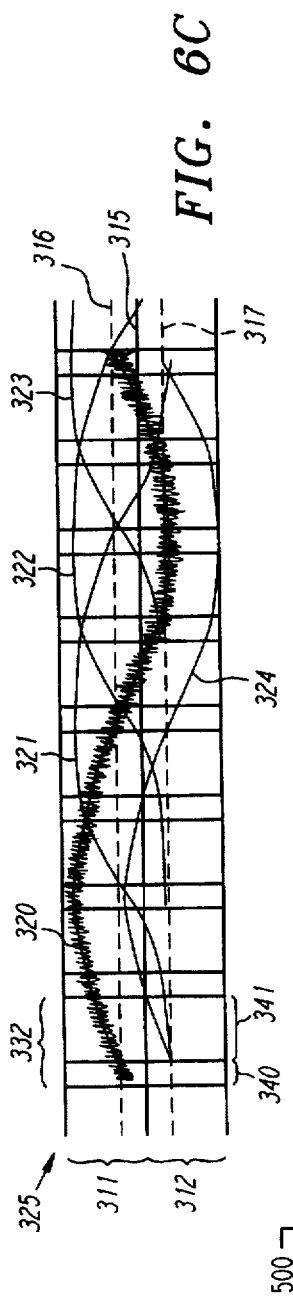

FIG. 6C shows a graph of head position over time illustrating an exemplary dither pattern for such a system. In FIG. 6C, a portion of a track 325 to be erased and/or overwritten is shown covering a plurality of sectors 332. Each sector 332 is divided into a control portion 340 and a data portion 341, such as described with respect to FIG. 8. The track 325 is divided by a track center line 315 into an upper half track 311 and a lower half track 312, corresponding, for example, to A-burst and B-burst information that may be preformatted on the disk.

In the exemplary disk cartridge system defined by the disk formats in FIGS. 9A–9C, the track 325 has a width of 920 micro-inches, and the head is assumed to have a width of approximately 440 micro-inches. In a particular embodiment, the dither signal comprises a static offset corresponding to 100 micro-inches and a dynamic offset corresponding to a sine wave having a peak amplitude of 100 micro-inches and a period of eight sectors.

The center position of the head varies along a first path 320. The first path 320 is offset from the center line 315 by an offset 316 of 100 micro-inches. The head follows the first path 320 from a first sector 332 (e.g., sector 0) to a peak at the start of sector 2, and then reaches an opposite peak at the start of sector 6, eventually returning to the offset position 316 at the end of sector 7. The head continues to oscillate along the same track 325 in a sine pattern until erasure is complete.

When the dither pattern approaches the starting point (e.g., sector 0), the next sine wave on a second pass 321 will not commence at sector 0 but instead at sector 2. Likewise, on a third pass 322 the sine wave will commence at sector 4, and on a fourth pass 323 at sector 6. Thus, in four passes, substantially all of the old data will be erased in the upper half track 311, without a precise duplication of the dither pattern.

A similar process is then repeated for the lower half track 312. Thus, the head starts from an offset 317 of, e.g., 100 micro-inches. The head traverses a sine pattern along a first path 324, and then follows with three more passes as shown for the upper half track 311, substantially erasing the data on the lower half track 312.

Figure 6D:
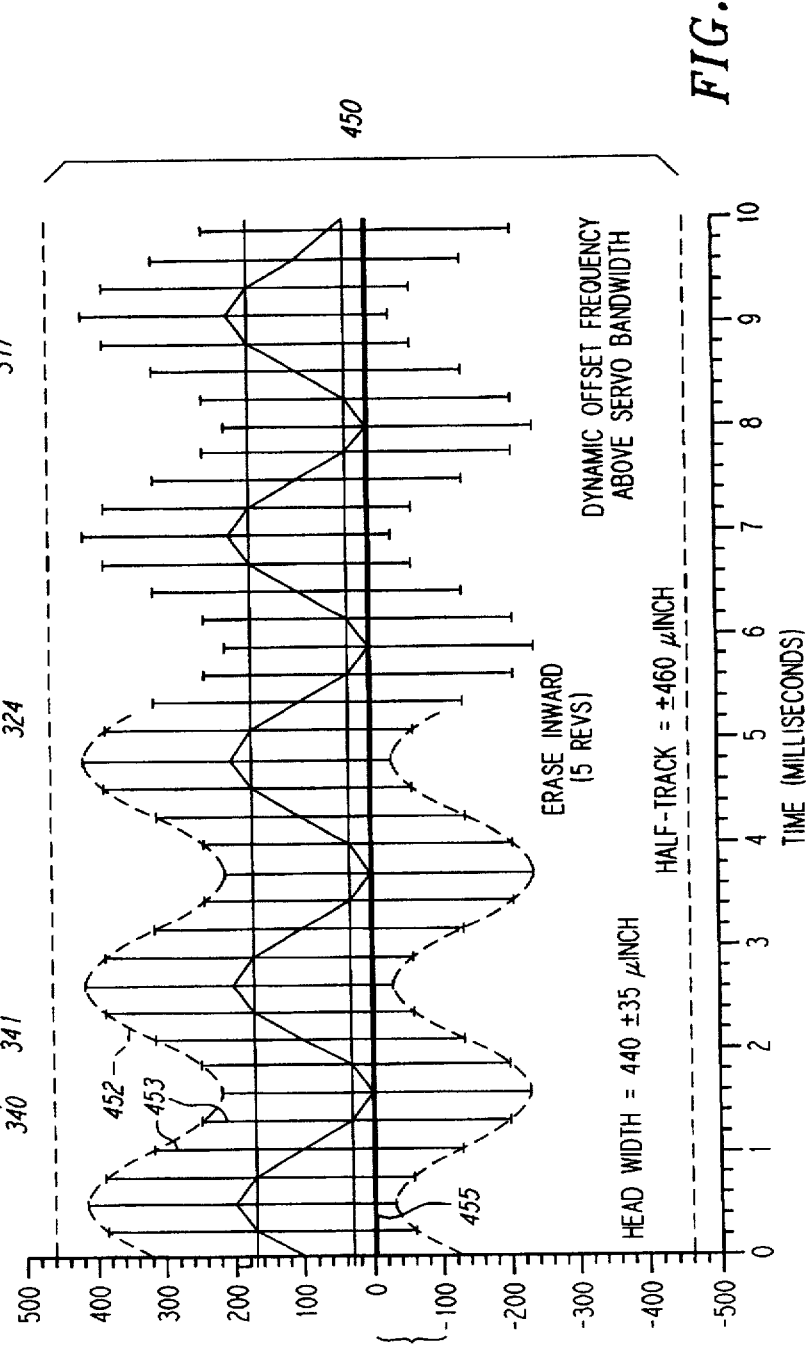

FIG. 6D is a more detailed diagram of the head position over a track in accordance with a dynamic offset erasure pattern. A low-density track 451 is depicted having a width of 920 micro-inches. The position of the head oscillates along a sinusoidal pattern 452, offset from a center track line 405 by a static offset component 454 of 100 micro-inches. Head positions 403 are shown once per sector as the head changes position over time. The head has a nominal width of 440 micro-inches, or less than half the width of the low-density track 451. As shown, the head covers eight sectors for each complete sine wave of the dynamic offset pattern 452. The head completes four passes of slightly offset phase, as noted, before erasure of the upper half of the track 451 is considered complete.

Once the data has been erased on both the upper and lower half tracks, new data may be written on the track 325. An additional pass, before or after a write operation, to verify that the data has been erased or ensure data integrity may also be conducted. The additional pass need not have a dither pattern, as it involves a read operation.

It is possible through command logic to change the phase of the dither signal or otherwise impose a phase offset after one or more passes, but doing so generally requires additional overhead.

If it is not desired to erase and write over every sector 332 of a particular track 325, the erase signal may be disabled by means well known in the art for sectors 325 that are not to be erased, and enabled only for those sectors 325 that are to be erased and/or overwritten.

Figure 4:
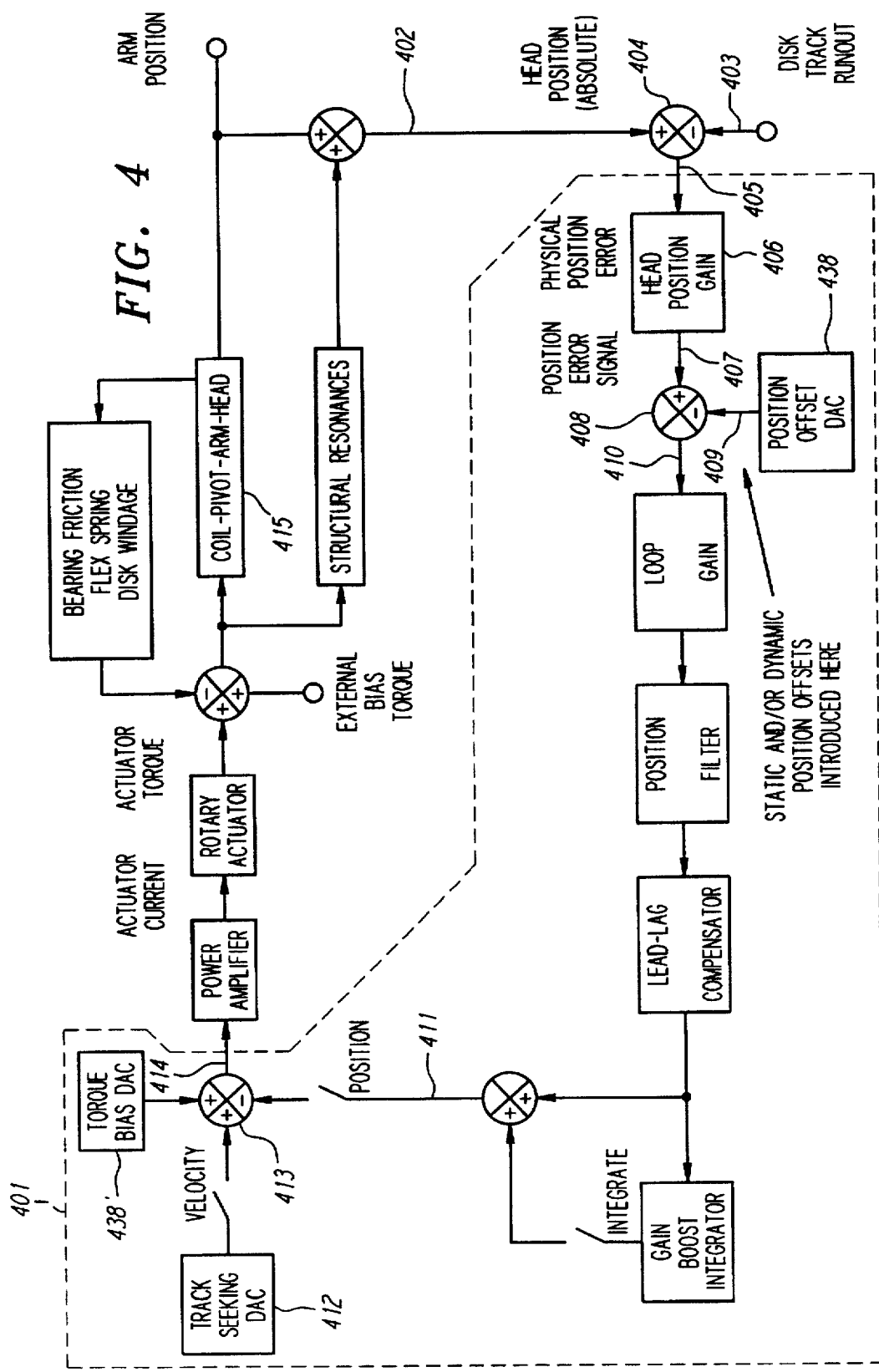
FIG. 4 is a more detailed block diagram of the track following loop from the FIG. 3 disk drive control circuit.

Control of the dither signal (e.g., a dynamic offset signal such as described in FIGS. 6C and 6D) may be further explained with reference to FIG. 4. FIG. 4 is a block diagram of an embodiment of track following circuitry for providing accurate positioning of the read/write heads over the specified data tracks during read and write operations. A position offset digital-to-analog converter (DAC), indicated at 438 in FIG. 4, is controlled by microprocessor 32 to supply position offsets to the track following loop during sideband erase operations.

In FIG. 4, a head position signal 402 representing the absolute head position is provided to a summer 404. A disk track position signal 403 is also provided to a summer. The summer calculates a difference between the head position signal 402 and the disk track position signal 403, thereby generating a head position error signal 405. The head position error signal 405 is connected to a track following block 401, such as track following circuitry 36 shown in FIG. 3A.

In the track following block 401, the head position error signal 405 is coupled to a head position gain block 406 and multiplied by a head position gain factor. The output 407 of the head position gain block 406 is connected to another summer 408. The summer 408 also receives the output 409 of a position offset DAC 438. The summer calculates a difference between the amplified head position error signal 407 and an offset position command 409 received from the position offset DAC 438, thereby generating a position offset/error command signal 410.

The position offset/error command signal 410 is provided to various feedback and compensation elements such as depicted in FIG. 4, for providing control feedback in a manner conventional in the art. A head position command 411 is thereby generated and provided to a summer 413, if in a track following mode. If in a track seeking mode, summer 413 instead receives input from a track seeking DAC 412. The summer 413 is also connected to a torque bias DAC 438', the purpose of which is to boost the torque command based on prior mechanical resistance encountered by the arm and head assembly in prior track seeking operations. The summer 413 calculates a difference of the head position command 411 and an output of the torque bias DAC 438', and generates a head torque command 414. The head torque command 414 is amplified and provided to the arm and head assembly 415, whereby the position of the head is adjusted in a manner as known in the art.

In a particular embodiment, the position offset DAC 438 and the torque bias DAC 438' comprise the same digital-to-analog circuitry. Control logic, such as programmed into the microprocessor 32 or other control circuitry, switches between the position offset DAC 438 and the torque bias DAC 438' as needed to supply pertinent position offset commands and torque bias commands, respectively.

Figures 3, 7C:
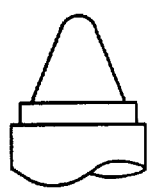

The position offset DAC 438 is controlled by microprocessor 32 (see FIG. 3) to supply position offsets to the track following loop during sideband erase operations. The microprocessor 32 injects the dither signal into the head position loop of FIG. 4 to drive the read/write head by providing appropriate position offset values to the position offset DAC 438. The position offset DAC 438 converts digital commands from the microprocessor 32 to analog commands suitable for use in the servo feedback loop (however, the servo feedback loop may be implemented digitally as well by methods known in the art).

Rather than continuously calculating and scaling the values for a sine wave or other periodic wave to generate the dither signal, the microprocessor preferably utilizes a look-up table (not shown) to rapidly generate appropriate values for the dither signal. For example, if a sine wave is selected so as to repeat every eight sectors 332, then eight values representing a step-wise sine wave (emulating, for example, the sine pattern shown in FIG. 6C) may be placed in the look-up table and referenced by the microprocessor 32. No more than eight values would be needed in the look-up table for the sine pattern in FIG. 6C because control information is read only once per sector 332, and only eight sectors 332 are traversed by the head for each complete sine wave.

More generally, the maximum number of useful values stored in the look-up table corresponds to the number of sectors traversed per period of the selected waveform. Fewer values could be used, however, so long as enough information is provided to allow the servo feedback loop to maintain control of the read/write head during the dither pattern. The look-up table may comprise ROM, RAM, PROM, EPROM, EEPROM, or any other suitable type of static or dynamic memory.

Other periodic waves besides a sine wave may be utilized for the dither signal, although a sine wave is preferred. For example, a square wave may be used, but tends to be relatively noisy compared to a sine wave. A triangular wave may be used, or a sine wave of varying period and/or amplitude.

In practice, on some lower-density disks in lower-capacity removable disk cartridges, the pre-written amplitude level of the A region 300 and the B region 301 may differ from one another such that it is necessary to compensate for the inherent amplitude differential. Because it is generally not possible to know prior to reading a disk how much the amplitude differential is, calibration may be performed whereby the A/B differential is measured and stored when the disk is first read, and the level of static offset on all subsequent write operations is adjusted to compensate for the A/B differential. The level of static offset thereby may be set independently for each half track (i.e., for the A side of the track and the B side of the track).

The disk 130 may be divided into a plurality of zones, e.g., five zones, radiating outward. To minimize delays due to calibration when a disk cartridge 103 is first inserted in a drive 101, calibration may be performed with respect to fewer than all the zones (for instance, using only three of five zones). For a particular track 131 in each selected zone, a static offset signal is injected into the track following loop 401 and information, including the Gray code and the A/B differential, is read. If the Gray code stays the same from sector to sector, then the head 4 is assumed to be successfully following the track 131; however, if the Gray code changes, then drift of the head 4 has occurred and it is assumed that the head 4 is no longer following the track 131. If the head 4 drifts over a predetermined number of sectors (e.g., the Gray code differs for two consecutive sectors 132 from the original Gray code), then the static offset signal is decreased and the process for the particular track 131 is begun anew. If the head 4 drifts a second time in a row, then the static offset signal may be substantially decreased (e.g., cut in half).

If an entire disk revolution is completed without the head 4 drifting, then the static offset signal is increased and the process continues until saturation is reached. The static offset signal may be increased in discrete steps or otherwise. Saturation is indicated when the A/B differential reaches a plateau such as shown in region 10 of FIG. 1C; that is, saturation occurs when the A/B differential remains constant from sector to sector (and does not equal zero). To determine saturation, the A/B differential is measured at each sector 132, and a running average value of the A/B differential is kept for the particular half track. The running average measured at each sector is compared with the running average measured at the previous sector, and if the running average does not change for three consecutive sectors it may be assumed that saturation has been reached. When saturation is reached, a static offset value slightly less than the one causing saturation is stored temporarily.

The above process is performed for both the A track and the B track in a plurality of zones. After each selected zone has been calibrated, the average A and B offsets are calculated from the static offset values stored for each zone. The average A and B offsets may be limited to a maximum value. The average A offset is used as the static offset signal for the appropriate half track during write operations thereafter, while the average B offset is used as the static offset signal for the other half track during write operations.

When the lower capacity removable disk cartridge 103 is removed and a new one inserted, the calibration steps are performed all over again and new A and B static offset measurements are determined.

A flow chart setting forth a preferred procedure for performing calibration in accordance with the above description is shown in FIGS. 12A–12F.

The calibration process described above need only be performed if the disk cartridge 103 which has been inserted into the drive 101 is a lowest-capacity removable disk cartridge 104. Thus, the disk drive 101 needs to be able to sense what type of disk cartridge 103 has been inserted in order to determine whether calibration is appropriate. Further, the disk drive 101 needs to be able to sense the type of cartridge 103 in order to determine what type of write process to use. If a higher-capacity removable disk cartridge 106 is inserted, as noted earlier, the head size conforms to the disk track size, allowing data to be overwritten with relative simplicity. However, if a lower-capacity removable disk cartridge 104 or 105 is inserted in a higher-capacity drive, a more involved erase process is preferably carried out prior to writing data to the disk.

The above described calibration routine for lower-density disks in lower-capacity removable disk cartridges differs from the calibration routine for high density or other disks utilizing the preferred quadrature pattern and calibration tracks shown in FIG. 11E and described previously herein.

Aspects of the present invention pertaining to cartridge recognition may be explained with reference to FIG. 3A, which depicts in a schematic fashion the electronic circuitry 12 associated with a first preferred embodiment of a higher-capacity disk drive 101. When a removable cartridge 103 is inserted into the disk drive 101 and seated on the spindle mechanism (not shown), the disk surface is scanned by the disk drive heads 14 and data (e.g., Gray codes, ID fields and servo patterns) prerecorded on the disk surfaces is read by the heads 14 and passed through a preamplifier stage 16 to a pulse detector 18. The prerecorded information is then analyzed by an encoder/decoder and servo timing control ASIC 20 to determine the cartridge capacity. The ASIC 20 thus searches the prerecorded information detected by the disk drive heads 14 in an effort to locate indicia of the cartridge capacity.

In a preferred embodiment of the present invention, for example, removable cartridges 103 with different capacities characteristically employ different servo patterns and timing schemes, with the servo pattern and timing interval between servo sectors differing depending upon cartridge capacity. When ASIC 20 detects a servo pattern consistent with a higher-capacity removable disk cartridge 106, the ASIC activates microcontroller 22. Microcontroller 22 subsequently detects the servo timing interval to verify that a higher-capacity removable disk cartridge 106 is indeed inserted in the disk drive 101. If the servo timing detection is successfully completed, the microcontroller 22 controls a higher-capacity read/write channel including pulse detector 18, ASIC 20 and SCSI controller 24. If desired, ASIC 20 and microcontroller 22 can also examine the prerecorded information from the disk surface to confirm whether a valid Grey code appears. This latter check simply serves to verify that a legitimate servo pattern has been detected for purposes of measuring servo timing.

If ASIC 20 does not detect the servo pattern associated with a higher-capacity removable disk cartridge 106, a low-capacity read/write channel, including pulse detector 26, encoder/decoder 28, servo timing control ASIC 30, microcontroller 32 and SCSI controller 34, is instead activated. Encoder/decoder 28 then analyses the prerecorded information from the disk surface to further distinguish between intermediate and lowest-capacity cartridges. In the preferred embodiment, the ID field (e.g., ID field 161 or 181) recorded on the disks in lower-capacity removable disk cartridges 104 and 105 differs depending upon whether the removable cartridge 103 exhibits intermediate or lowest-capacity. Once identified, the capacity of the cartridge 103 is communicated to microcontroller 32 which conditions the lower-capacity read/write channel to perform reading and writing operations in accordance with the specific capacity of the cartridge 103.

Figure 3A:
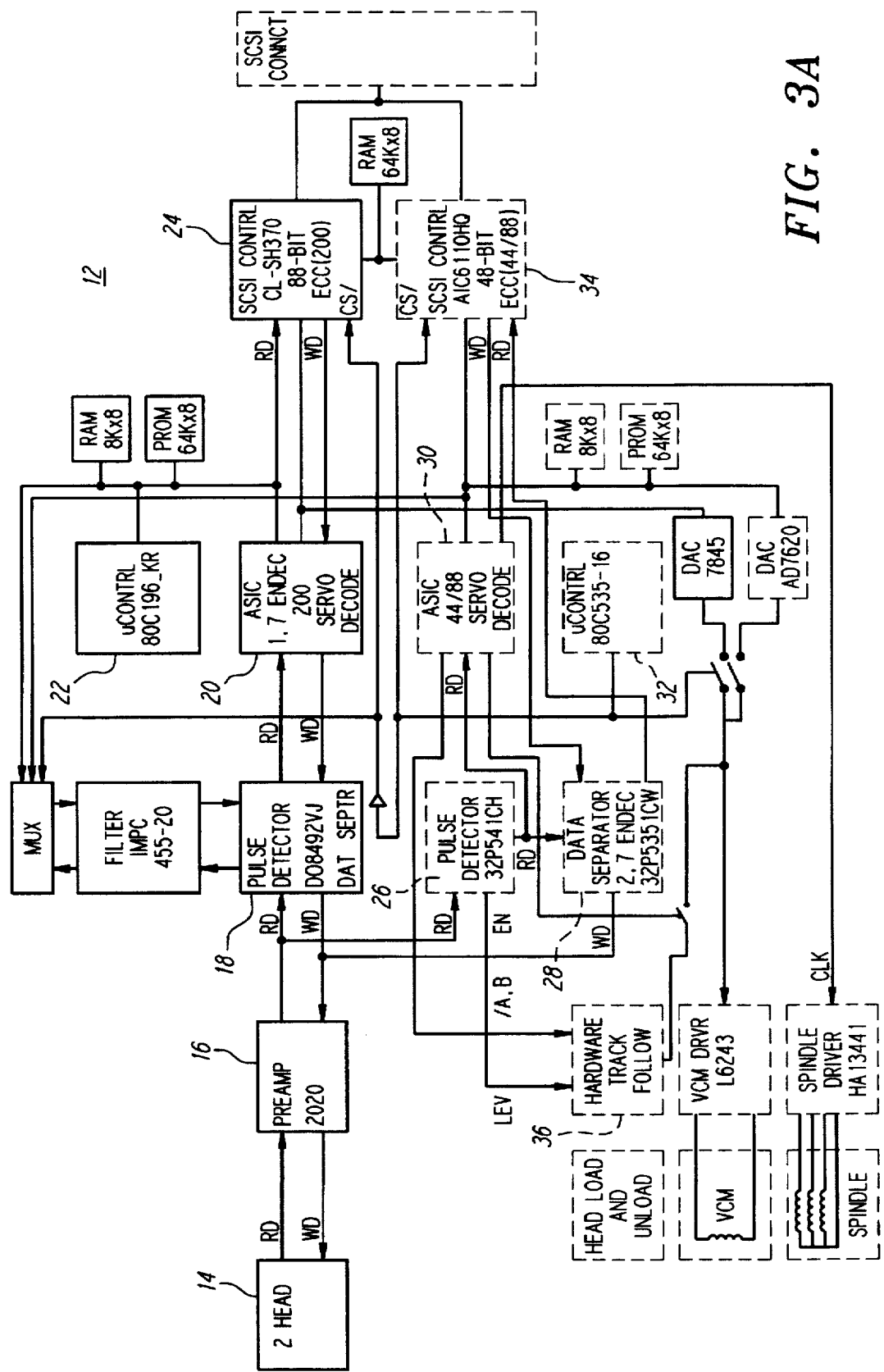
FIGS. 3A–3B are block diagram of a first and a second preferred embodiment of a multiple read/write channel disk drive control circuit.
Figure 3B:
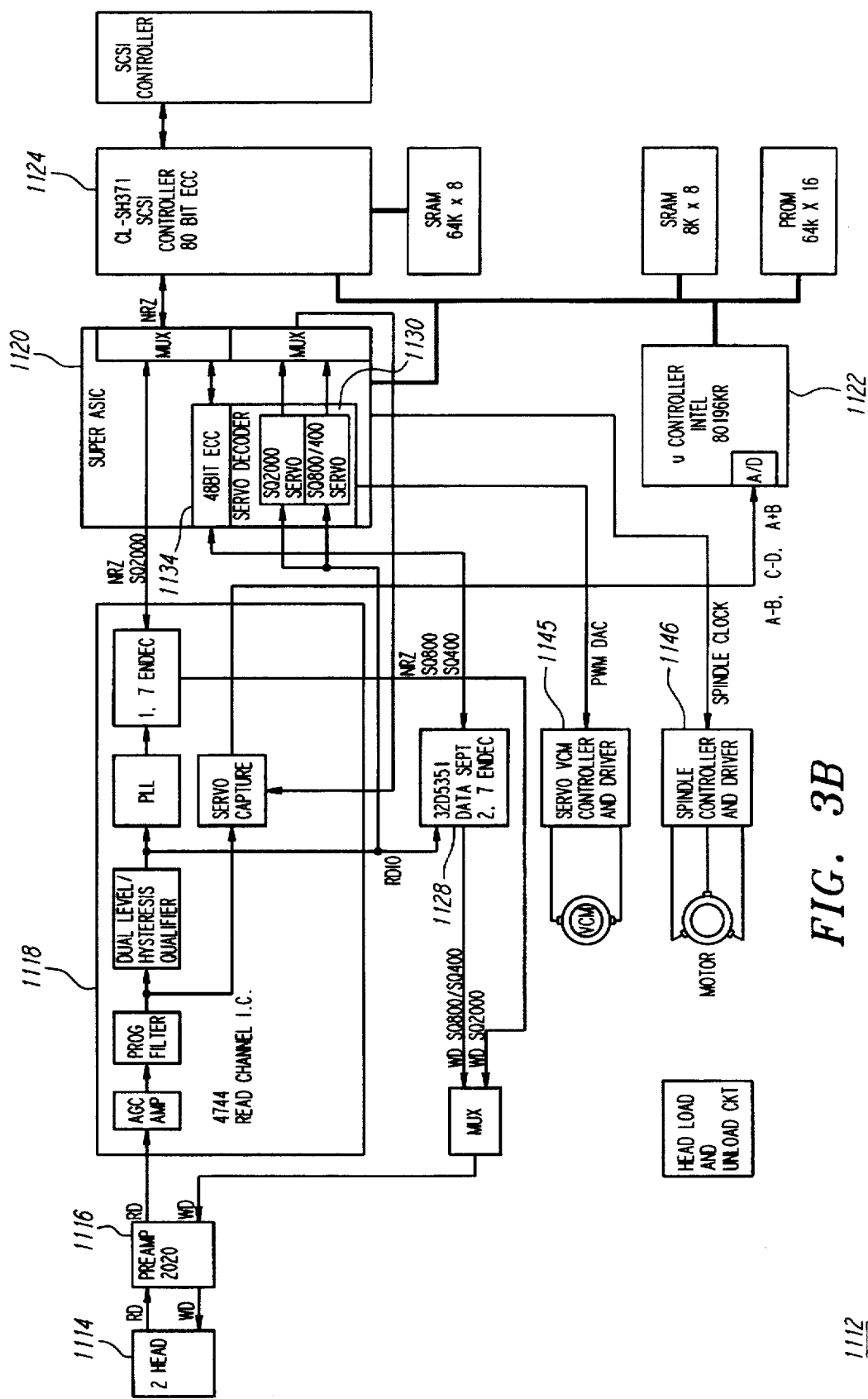

FIG. 3B depicts in a schematic fashion the electronic circuitry 1112 associated with a second preferred embodiment of a higher-capacity disk drive 101. As shown in FIG. 3B, heads 1114 interface with a preamp 1116, such as an SSI 2020 from Silicon Systems. When reading data from a removable disk cartridge 103, the preamp 1116 provides a signal to a read channel IC 1118. The read channels for a higher-capacity removable disk cartridge 106, an intermediate-capacity removable disk cartridge 105 and a lowest-capacity removable disk cartridge 104 are incorporated in the read channel IC 1118, which may be a device such as an SSI 32P4730/44 Read Channel with 1.7 ENDEC 4-burst Servo IC from Silicon Systems.

The read channel IC 1118 provides an output signal to a data separator 1128, such as an SSI 32D5351 from Silicon Systems. The data separator is used whenever the removable cartridge 103 is either an intermediate-capacity removable disk cartridge 105 or a lowest-capacity removable disk cartridge 104, and includes a 2,7 encoder/decoder.

Figure 3C:
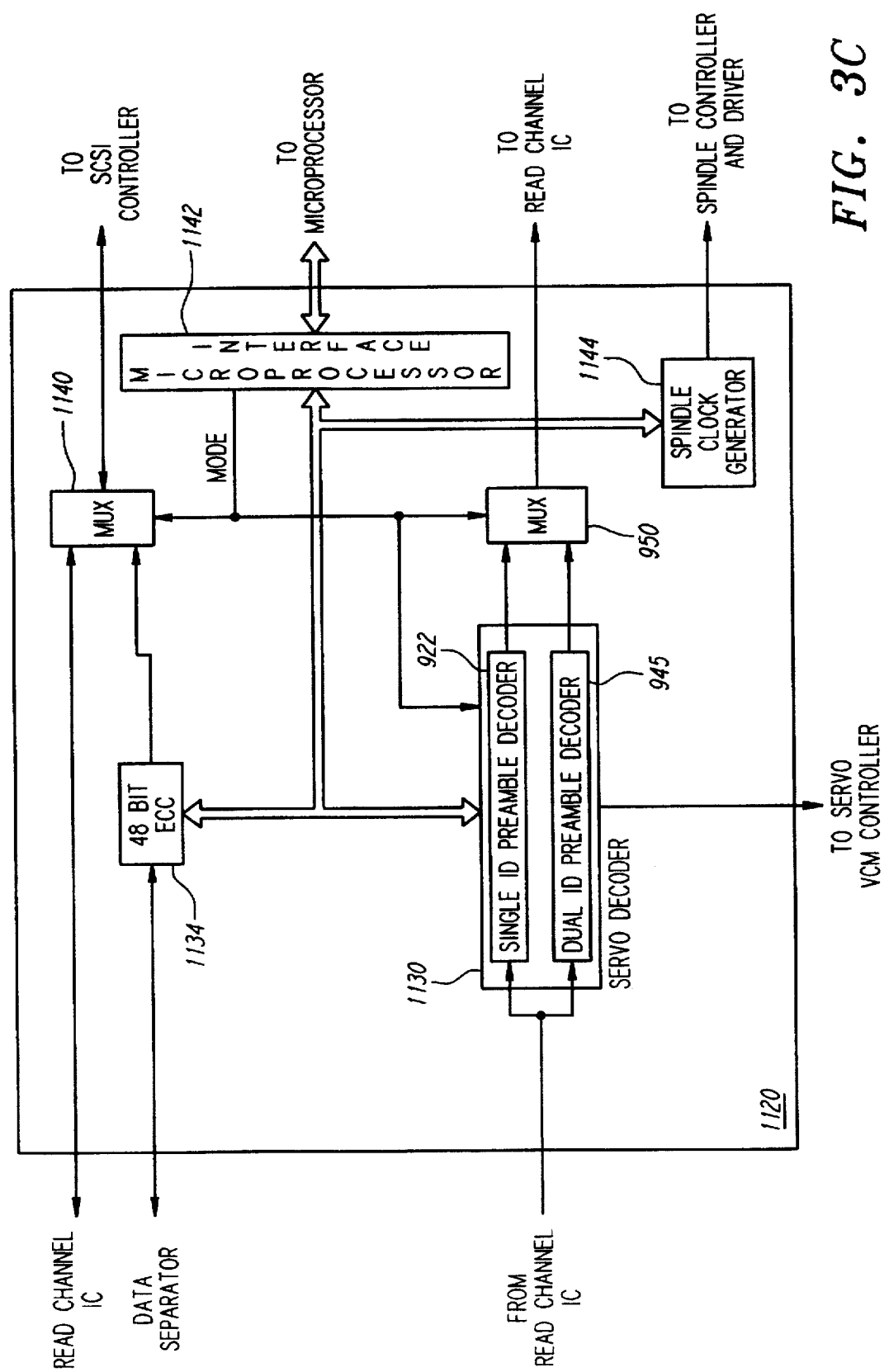
FIG. 3C is a block diagram of an application-specific integrated circuit (ASIC) employed in the preferred embodiment of FIG. 3B.

The read channel IC 1118 also provides signals to a Super ASIC 1120. FIG. 3C shows a functional block diagram of the Super ASIC 1120.

Super ASIC 1120 comprises a 48 bit ECC 1134, a servo decoder 1130, a spindle clock generator 1144, a microprocessor interface 1142, and multiplexers 1140 and 950. The Super ASIC 1120 also comprises interface and interconnection circuitry, also known as "glue-circuitry," as anyone of ordinary skill in the art would understand. The servo decoder further comprises a single ID preamble decoder 922 and a dual ID preamble decoder 945. The Super ASIC 1120 also provides output control signals to a servo VCM controller 1145 (which may be an L6243 from SGS Thomson) and a spindle controller and driver 1146 (which may be a Hitachi 13441).

In the embodiment of FIG. 3B, cartridge capacity detection is performed by Super ASIC 1120 in conjunction with microcontroller 1122 as more fully explained elsewhere herein. Microcontroller 1122 may be an Intel 80196 microprocessor or other suitable device.

The disk drive 101 determines which type of removable disk cartridge 103 has been inserted by detecting and identifying the particular prerecorded format of the disk. In a preferred embodiment, further explained hereinafter, the disk drive 101 first looks for a higher-capacity removable disk cartridge 106 and, if recognition thereof fails, attempts to recognize the disk cartridge 103 as one of the lower-capacity removable disk cartridges 104 or 105. Although a sequential cartridge detection search algorithm is described, it would be an obvious variation to simultaneously attempt to recognize the formats for higher capacity cartridges and lower capacity cartridges, and the first successful recognition would indicate the type of cartridge 103. Such a variation is intended to come within the spirit and scope of the present invention.

Figure 13B:
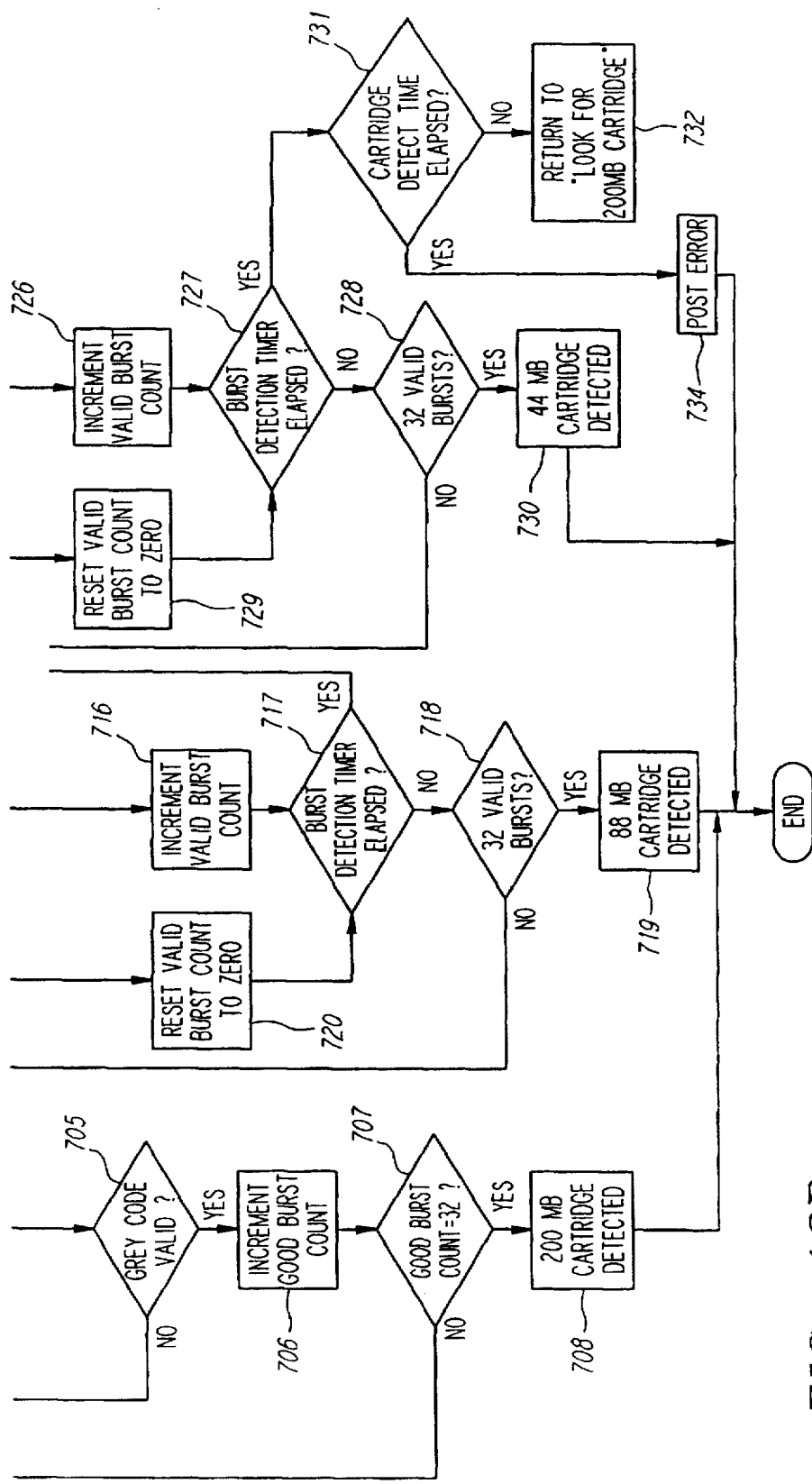
FIG. 13 is a flow diagram in accordance with one or more aspects of the present invention for recognizing disk cartridges of different capacities.

FIGS. 3A and 3B show a first and a second embodiment of a system for distinguishing between removable disk cartridges 103 of different capacities. A flow diagram for operation of a disk cartridge system in accordance with these embodiments is shown in FIG. 13. Although a preferred system for distinguishing three disk cartridges 103 is described, the methodology of FIG. 13 may be expanded to support a greater or lesser number of disk cartridges 103 as desired. Although the methodology of FIG. 13 is described below specifically with respect to the embodiment of FIG. 3A, the methodology may also be accomplished with the embodiment of FIG. 3B wherein the functions described below performed by ASIC 20 and ASIC 30 in the embodiment of FIG. 3A are performed by Super ASIC 1120 in the embodiment of FIG. 3B.

According to the embodiment shown in FIG. 3A, when a disk cartridge 103 is first inserted in the disk drive 101, closing of a door latch by a user may trigger a switch that informs the disk drive 101 that a new disk cartridge 103 has been inserted. Insertion of a new disk cartridge 103 may be detected by other appropriate means as well.

In a first step 700 of the FIG. 13 flow diagram, a cartridge detection timer is set or reset to zero. The cartridge detection timer is monitored in step 732 so as to measure a cartridge detection timeout period, such as five seconds. A polling technique may be used such that the cartridge detection timer is read periodically, or, alternatively, the cartridge detection timer may function as an interrupt when the cartridge detection timeout period has elapsed.

In a second step 700A, the disk drive 101 attempts to identify whether an inserted disk cartridge 103 is a higher-capacity removable disk cartridge 106.

In a next step 701, a search command is sent to the ASIC 20 (Super ASIC 1120 in the embodiment of FIG. 3B) instructing it to read the magnetic medium to determine whether the inserted cartridge 103 is a higher-capacity removable disk cartridge 106 with a disk in a high density format. In response to the search command, the heads 14 read information from the rotating disk 130.

Also as part of step 701, a good burst count is set to zero. The good burst count is incremented each time a valid burst and Gray code is read, as further explained herein. Also as part of step 701, a burst detection timer is set or reset to zero.

The burst timer is monitored in step 702 so as to measure a burst detection timeout period, such as 32 milliseconds. A polling technique may be used such that the burst timer is read periodically, or, alternatively, the burst detection timer may function as an interrupt when the burst detection timeout period has elapsed.

In step 703, data is read from the inserted disk cartridge 103 so long as the burst detection timer has not timed out. Step 703 comprises a further series of steps which may be more fully explained in reference to FIG. 14.

Figure 14:
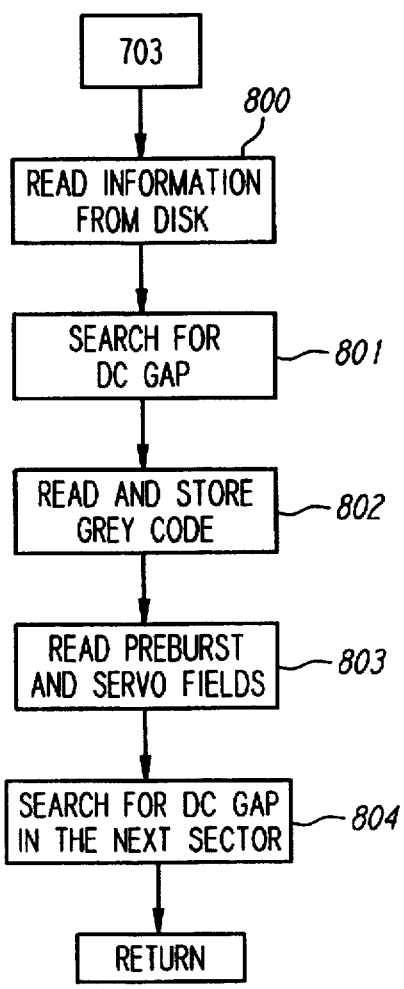
FIG. 14 is a flow diagram in accordance with an algorithm for detecting the presence of a higher-capacity removable disk cartridge in a disk drive.

As shown in FIG. 14, step 703 comprises a further series of steps 800 through 804. Further explanation of FIG. 14 may be had with respect to the embodiment of FIG. 3A. In step 800 information read by the disk drive head is provided to ASIC 20 (Super ASIC 1120 in the embodiment of FIG. 3B). In step 801, ASIC 20 (Super ASIC 1120 in the embodiment of FIG. 3B) analyzes the read information, looking first for a data pattern corresponding to the DC gap 203 described earlier in FIG. 9C. The DC gap 203 comprises, in a preferred embodiment, 85 bits of value "0" corresponding to a length of 5.3125 microseconds. A preferred circuit for reading the DC gap 203 is shown in FIG. 15 and explained elsewhere herein.

In step 802, once the DC gap 203 has been located, the ASIC 20 (Super ASIC 1120 in the embodiment of FIG. 3B) reads past the sync byte 204 and the index byte 205 to the Gray code 206, and stores the value therein. In step 803, the ASIC 20 (Super ASIC 1120 in the embodiment of FIG. 3B) then reads the preburst 207 and the servo field 208. In step 804, the disk drive 101 continues to read data from the disk 130. The ASIC 20 (Super ASIC 1120 in the embodiment of FIG. 3B) may either continuously search for the DC gap 203 in the next sector 132, or may synchronize an internal clock (not shown) to keep track of timing data so as to open a timing window at the proper point in subsequent sectors 132, thereby receiving data for Gray code fields 206 and servo fields 208 in the following sectors 132. Thus, the ASIC 20 (Super ASIC 1120 in the embodiment of FIG. 3B) may read a burst of data during a timing window starting roughly every 258.8 µsec, wherein the timing window is of sufficient duration to allow reading of at least the Gray code field 206 and the servo fields 208 of each sector 132.

In a next step 704, a "burst to burst time" is verified. Because each sector 132 takes 258.8 microseconds to read, information in the servo fields 208 should appear every 258.8 microseconds. The servo field 208 comprises four sub-fields 210, each 23 bits or 1.4375 microseconds in length. The ASIC 20 (Super ASIC 1120 in the embodiment of FIG. 3B) validates the servo pattern from the servo field 208, and then verifies the burst to burst time in step 704 by measuring the length of time from one servo field 208 to the next servo field 208.

A timing window is opened and if the burst to burst time is 258.8 microseconds, within a predefined margin of error, then the burst to burst time is considered valid, and the flow of operation proceeds to step 705. In a preferred embodiment, the burst to burst time is considered valid if it is 258.8 microseconds ±2.4%. Otherwise, the flow of operation proceeds to step 709, wherein the good burst count is reset to zero, and the flow of operation returns to step 702 wherein the burst detection timer is monitored to determine whether the burst detection timeout period has elapsed.

If the burst to burst time is valid, then ASIC 20 (Super ASIC 1120 in the embodiment of FIG. 3B) verifies the Gray code 206 in step 705. Generally, the Gray code 206 must fall within a predefined range. Thus, in a particular embodiment, the Gray code 206 must be greater than a minimum Gray code (such as fifteen) but less than a maximum Gray code (such as 2431). The current Gray code 206 must also be within thirty-two tracks 131 of the previous Gray code 206. If the Gray code 206 does not meet these criteria—that is, the Gray code 206 is less than the minimum Gray code, greater than the maximum Gray code, or not within thirty-two tracks of the previous Gray code—then the burst is considered invalid, and the flow of operation proceeds to step 709. Otherwise, the burst is considered a good burst, and the flow of operation proceeds to step 706.

In step 706, the good burst count is incremented by one. In a next step 707, a higher-capacity removable disk cartridge detection criterion is applied. In a preferred embodiment, the higher-capacity removable disk cartridge detection criterion requires that the number of consecutive good bursts exceed a certain minimum number. Thus, the good burst count is compared with a minimum number (e.g., thirty-two). If the good burst count has reached thirty-two, then the flow of operation proceeds to step 708, wherein the system has determined that a higher-capacity removable disk cartridge 106 has been inserted in the disk drive 101. If the good burst count is less than thirty-two, then the flow of operation returns to step 702, wherein the burst detection timer is monitored.

If the minimum number of consecutive good bursts is not found within the predetermined burst detection timeout period, then the system switches modes and assumes for the time being that the removable disk cartridge 103 is not a higher-capacity removable disk cartridge 106. For example, if thirty-two consecutive good bursts are not found within 32 milliseconds, the burst detection timer will time out, causing the system to switch modes and search for a lower capacity cartridge format, such as an 88 MByte removable disk cartridge 105 or a 44 MByte removable disk cartridge 104.

The particular criteria applied above are meant to be illustrative and by no means limiting. Thus, for example, the system may have any suitable burst detection timeout period (rather than 32 milliseconds), or may search for any suitable number of consecutive good bursts, depending on the particular system requirements and the amount of error checking desired. Also, instead of looking for a predefined number of consecutive good bursts in step 707, the system may look for a predefined number of good bursts within a total maximum number of bursts.

If the higher capacity detect condition in step 707 is not satisfied (i.e., thirty-two consecutive good bursts were not found within 32 milliseconds), then the flow of operation proceeds to step 710, and the system looks for the lower capacity cartridge formats.

In the exemplary FIG. 3A embodiment, a different set of circuitry is used to search for lower capacity removable disk cartridges 103. Thus, in step 711, the system switches active gate arrays from ASIC 20 to ASIC 30, and ASIC 20 becomes dormant.

Alternatively, as shown in the exemplary FIG. 3B embodiment, the servo timing control functions performed by ASIC 20 in the embodiment of FIG. 3A may be performed by Super ASIC 1120, which receives information read from the inserted magnetic disk medium from read channel IC 1118. In such a case, in step 711 the servo decoder 1130 of Super ASIC 1120 would switch from the single ID preamble decoder 922 to the dual ID preamble decoder 945.

In the FIG. 13 flow diagram, the next lower capacity cartridge format is searched for, in this case the format of an 88 MB removable disk cartridge 105. Thus, in step 712, a valid burst counter is set or reset to zero. Also, the burst detection timer is reset to zero.

Turning again to the embodiment of FIG. 3A, in a next step 713, the ASIC 30 receives read data from the heads 14 and searches first for an ID field 181 containing data of a predefined format. In the embodiment of FIG. 3B, the ASIC 1120 incorporates the functions of ASIC 30 in FIG. 3A. For the particular 88 MB format described earlier with respect to FIG. 9B, the ID field 161 is 52 bits long and has a duration of 5.2 microseconds. The contents of a preferred ID field 161 comprises the following sequence:

ID=1000000001000000001000100010001000100000000100000000

Once a first ID field 181 is located, the ASIC 30 (Super ASIC 1120 in the embodiment of FIG. 3B) reads the first gap 182, the sync field 183, the align field 184, and the index field 185, followed by the track number field 186 (e.g., represented in Gray code), and stores the value therein. The ASIC 30 (Super ASIC 1120 in the embodiment of FIG. 3B) then reads another gap 187 of 14 bits followed by the servo field 188, which, as noted, is 49 bits long and has a duration of 4.9 μsec.

The disk drive 101 continues to read data from the disk 130 thereafter. The ASIC 30 (Super ASIC 1120 in the embodiment of FIG. 3B) may either search for the ID field 181 in each following sector 132, or may synchronize an internal clock (not shown) to keep track of timing data so as to open a timing window at the proper point in subsequent sectors 132, at which point the ID field 181 for the next sector 132 is received and verified, followed at the appropriate times by the track number fields 186 and servo fields 188. Thus, the ASIC 30 (Super ASIC 1120 in the embodiment of FIG. 3B) may read a burst of data during a timing window starting roughly every 251.80 μsec (assuming 74 sectors), wherein the timing window is of sufficient duration to allow reading of at least the track number field 186 and the servo field 188 of each sector 132. The ASIC 30 (Super ASIC 1120 in the embodiment of FIG. 3B) may also open up a second timing window every 351.58 μsec to read control information in case the head 14 is positioned over a zone of the disk 130 having a different number of sectors (e.g., 53 sectors).

In a next step 714, a "burst to burst time" is verified by the ASIC 30 (Super ASIC 1120 in the embodiment of FIG. 3B). Because each sector 132 takes 251.80 μsec to read, information in the servo fields 188 should appear every 251.80 μsec. The particular servo pattern for which the ASIC 30 (Super ASIC 1120 in the embodiment of FIG. 3B) is to search appears as described earlier in reference to FIG. 9B. The servo field 188 comprises two sub-fields 191 and 192, together totaling 49 bits or 4.9 microseconds in length. The ASIC 30 (Super ASIC 1120 in the embodiment of FIG. 3B) validates the servo pattern from the servo field 188, and then verifies the burst to burst time in step 714 by measuring the length of time from one servo field 188 to the next servo field 188.

If the burst to burst time is 251.80 or 351.58 microseconds within a predefined margin of error (such as ±1%) then the burst to burst time is considered valid, and the flow of operation proceeds to step 715. Otherwise, the flow of operation proceeds to step 720, wherein the valid burst counter is reset to zero, and the flow of operation then proceeds to step 717.

If the burst to burst time is valid, then ASIC 30 (Super ASIC 1120 in the embodiment of FIG. 3B) verifies the track number from the track number field 186 in step 715. Generally, the track number must fall within a predefined range determined in part by the number of total tracks. Thus, in a particular embodiment, the track number must be greater than a minimum track number (such as fifteen) but less than a maximum track number (such as 1924). If the track number is less than the minimum track number or greater than the maximum track number, then the burst is considered invalid, and the flow of operation proceeds to step 720, whereupon the valid burst counter is reset to zero. Otherwise, the burst is considered a valid burst, and the flow of operation proceeds to step 716.

In step 716, the valid burst count is incremented by one.

In a next step 717, the burst detection timer is monitored so as to measure a burst detection timeout period, such as 32 milliseconds. A polling technique may be used such that the burst timer is read periodically, or, alternatively, the burst detection timer may function as an interrupt when the burst detection timeout period has elapsed.

If the burst detection timeout period (for example, 32 milliseconds) has elapsed, then the system assumes for the time being that a intermediate-capacity removable disk cartridge 105 has not been inserted in the disk drive 101, and the flow of operation proceeds to step 721.

If the burst detection timeout period has not elapsed, then the flow of operation proceeds to step 718. In step 718, the valid burst count is compared against a valid burst threshold (e.g., thirty-two). If the valid burst count has reached thirty-two, then the flow of operation proceeds to step 719, wherein the system has determined that a intermediate-capacity removable disk cartridge 105 has been inserted in the disk drive 101. If the valid burst count is less than thirty-two, then the flow of operation returns to step 713, wherein further data is read. The system continues to read data and count valid bursts until either the valid burst threshold is reached or the burst timeout period has elapsed in the manner described.

The particular criteria applied above are meant to be illustrative and by no means limiting. Thus, for example, the valid burst threshold and/or the burst detection timeout period may be set to any appropriate number, depending on the particular system requirements and the amount of error checking desired. The system may also apply other detection criteria as desired.

If the burst detection timeout period (which may be 32 milliseconds) has elapsed in step 717, then the flow of operation proceeds to step 721, and the system looks for the lowest-capacity cartridge format.

In the exemplary FIG. 3A embodiment, the same circuitry is used to search for the intermediate-capacity removable disk cartridges 105 and the lowest-capacity removable disk cartridges 104. Thus, in step 722, the system continues to operate using ASIC 30 (Super ASIC 1120 in the embodiment of FIG. 3B), but switches modes from an intermediate-capacity removable disk cartridge detection mode to a lowest-capacity removable disk cartridge detection mode.

In the exemplary FIG. 3B embodiment, the servo decoder 1130 of Super ASIC 1120 searches for higher-capacity removable disk cartridges 106, intermediate-capacity removable disk cartridges 105 and lowest-capacity removable disk cartridges 104.

In the flow diagram of FIG. 13, the criteria used to detect a lower-capacity (e.g., 44 MB) disk format is similar to that used to detect an intermediate-capacity (e.g., 88 MB) disk format. Thus, in step 722, a valid burst counter is set or reset to zero and the burst detection timer is reset to zero. In a next step 723, the ASIC 30 (Super ASIC 1120 in the embodiment of FIG. 3B) receives read data from the heads 14 and searches first for an ID field 161 containing data of a predefined format. For the particular 44 MB format described earlier with respect to FIG. 9A, the ID field 161 is 10 bits long (e.g., "10001000101") and has a duration of 2 microseconds.

Once a first ID field 161 is located, the ASIC 30 (Super ASIC 1120 in the embodiment of FIG. 3B) reads the sync field 162 and the index field 163, followed by the track number field 164 (e.g., represented in Gray code), and stores the value therein. The ASIC 30 (Super ASIC 1120 in the embodiment of FIG. 3B) then reads the servo field 165, which, as noted, is 24 bits long and has a duration of 4.8 μsec.

The disk drive 101 continues to read data from the disk 130 thereafter. The ASIC 30 (Super ASIC 1120 in the embodiment of FIG. 3B) may either search for the ID field 161 in each following sector 132, or may synchronize an internal clock (not shown) to keep track of timing data so as to open a timing window at the proper point in subsequent sectors 132, at which point the ID field 161 for the next sector 132 is received and verified, followed at the appropriate times by the track number fields 164 and servo fields 165. Thus, the ASIC may read a burst of data during a timing window starting roughly every 266.19 μsec, wherein the timing window is of sufficient duration to allow reading of at least the track number field 164 and the servo field 165 of each sector 132.

In a next step 724, a "burst to burst time" is verified by the ASIC 30 (Super ASIC 1120 in the embodiment of FIG. 3B).

Because each sector 132 takes 266.19 μsec to read, information in the servo fields 165 should appear every 266.19 μsec. The particular servo pattern for which the ASIC 30 (Super ASIC 1120 in the embodiment of FIG. 3B) is to search appears as described earlier in reference to FIG. 9A. The servo field 165 comprises four sub-fields 170, each 6 bits in length, and together totaling 24 bits or 4.8 microseconds. The ASIC 30 (Super ASIC 1120 in the embodiment of FIG. 3B) validates the servo pattern from the servo field 165, and then verifies the burst to burst time in step 724 by measuring the length of time from one servo field 165 to the next servo field 165.

If the burst to burst time is 266.19 μsec within a predefined margin of error (such as ±1%), then the burst to burst time is considered valid, and the flow of operation proceeds to step 725. Otherwise, the flow of operation proceeds to step 729, wherein the valid burst counter is reset to zero, and the flow of operation then proceeds to step 727.

If the burst to burst time is valid, then ASIC 30 (Super ASIC 1120 in the embodiment of FIG. 3B) verifies the track number from the track number field 164 in step 725. Generally, the track number must fall within a predefined range determined in part by the number of total tracks. Thus, in a particular embodiment, the track number must be greater than a minimum track number but less than a maximum track number. If the track number is less than the minimum track number or greater than the maximum track number, then the burst is considered invalid, and the flow of operation proceeds to step 729, whereupon the valid burst counter is reset to zero. Otherwise, the burst is considered a valid burst, and the flow of operation proceeds to step 726.

In step 726, the valid burst count is incremented by one.

In a next step 727, the burst detection timer is monitored so as to measure a burst detection timeout period, such as 32 milliseconds. A polling technique may be used such that the burst detection timer is read periodically, or, alternatively, the burst detection timer may function as an interrupt when the burst detection timeout period has elapsed.

If the burst detection timeout period (for example, 32 milliseconds) has elapsed, then the system assumes for the time being that a lowest-capacity removable disk cartridge 104 has not been inserted in the disk drive 101, and the flow of operation proceeds to step 731.

If the burst detection timeout period has not elapsed, then the flow of operation proceeds to step 728. In step 728, the valid burst count is compared against a valid burst threshold (e.g., thirty-two). If the valid burst count has reached thirty-two, then the flow of operation proceeds to step 730, wherein the system has determined that a lowest-capacity removable disk cartridge 104 has been inserted in the disk drive 101. If the valid burst count is less than thirty-two, then the flow of operation returns to step 723, wherein further data is read. The system continues to read data and count valid bursts until either the valid burst threshold is reached or the burst detection timeout period has elapsed in the manner described.

The particular criteria applied above are meant to be illustrative and by no means limiting. Thus, for example, the valid burst threshold and/or the burst detection timeout period may be set to any appropriate number, depending on the particular system requirements and the amount of error checking desired. The system may also apply other detection criteria as desired.

If the burst detection timeout period has elapsed in step 727, the flow of operation proceeds to step 731. In step 731, the system determines whether the cartridge detection timeout period (which may be five seconds) has elapsed. If the cartridge detection timeout period has not elapsed, then the flow of operation proceeds to step 732, whereupon the system begins again to look for a higher-capacity cartridge 106.

If, on the other hand, the cartridge detection timeout period has elapsed, then the flow of operation proceeds to step 734, whereupon a system error is posted, and the disk cartridge 103 is considered to be unrecognizable.

FIG. 15 is a block diagram of a preferred circuit embodiment for processing information read from a disk cartridge in accordance with one or more aspects of the flow diagram of FIGS. 13.

In FIG. 15, a single ID preamble decoder 922 processes information pertaining to the higher-capacity removable disk cartridge format depicted in FIG. 9C, while a dual ID preamble decoder 945 processes information pertaining to one or more lower-capacity removable disk cartridge formats, such as depicted in FIGS. 9A and 9B.

In the embodiment of FIG. 3A, the single ID preamble decoder 922 may be incorporated as part of ASIC 20, while the dual ID preamble decoder 945 may be incorporated as part of ASIC 30. In the embodiment of FIG. 3B, the single ID preamble decoder 922 and the dual ID preamble decoder 945 may be incorporated as part of ASIC 1120.

In the single ID preamble decoder 922, an input signal 901 is provided to a pulse detector 902. The pulse detector 902 generates a digital control data signal 915 from the input signal 901 corresponding to flux transitions on the magnetic medium.

A register 906 is triggered by each flux transition in the control data signal 915 output from the pulse detector 902. The control data signal 915 acts as a load register signal for register 906, and causes the register 906 to read in the present value of a clock counter 903. The control data signal 915 also acts as a load register signal for another register 907, and causes register 907 to read in the present value of register 906 (i.e., the previous stored value of clock counter 903). Thus, each flux transition causes a new clock value to be stored in register 906, and the clock value corresponding to a previous flux transition to be stored in register 907.

A difference between the contents of the registers 906 and 907 is calculated by a subtractor 908. Thus, in FIG. 15, the contents of register 907 are subtracted from the contents of register 906 by subtractor 908, yielding a timing differential value. The timing differential value is provided to a counter/timer logic block 905, wherein the timing differential value is compared to a predefined value. When the predefined value is detected, the counter/timer logic block 905 enters a mode for reading control information, as described hereafter.

In particular, the counter/timer logic block 905 waits for a timing differential value equal to the expected duration of a DC gap 203 to occur, as defined with respect to FIG. 9C. The DC gap 203 comprises a series of 0's (i.e., no flux transitions), and is preferably surrounded by a starting flux transition and an ending flux transition. When the timing differential value is equal to 5.3125 μsec (within a predefined margin of error, if desired), the counter/timer logic block 905 assumes that a DC gap 203 has been detected, and allows the single ID preamble decoder 922 to read further information assumed to be control and servo information.

In order to accurately determine whether a DC gap 203 has occurred, the clock counter 903 must have sufficient resolution to allow the counter/timer logic block 905 at distinguish the DC gap 203 from similar flux patterns as may randomly appear on the disk as data or otherwise. Thus, clock counter 903 preferably allows resolution to at least 62.5 nanoseconds. A clock generator 904 provides a high speed clock signal to the clock counter 903 at no less than 16 MHz.

The clock generator 904 also provides a high speed clock signal to the counter/timer logic block 905. When a DC gap 203 is detected, the counter/timer logic block 905 opens a series of timing windows precisely timed from the end of the DC gap 203. The counter/timer logic block 905 first sends a load signal 914 to a control information register 909. The control information register 909 receives the control data signal 915 from the pulse detector 902 and stores the information in fields of control information register 909. The load signal 914 is maintained for a sufficient length of time to read the pertinent control information. The control information register 909 comprises a sync field 910, an index field 911, a Gray code field 912, and a preburst field 913, and each of the control information fields 910 through 913 is loaded with information from the square wave signal 915. The control information stored is defined with respect to the format of FIG. 9C. The control information register 909 may comprise a series of separate registers or a single register.

After loading the control information register 909, the counter/timer logic block 905 disables load signal 914 and opens up a series of burst timing windows. The burst timing windows correspond to the A-burst, B-burst, C-burst and D-burst as defined with respect to FIG. 9C. Burst timing control signals 916 corresponding to the burst timing windows are provided to AND logic gates 921. The control data signal 915 is also provided to the AND logic gates 921. An A-burst timing control signal 916 is enabled to gate the A-burst through one of the AND logic gates 921 and provide an A-burst signal 917. Likewise, timing control signals 916 for the B-burst, C-burst and D-burst are enabled in sequence to gate the B-burst, C-burst, and D-burst, respectively, through the corresponding AND logic gates 921 and provide a B-burst signal 918, a C-burst signal 919, and a D-burst signal 920, respectively.

In the above described manner, control information is read and processed from the magnetic medium, and is made available for further verification as described, for example, in the flow diagrams of FIGS. 13 and 14. Once a first DC gap 203 is detected, the counter/timer logic block 905 may thereafter open a DC gap timing window, whereby it searches for the next DC gap 203 (i.e., in the following sector) a predetermined length of time after the first DC gap 203, as described with respect to the flow diagrams of FIGS. 13 and 14.

In the dual ID preamble decoder 945, an input signal 901 is provided to a pulse detector 932. The pulse detector 932 generates a digital control data signal 985 from the input signal 901 corresponding to flux transitions on the magnetic medium.

The control data signal 935 output from the pulse detector 932 is provided to an index register 933. An index reference register 934 stores a copy of a particular flux pattern corresponding to ID field 181 (for the disk cartridge format of FIG. 9B) or ID field 161 (for disk cartridge format of FIG. 9A). The contents of the index register 933 are continuously compared by a comparator 937 against the contents of the index reference register 934 until a match occurs. When a match occurs, an ID field match signal is sent from the comparator 937 to a counter/timer logic block 940, which causes the counter/timer logic block 940 to enter a mode for reading control and servo information.

A clock generator 939 provides a clock signal to the index register 933 so as to facilitate loading of the control data signal 935. The clock generator 939 also provides a clock signal to the counter/timer logic block 940 to allow further reading of control and servo information. In particular, after the proper ID field sequence is detected, the counter/timer logic block 940 opens a series of timing windows precisely timed from the end of the ID field 161 or 181. The counter/timer logic block 940 first sends a load signal 938 to a track number register 936. The track number register 936 receives the square control data signal 935 from the pulse detector 932 and stores information corresponding to the track number (e.g., in Gray code) in the track number field 164 or 186, as defined with respect to the formats of FIGS. 9A or 9B, respectively. The load signal 938 is maintained for a sufficient length of time to read the track number.

After loading the track number register 936, the counter/timer logic block 940 disables load signal 938 and opens up a series of burst timing windows. The burst timing windows correspond to the A-burst 191 and B-burst 192 for the FIG. 9B format, or the A-bursts 171 and B-bursts 172 for the FIG. 9A format. Burst timing control signals 942 corresponding to the burst timing windows are provided to AND logic gates 941. The control data signal 935 is also provided to the AND logic gates 941. An A-burst timing control signal 942 is enabled to gate the A-burst through one of the AND logic gates 941 and provide an A-burst signal 943. Likewise, a B-burst timing control signal 942 is enabled to gate the B-burst through one of the AND logic gates 941 and provide a B-burst signal 944. For the FIG. 9A format, two more AND logic gates 941 may be used to similarly gate through the second A-burst 171 and the second B-burst 172 in sequence.

In the above described manner, control information is read and processed from the magnetic medium, and is made available for further verification as described, for example, in the flow diagram of FIG. 13. Once a first ID field 161 or 181 is detected, the counter/timer logic block 940 may thereafter open an ID field timing window, whereby it searches for the next ID field 161 or 181 (i.e., in the following sector) a predetermined length of time after the first ID field 161 or 181, as described with respect to the flow diagram of FIG. 13.

The same basic circuitry may be used to read formats of both FIGS. 9A and 9B. The contents of the index reference register 934 may be altered depending on whether the lowest-capacity (e.g., 44 MB) or the intermediate-capacity (e.g., 88 MB) removable disk cartridge format is being searched for. The counter/timer logic block 940 may likewise store appropriate parameters to read both FIGS. 9A and 9B formats. The parameters may be loaded under software or firmware control. The circuitry of both preamble decoders 922 and 945 may also be combined into a integrated circuit, and software or firmware used to control parameters so as to search for any of three (or more) disk cartridge formats. Although such a programmable system may have versatility, a key consideration is speed of processing, and therefore a hardware embodiment of FIG. 15 is preferred as it will typically provide the fastest performance.

The present invention has been set forth in the form of its preferred embodiments. It is nevertheless intended that modifications to the disclosed offset injection techniques for eliminating sideband interference from data recording operations in a downwardly compatible removable cartridge disk drive, and to the other related techniques disclosed herein, may be made by those skilled in the art without departing from the scope and spirit of the present invention. Moreover, such modifications are considered to be within the purview of the appended claims.

What is claimed is:

1. A method for eliminating, without use of a tunnel erase head, sideband interference in a lower-capacity removable disk cartridge caused by recording data on the tracks of the disk in the lower-capacity removable disk cartridge using a higher-capacity read/write head, said method comprising the steps of:

establishing a track following feedback control to govern the position of the higher-capacity read/write head relative to the centerlines of the data tracks on the disk in the removable disk cartridge;

prior to commencing write operations with the higher-capacity read/write head, injecting a dynamic offset value into said track following loop operation, said offset value taking the form of a dithering signal which causes the higher-capacity read/write head to move back and forth across the sidebands associated with each track; and operating the higher-capacity read/write head in an erase mode while the higher-capacity read/write head is moving back and forth across the sidebands in response to the application of said dithering signal and while maintaining said track following feedback control over said higher-capacity read/write head.

2. A method for erasing information stored on a disk comprising the steps of:

reading position control information from the disk so as to allow a read/write head to follow the centerline of a data track;

moving the read/write head in a repeating oscillatory pattern with respect to the centerline of said track while continuing to read the position control information from the disk so as to obtain an indication of deviation of the read/write head from the centerline of the data track, and operating said read/write head in an erase mode during a selected portion of said repeating oscillatory pattern under closed-loop servo control responsive to said indication of deviation of the read/write head from the centerline of the data track.

3. The method of claim 2 wherein said repeating oscillatory pattern comprises a sine wave.

4. The method of claim 2 wherein, while said read/write head is being moved in said repeating oscillatory pattern, the read/write head covers a plurality of revolutions around said track.

5. The method of claim 4 wherein the starting point of said repeating pattern for one of said revolutions differs from the starting point of said repeating pattern for another of said revolutions.

6. A method for erasing information stored on a magnetic medium comprising the steps of:

reading, with a read/write head, position information from the magnetic medium indicative of the centerline of a data track, moving said read/write head in a repeating oscillatory pattern with respect to the centerline of said track, but radially offset from the centerline by a static constant, while continuing to read said position information with said read/write head, and operating said read/write head in an erase mode during a selected portion of said repeating oscillatory pattern.

7. The method of claim 6 further comprising the step of, after completing said repeating oscillatory pattern, moving said read/write head in a second repeating oscillatory pattern with respect to the centerline of said track, but radially offset from the centerline by a second static constant of opposite polarity from the static constant, wherein the read/write head continues to rear said position information while being moved in said second repeating oscillatory pattern.

8. The method of claim 6 wherein said repeating oscillatory pattern comprises multiple revolutions around said track.

9. The method of claim 8 wherein each revolution of said repeating oscillatory pattern is phase offset from the preceding revolution.

10. An apparatus for erasing information stored on a disk comprising:
   a read/write head responsive to a position command generated as a result of reading servo data from the disk and applying said servo data in a feedback loop, said servo data indicative of the centerline of a data track, and
   means for injecting a dithering signal into said feedback loop while servo data is being read from said disk, whereby said position command is combined with said dithering signal so as to cause said read/write head to traverse said track in a repeating pattern, and wherein said read/write head is operated in an erase mode during at least a portion of said repeating pattern.

11. The apparatus of claim 10 wherein said repeating pattern comprises a sine wave.

12. The apparatus of claim 10 wherein said dithering signal comprises a dynamic offset.

13. The apparatus of claim 10 wherein said dithering signal comprises a static offset and a dynamic offset, said static offset causing said repeating pattern to be offset from the track centerline by a constant amount, and said dynamic offset defining said repeating pattern.

14. The apparatus of claim 10 wherein said disk is housed in a removable disk cartridge.

15. The apparatus of claim 10 wherein said repeating pattern comprises more than one revolution around said track.

16. The apparatus of claim 15 wherein said repeating pattern does not comprise an integral number of periods over a single revolution.

17. The apparatus of claim 10 wherein said track is divided according to a plurality of sectors, and a portion of said track corresponding to a sector to be overwritten is traversed by said read/write head in multiple passes.

18. The apparatus of claim 17 wherein a first one of said passes is phase offset from a second one of said passes.

19. An apparatus for erasing information stored on a magnetic medium comprising:
   a read/write head responsive to a position command generated as a result of reading servo data from the magnetic medium and applying said servo data in a feedback loop, said servo data indicative of the centerline of a data track, and
   means for injecting a dithering signal into said feedback loop, whereby said position command is combined with said dithering signal so as to cause said read/write head to traverse said track in a repeating oscillatory pattern offset from said centerline by a static constant, and wherein said read/write head is operated in an erase mode during at least a portion of said repeating oscillatory pattern.

20. The apparatus of claim 19 further comprising means for injecting a second dithering signal into said feedback loop after completion of said repeating oscillatory pattern, whereby said position command is combined with said second dithering signal so as to cause said read/write head to traverse said track in a second repeating oscillatory pattern offset from said centerline in an opposite radial direction by a second static constant, and wherein said read/write head is operated in an erase mode during at least a portion of said second repeating oscillatory pattern.

21. The apparatus of claim 20 wherein said first static constant and said second static constant have the same magnitude.

22. The apparatus of claim 20 wherein said second repeating oscillatory pattern comprises a sine wave.

23. The apparatus of claim 19 wherein said repeating oscillatory pattern comprises a sine wave.

24. The apparatus of claim 23 wherein said track is divided according to a plurality of sectors, and wherein a period of said sine wave covers eight of said sectors.

25. The apparatus of claim 19 wherein said track is divided according to a plurality of sectors, and wherein a period of said repeating oscillatory pattern is selected so that said read/write head traverses a different path over a particular sector in each of a plurality of passes.

26. The apparatus of claim 19 further comprising a digital-to-analog converter connected to said feedback loop and a lookup table connected to said digital-to-analog converter, whereby said dithering signal is generated by applying a series of digital values from said lookup table to said digital-to-analog converter.

27. The apparatus of claim 19 wherein said dithering signal comprises a static offset and a dynamic offset, said static offset defining said static constant, and said dynamic offset defining an AC component of said repeating pattern.

28. The apparatus of claim 19 wherein said magnetic medium comprises a disk housed in a removable disk cartridge.

29. The apparatus of claim 19 wherein said repeating pattern comprises more than one revolution around said track.

30. The apparatus of claim 19 wherein said repeating pattern does not comprise an integral number of periods over a single revolution.

31. The apparatus of claim 19 wherein said track is divided according to a plurality of sectors, and a portion of said track corresponding to a sector to be overwritten is traversed by said read/write head in multiple passes.

32. The apparatus of claim 31 wherein a first one of said passes is phase offset from a second one of said passes.

33. A method of writing to a removable disk cartridge inserted in a disk drive compatible with both a lower storage density removable disk cartridge and a higher storage density removable disk cartridge, each of said removable disk cartridges divided according to a plurality of data tracks, and each of said data tracks comprising servo information defining a track centerline, said method comprising the steps of:
   identifying the density of an inserted disk cartridge by matching a format of data located on said inserted disk cartridge to a predetermined format,
   for said higher storage density removable disk cartridge, erasing data for a selected high density data track by moving a read/write head along a centerline of said high density data track and operating said read/write head in an erase mode over select portions of said high density data track, and thereafter writing data over said high density data track, and
   for said lower storage density removable disk cartridge, erasing data for a selected low density data track without using a tunnel erase head by moving a read/write head in a repeating pattern relative to the centerline of said low density data track and operating said read/write head in an erase mode over select portions of said low density data track while maintaining closed loop servo control, and thereafter writing data over said low density data track.

34. The method of claim 33 wherein said step of identifying the storage capacity of an inserted disk cartridge comprises the step of attempting to read the servo information for said inserted disk cartridge.

35. The method of claim 33 wherein said repeating pattern comprises a sine wave.

36. A method of eliminating sideband interference in a removable disk cartridge inserted in a disk drive compatible with both a lower storage density removable disk cartridge and a higher storage density removable disk cartridge, said lower storage density removable disk cartridge being divided according to a plurality of lower density data tracks, and each of said lower density data tracks comprising servo information defining a track centerline, said method comprising the steps of:

prior to commencing write operations with the read/write head, moving said read/write head over a low density data track in a repetitive pattern while periodically reading servo information defining the centerline of said low density data track, maintaining closed loop servo control over said read/write head by oscillating said read/write head at a frequency associated with said repetitive pattern selected so as to minimize an interval of time in which said read/write head approaches a saturation region of a closed loop servo controller controlling said read/write head, and operating said read/write head in an erase mode when traversing said sector to be erased without simultaneously operating a tunnel erase head, said read/write head continuing to be moved in the repetitive pattern around the low density data track such that said read/write head traverses in multiple passes a substantial portion of a sector to be erased on said low density data track.

37. The method of claim 36 wherein said repetitive pattern comprises a sine wave.

* * * * *